US008947624B2

(12) United States Patent
Murata et al.

(10) Patent No.: US 8,947,624 B2
(45) Date of Patent: Feb. 3, 2015

(54) LIQUID-CRYSTAL PANEL AND LIQUID-CRYSTAL DISPLAY DEVICE

(75) Inventors: Mitsuhiro Murata, Osaka (JP); Shuichi Kozaki, Osaka (JP); Shoichi Ishihara, Osaka (JP); Takehisa Sakurai, Osaka (JP); Tadashi Ohtake, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 507 days.

(21) Appl. No.: 13/394,653

(22) PCT Filed: Jun. 8, 2010

(86) PCT No.: PCT/JP2010/059721
§ 371 (c)(1),
(2), (4) Date: Mar. 7, 2012

(87) PCT Pub. No.: WO2011/043103
PCT Pub. Date: Apr. 14, 2011

(65) Prior Publication Data
US 2012/0169981 A1    Jul. 5, 2012

(30) Foreign Application Priority Data

Oct. 7, 2009  (JP) .................... 2009-233418

(51) Int. Cl.
| G02F 1/1333 | (2006.01) |
| G02F 1/139 | (2006.01) |
| G02F 1/1343 | (2006.01) |
| G02F 1/1335 | (2006.01) |
| G02F 1/1337 | (2006.01) |

(52) U.S. Cl.
CPC ........ *G02F 1/1393* (2013.01); *G02F 1/134363* (2013.01); *G02F 1/133345* (2013.01); *G02F 1/133514* (2013.01); *G02F 2001/133742* (2013.01)

USPC ............................ 349/138; 349/130; 349/141

(58) Field of Classification Search
CPC ................... G02F 1/134363; G02F 1/133514; G02F 1/133345
USPC ......................................... 349/130, 138, 141
See application file for complete search history.

(56) References Cited

U.S. PATENT DOCUMENTS 6,342,939 B1 *   1/2002   Hirata et al. ................. 349/143
(Continued)

FOREIGN PATENT DOCUMENTS

| JP | 8-50281 | 2/1996 |
| JP | 10-133190 | 5/1998 |
| JP | 10-186351 | 7/1998 |

(Continued)

*Primary Examiner* — Richard Kim
*Assistant Examiner* — Ryan Crockett
(74) *Attorney, Agent, or Firm* — Nixon & Vanderhye P.C.

(57) ABSTRACT

A vertical alignment liquid crystal panel based on a transverse electric field drive system is provided which shows few changes in color when looked squarely at. A liquid crystal panel (2) is a vertical alignment liquid crystal panel based on a transverse electric field drive system, which carries out a display by driving, with a transverse electric field, a liquid crystal layer (50) sandwiched between substrates (10, 20), and the substrate (10) is provided with an insulating layer (25) having at least two regions that are different in relative permittivity from each other in a pixel (6) composed of a red subpixel (6R), a green subpixel (6G), and a blue subpixel (6B). Those regions of the insulating layer (25) which correspond to the blue, green, and red subpixel (6B, 6G, 6R) in the liquid crystal panel (2) have relative permittivities of 3, 3 to 7, and 4 to 7, respectively.

9 Claims, 25 Drawing Sheets

(56) References Cited

U.S. PATENT DOCUMENTS

| | | | |
|---|---|---|---|
| 6,642,984 B1 * | 11/2003 | Yoshida et al. | 349/141 |
| 2001/0050742 A1 | 12/2001 | Takeda et al. | |
| 2002/0018166 A1 | 2/2002 | Matsumoto et al. | |
| 2002/0030780 A1 | 3/2002 | Nishida et al. | |

FOREIGN PATENT DOCUMENTS

| | | |
|---|---|---|
| JP | 2000-193977 | 7/2000 |
| JP | 2000-305100 | 11/2000 |
| JP | 2002-23179 | 1/2002 |
| JP | 2010-250117 | * 11/2010 |

* cited by examiner

F I G. 2
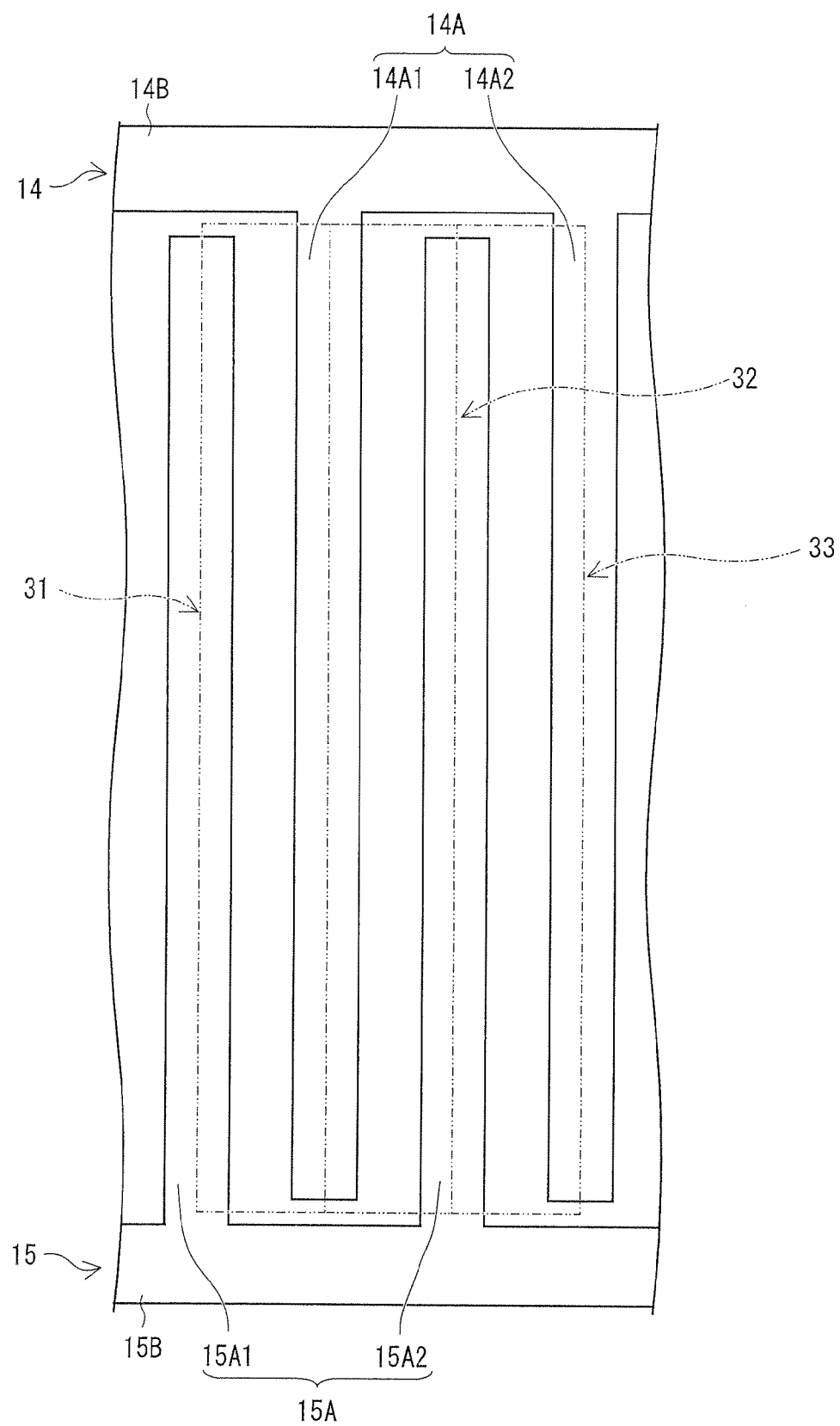

F I G. 6
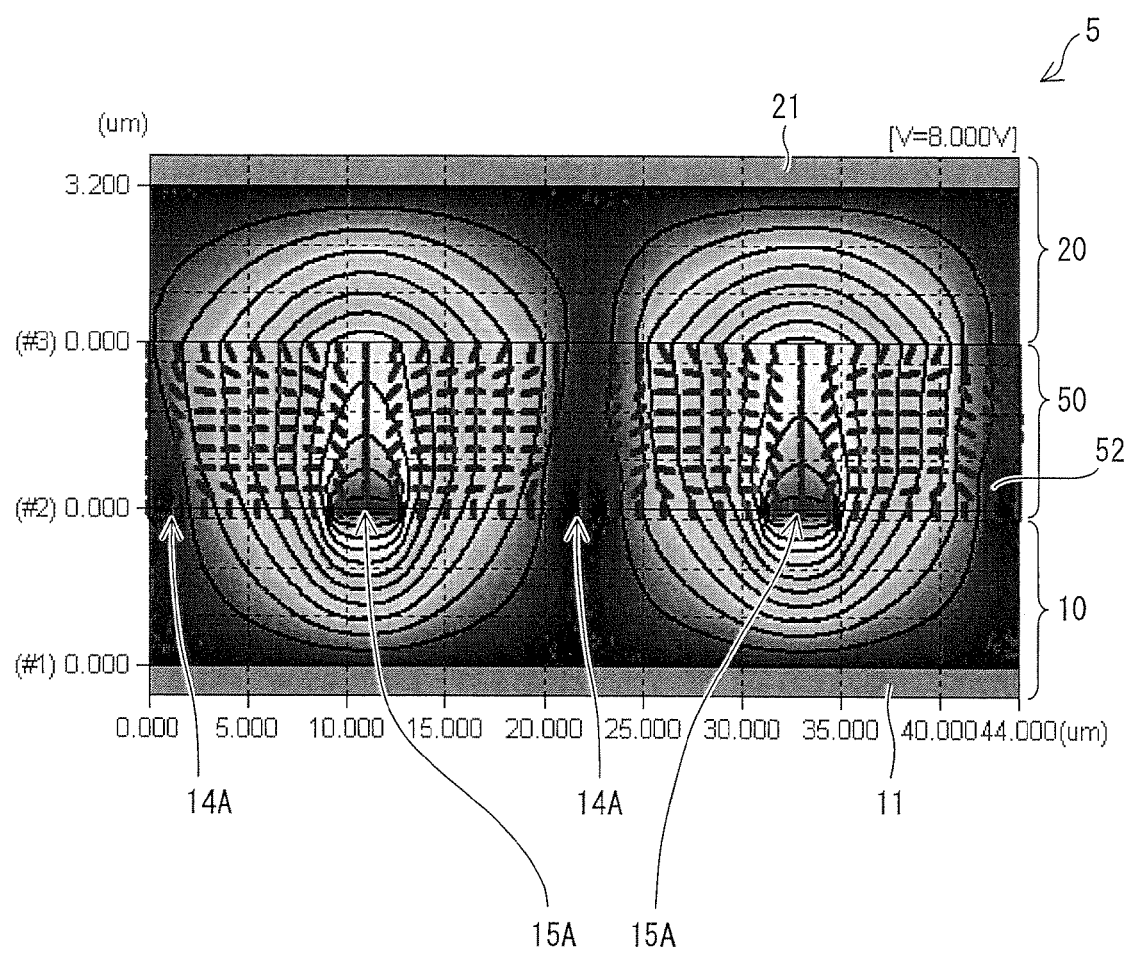

F I G. 7
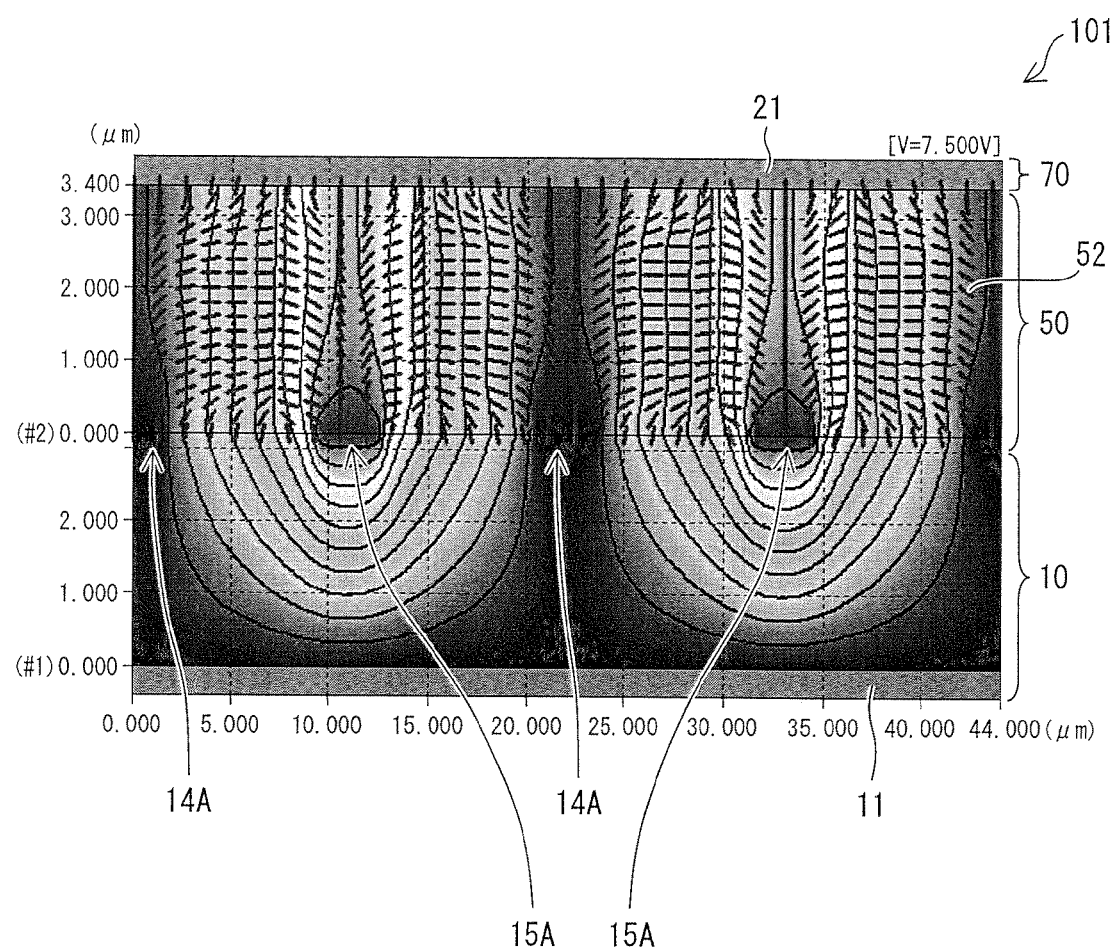

F I G. 1 0
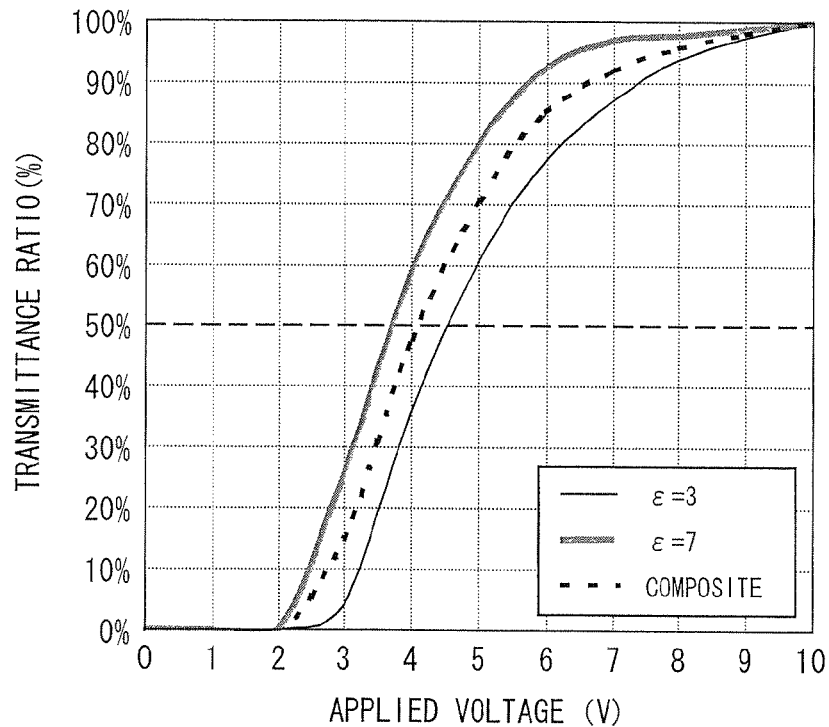
F I G. 1 1
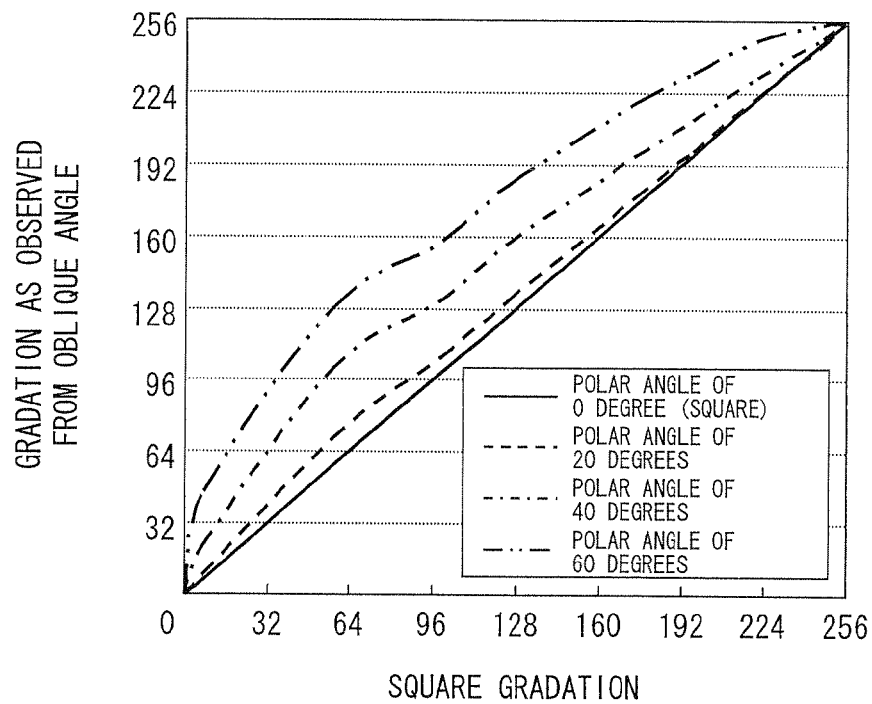

F I G. 1 4
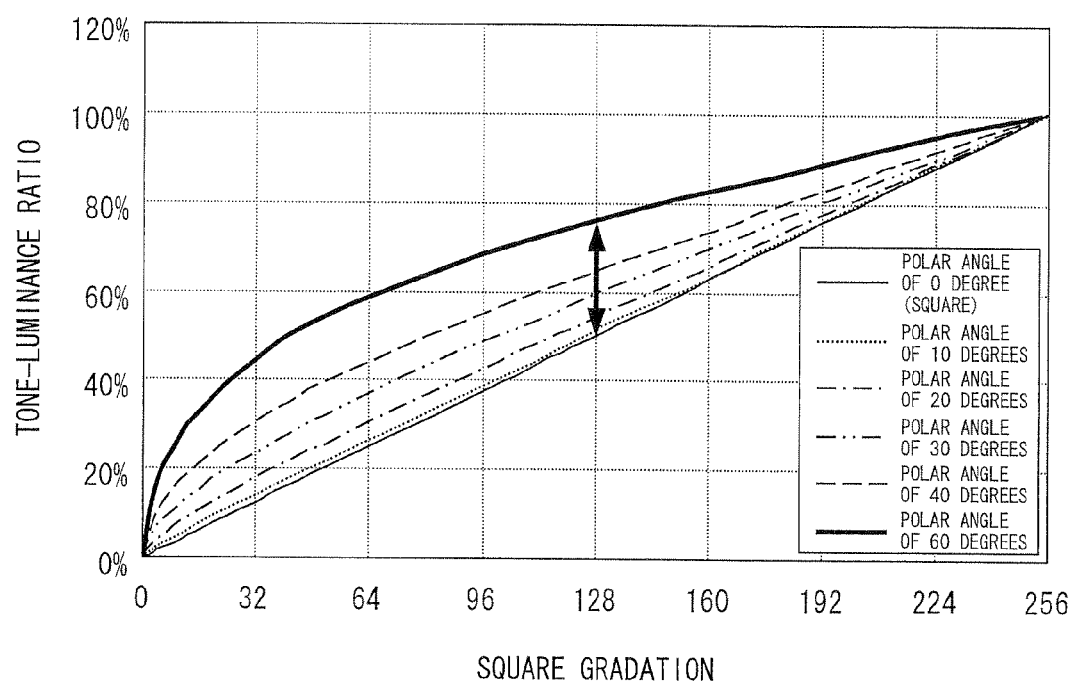

F I G. 1 7
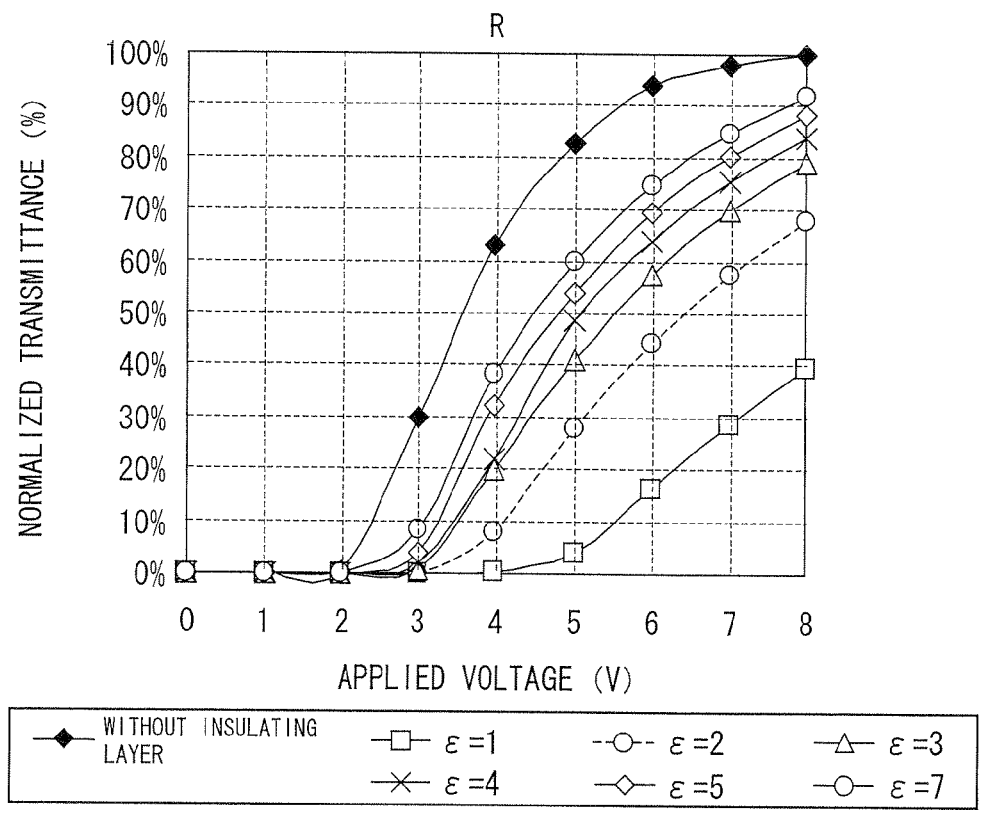

F I G. 1 9
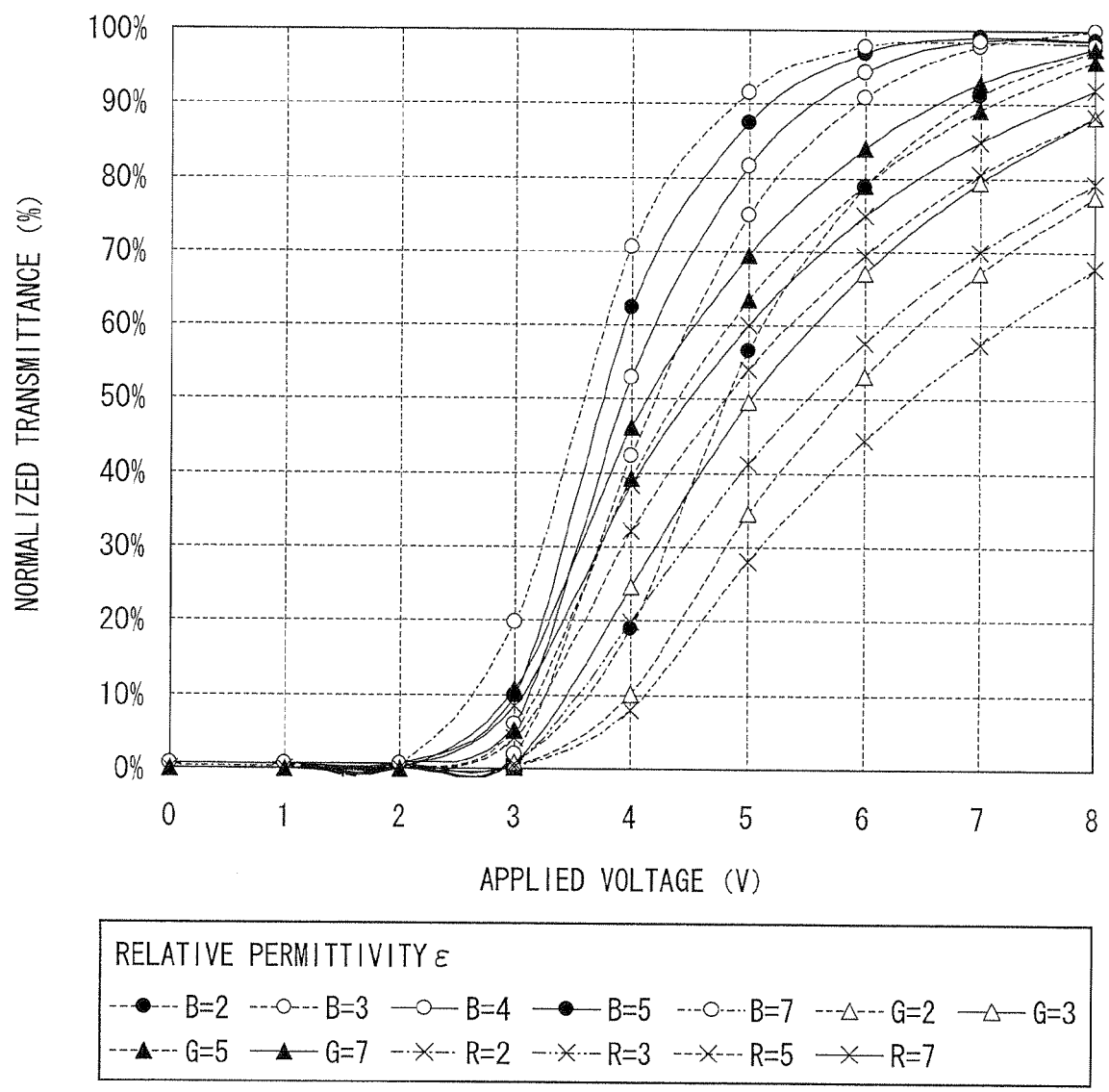

F I G. 2 0
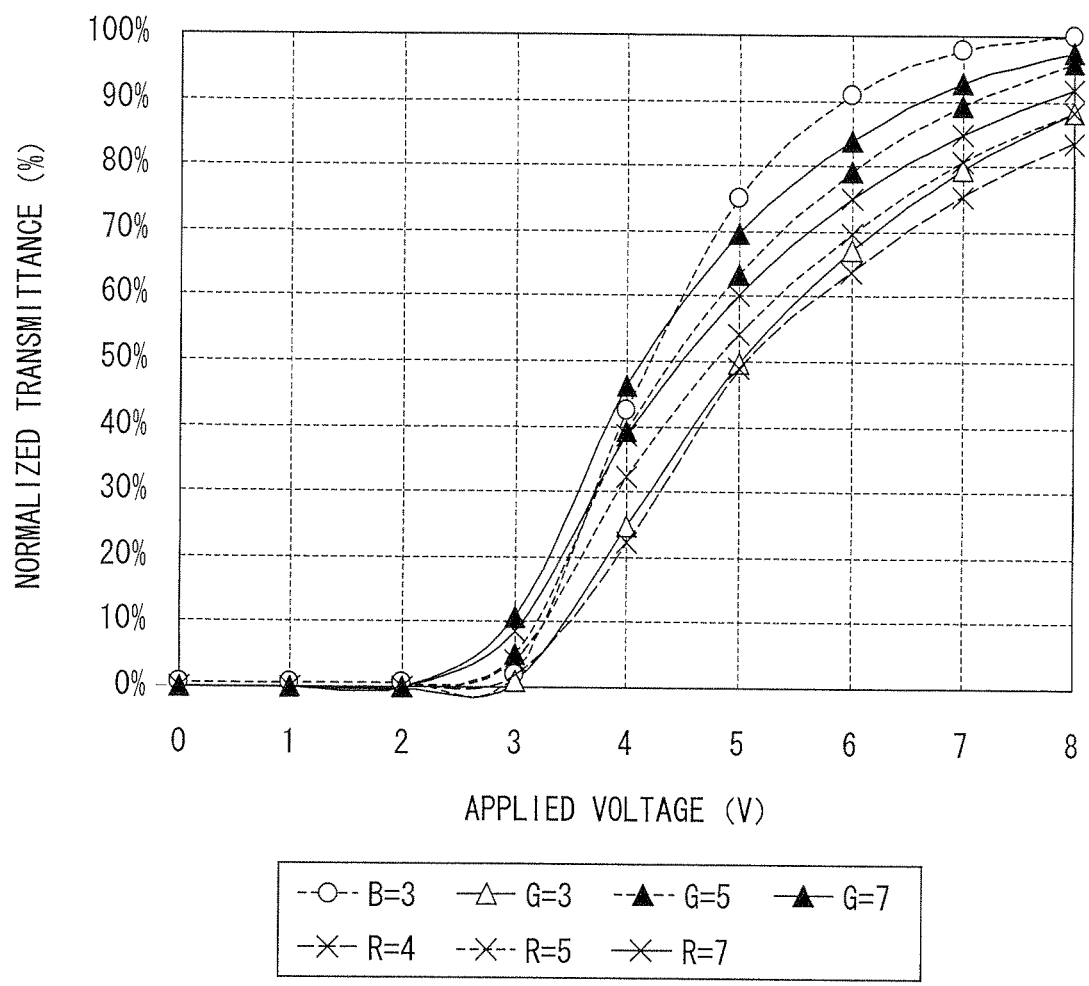

F I G. 2 1
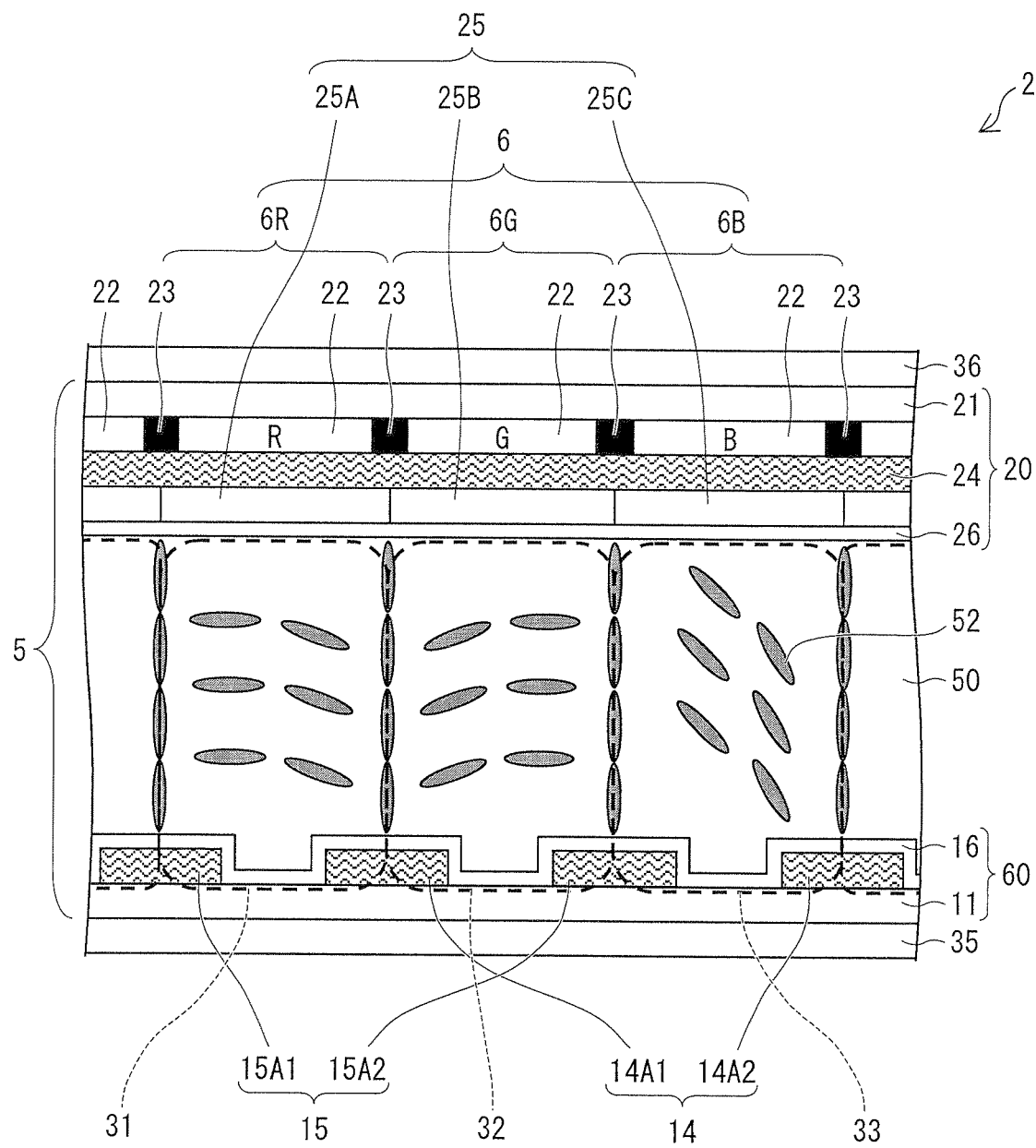

F I G. 2 2
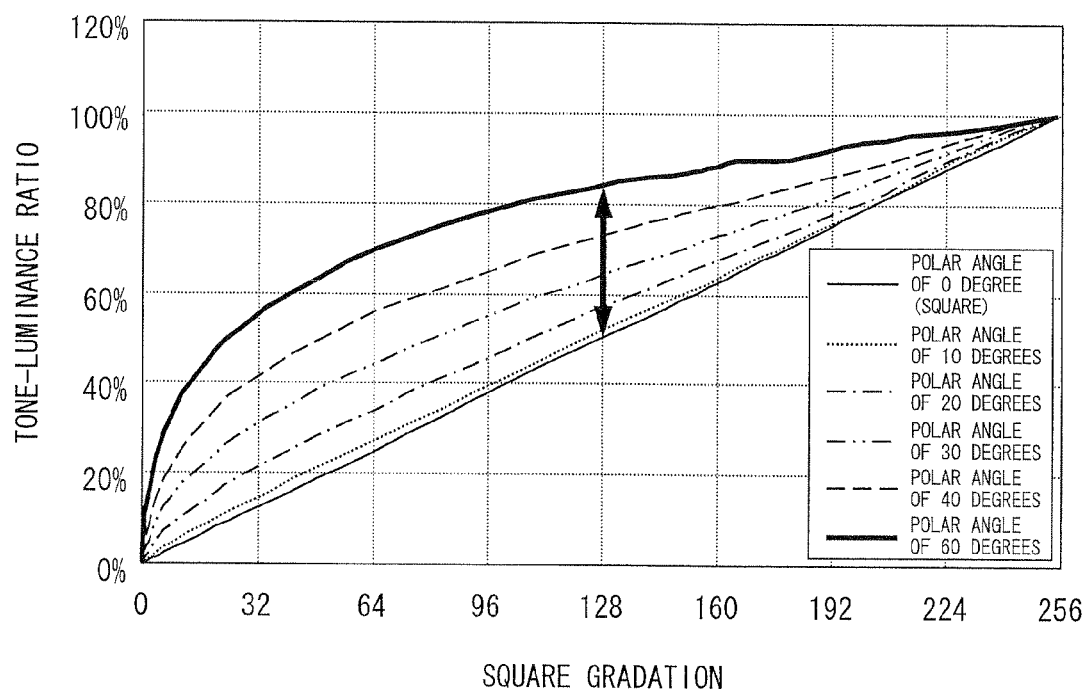

F I G. 2 4
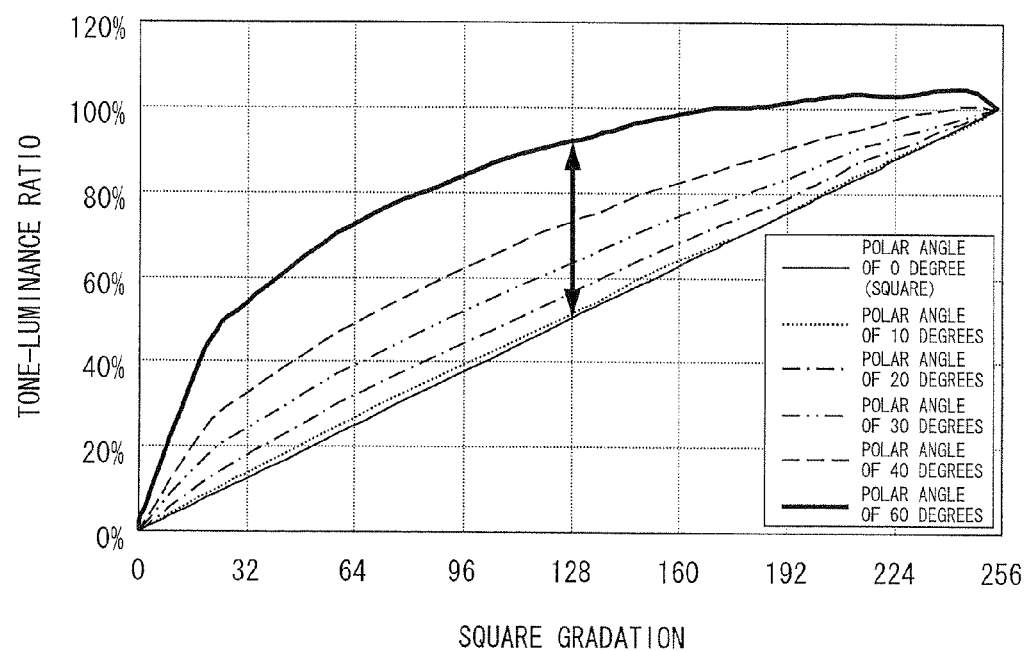

LIQUID-CRYSTAL PANEL AND LIQUID-CRYSTAL DISPLAY DEVICE

This application is the U.S. national phase of International Application No. PCT/JP2010/059721 filed 8 Jun. 2010 which designated the U.S. and claims priority to JP 2009-233418 filed 7 Oct. 2009, the entire contents of each of which are hereby incorporated by reference.

TECHNICAL FIELD

The present invention relates to liquid crystal panels and liquid crystal display devices and, more specifically, to (i) a liquid crystal panel in which transmission of light is controlled by applying a transverse electric field to a vertical alignment liquid crystal cell whose liquid crystal molecules are aligned along a direction perpendicular to the substrates when no voltage is applied and (ii) a liquid crystal display device including such a liquid crystal panel.

BACKGROUND ART

Among various display devices, liquid crystal display devices have such advantages as thinness, light weight, and low power consumption. For this reason, in recent years, liquid crystal display devices have been widely used instead of CRTs (cathode-ray tubes) in various fields of TVs (televisions), monitors, mobile devices such as cellular phones, etc.

A liquid crystal display device has its display system determined according to the way in which the liquid crystals are aligned within the liquid crystal cell. A liquid crystal display device of a conventionally known display system is an MVA mode liquid crystal display device. The MVA mode is a system under which a vertical electric field is applied by providing the electrodes of the active-matrix substrate with slits and providing the counter electrodes of the counter substrate with liquid crystal alignment controlling projections (ribs) so that the liquid crystals are aligned along multiple directions while controlling the alignment directions by using the ribs and the slits.

An MVA mode liquid crystal display device achieves a wide viewing angle by tilting the liquid crystal molecules along multiple directions when a voltage is applied. Further, since the MVA mode is a vertical alignment mode, the MVA mode can give higher contrast than a horizontal alignment mode such as an IPS (in-plain switching) mode. However, the MVA mode undesirably requires complex manufacturing steps.

In order to solve the processing problems with the MVA mode, a display system has been proposed (e.g., see Patent Literature 1) under which an electric field parallel to the substrate surfaces (so-called transverse electric field) is applied by using comb electrodes in a vertical alignment liquid crystal cell whose liquid crystal molecules are aligned along a direction perpendicular to the substrates when no voltage is applied.

The display system of Patent Literature 1 controls the direction of alignment of the liquid crystal molecules by driving with a transverse electric field while keeping the high-contrast characteristic based on vertical alignment. Unlike the MVA mode, the display system of Patent Literature 1 does not require control of alignment with use of projections, and as such, is simple in pixel configuration and has an excellent viewing angle characteristic.

CITATION LIST

Patent Literature 1

Japanese Patent Application Publication, Tokukaihei, No. 10-186351 A (Publication Date: Jul. 14, 1998)

Patent Literature 2

Japanese Patent Application Publication, Tokukai, No. 2002-23179 A (Publication Date: Jan. 23, 2002)

Patent Literature 3

Japanese Patent Application Publication, Tokukaihei, No. 10-133190 A (Publication Date: May 22, 1998)

Patent Literature 4

Japanese Patent Application Publication, Tokukai, No. 2000-193977 A (Publication Date: Jul. 14, 2000)

SUMMARY OF INVENTION

Technical Problem

However, such a conventional vertical alignment liquid crystal panel based on a transverse electric field drive system has such a problem that the color of white appears yellowish when the liquid crystal display element is looked squarely at.

The present invention has been made in view of the foregoing problems, and it is an object of the present invention to provide a vertical alignment liquid crystal panel, based on a transverse electric field drive system, which shows few changes in color when looked squarely at and a liquid crystal display device including such a liquid crystal panel.

Solution to Problem

In order to solve the foregoing problems, a liquid crystal panel according to the present invention is a liquid crystal panel including: a first substrate having at least first and second electrodes provided therein; a second substrate placed opposite the first substrate; and a liquid crystal layer sandwiched between the first substrate and the second substrate, the liquid crystal panel being a vertical alignment liquid crystal panel based on a transverse electric field drive system, in which the liquid crystal layer is driven by a transverse electric field generated between the electrodes provided in the first substrate and in which when no electric field is applied, liquid crystal molecules in the liquid crystal layer are aligned perpendicularly to the first and second substrates, at least either the first or second substrate being provided with a first insulating layer having at least two regions that are different in relative permittivity from each other in each pixel so that at least two regions that are different in shape of equipotential lines from each other are formed in the each pixel when the transverse electric field is generated, the each pixel being composed of a red subpixel, a green subpixel, and a blue subpixel, that region of the first insulating layer which corresponds to the blue subpixel having a relative permittivity of 3, that region of the first insulating layer which corresponds to the green subpixel having a relative permittivity of 3 to 7, that region of the first insulating layer which corresponds to the red subpixel having a relative permittivity of 4 to 7.

Further, in order to solve the foregoing problems, a liquid crystal panel according to the present invention is a liquid crystal panel including: a first substrate having at least first and second electrodes provided therein; a second substrate placed opposite the first substrate; and a liquid crystal layer sandwiched between the first substrate and the second substrate, the liquid crystal panel being a vertical alignment liquid crystal panel based on a transverse electric field drive system, in which the liquid crystal layer is driven by a transverse electric field generated between the electrodes provided in the first substrate and in which when no electric field is applied, liquid crystal molecules in the liquid crystal layer are aligned perpendicularly to the first and second substrates, at least either the first or second substrate being provided with an insulating layer, the liquid crystal layer having pixels each composed of a red subpixel, a green subpixel, and a blue subpixel, that region of the insulating layer which corresponds to the blue subpixel having a relative permittivity of 3, that region of the insulating layer which corresponds to the green subpixel having a relative permittivity of 3 to 7, that region of the insulating layer which corresponds to the red subpixel having a relative permittivity of 4 to 7.

According to each of the foregoing configurations, in such a vertical alignment liquid crystal panel based on a transverse electric field drive system, at least one of the first and second substrates is provided with an insulating layer, and those regions of the insulating layer (first insulating layer) which correspond to the blue, green, and red subpixels have the relative permittivities specified above, respectively; therefore, a tone reversal can be prevented and, moreover, VT (voltage-transmittance) curves obtained in the blue, green, and red subpixels can be made similar in shape to one another. For this reason, each of the foregoing configurations makes it possible to provide a liquid crystal panel that shows few changes in color as observed when the liquid crystal panel is looked squarely at.

Further, in a case where the liquid crystal panel includes, in each pixel, at least two regions of the insulating layer (first insulating layer) that are different in relative permittivity from each other, at least two regions that are different in shape of equipotential lines from each other are formed in each pixel when the transverse electric field is generated. Since, in this case, at least two regions that are different in alignment direction of liquid crystal molecules from each other are formed in each pixel, regions having different VT curves can be formed in each pixel. This makes it possible, as a result, to subject the liquid crystal panel to VT multiplication and improve the viewing angle characteristic of the liquid crystal panel. Specifically, for example, excess brightness as observed from an oblique angle can be reduced.

Further, according to each of the foregoing configurations, VT multiplication can be easily carried out simply by partially changing the relative permittivity of the insulating layer (first insulating layer).

Therefore, as described above, in case where the liquid crystal panel includes, in each pixel, at least two regions of the insulating layer (first insulating layer) that are different in relative permittivity from each other, a liquid crystal panel can be provided which shows few changes in color when looked squarely at, which has an excellent viewing angle characteristic, and which can be manufactured through simple steps.

Moreover, since the liquid crystal panel is a vertical alignment liquid crystal panel based on a transverse electric field drive system ad such a liquid crystal panel has a arched (bent) liquid crystal alignment distribution formed within the cell when a transverse electric field is applied, it is possible to achieve high-speed response based on bend alignment, a wide viewing angle based on a self-compensating array, and high contrast based on vertical alignment.

Further, a liquid crystal display device according to the present invention includes such a liquid crystal panel according to the present invention.

According to the foregoing configuration, the liquid crystal display device includes the liquid crystal panel, thereby providing a liquid crystal display device that shows few changes in color when the liquid crystal display device is looked squarely at.

Advantageous Effects of Invention

A liquid crystal panel and a liquid crystal panel according to the present invention are each configured such that in such a vertical alignment liquid crystal panel based on a transverse electric field drive system, at least one of the first and second substrates is provided with an insulating layer, and those regions of the insulating layer (first insulating layer) which correspond to the blue, green, and red subpixels have the relative permittivities specified above, respectively; therefore, a tone reversal can be prevented and, moreover, VT (voltage-transmittance) curves obtained in the blue, green, and red subpixels can be made similar in shape to one another. For this reason, the present invention makes it possible to provide a liquid crystal panel that shows few changes in color as observed when the liquid crystal panel is looked squarely at.

Further, in a case where the liquid crystal panel includes, in each pixel, at least two regions of the insulating layer (first insulating layer) that are different in relative permittivity from each other, at least two regions that are different in shape of equipotential lines from each other are formed in each pixel when the transverse electric field is generated. Since, in this case, at least two regions that are different in alignment direction of liquid crystal molecules from each other are formed in each pixel, regions having different VT curves can be formed in each pixel. This makes it possible, as a result, to subject the liquid crystal panel to VT multiplication and improve the viewing angle characteristic of the liquid crystal panel.

Therefore, as described above, in case where the liquid crystal panel includes, in each pixel, at least two regions of the insulating layer (first insulating layer) that are different in relative permittivity from each other, a liquid crystal panel can be provided which shows few changes in color when looked squarely at, which has an excellent viewing angle characteristic, and which can be manufactured through simple steps.

BRIEF DESCRIPTION OF DRAWINGS

FIG. 1 is a cross-sectional view schematically showing a configuration of a main part of a liquid crystal panel according to Embodiment 1 of the present invention.

FIG. 2

FIG. 2 is a plan view showing a relationship between comb electrodes of the liquid crystal panel shown in FIG. 1 and electric field regions that are different in shape of equipotential lines.

FIG. 3 is a cross-sectional view schematically showing a configuration of a liquid crystal display device according to Embodiment 1 of the present invention.

FIG. 4 is a cross-sectional view schematically showing a configuration of a main part of a comparative liquid crystal panel.

FIG. 5 is a cross-sectional view schematically showing a configuration of a main part of another comparative liquid crystal panel.

FIG. 6

FIG. 6 is a diagram showing a distribution of fields within a liquid crystal cell of the liquid crystal panel according to Embodiment 1 of the present invention and a distribution of liquid crystal directors within the liquid crystal cell.

FIG. 7

FIG. 7 is a diagram showing a distribution of fields within a liquid crystal cell of the liquid crystal panel shown in FIG. 4 and a distribution of liquid crystal directors within the liquid crystal cell.

FIG. 8 is a set of diagrams (a) through (c) showing relationships between the orientation of the director of a liquid crystal molecule and directions in which light beams travel, with different voltages applied to the liquid crystal molecule, respectively, (a) showing a relationship between the orientation of the director of the liquid crystal molecule and directions in light beams travel, with no voltage being applied to the liquid crystal molecule, (b) showing a relationship between the orientation of the director of the liquid crystal molecule and directions in light beams travel, with an intermediate voltage being applied to the liquid crystal molecule, (c) showing a relationship between the orientation of the director of the liquid crystal molecule and directions in light beams travel, with a normal voltage being applied to the liquid crystal molecule.

FIG. 9 is a set of diagrams (a) through (c) each showing a relationship between the orientation of the director of a liquid crystal molecule and a direction in which a light beam travels, with an intermediate voltage being applied to the liquid crystal molecule, (a) showing a relationship between the orientation of the director of a liquid crystal molecule in a first electric field region in the liquid crystal panel according to Embodiment 1 of the present invention and a direction in which a light beam travels, with an intermediate voltage being applied to the liquid crystal molecule, (b) showing a relationship between the orientation of the director of a liquid crystal molecule in a second electric field region in the liquid crystal panel according to Embodiment 1 of the present invention and a direction in which a light beam travels, with an intermediate voltage being applied to the liquid crystal molecule, (c) showing a relationship between the orientation of the director of a liquid crystal molecule in a first electric field region in the liquid crystal panel used in Comparative Example 1 and a direction in which a light beam travels, with an intermediate voltage being applied to the liquid crystal molecule.

FIG. 10

FIG. 10 is a graph showing (i) VT curves obtained in the electric field regions in the liquid crystal panel according Embodiment 1 of the present invention by using two types of insulating material that are different in relative permittivity from each other, respectively, and (ii) a VT curve obtained by combining these VT curves, as observed when the liquid crystal panel is looked squarely at.

FIG. 11

FIG. 11 is a graph showing oblique gradations with respect to a square gradation of the liquid crystal panel according to Embodiment 1 of the present invention.

FIG. 12 is a graph showing oblique gradations with respect to a square gradation of the liquid crystal panel shown in FIG. 4.

FIG. 13 is a graph showing VT curves obtained by varying relative permittivity from one insulating material to another in the liquid crystal panel according to Embodiment 1 of the present invention.

FIG. 14

FIG. 14 is a graph showing oblique tone-luminance ratios with respect to the square gradation in the liquid crystal panel according to Embodiment 1 of the present invention.

FIG. 15 is a graph showing VT curves obtained by varying the relative permittivity of an insulating layer in a blue subpixel of the liquid crystal panel according to Embodiment 1 of the present invention.

FIG. 16 is a graph showing VT curves obtained by varying the relative permittivity of an insulating layer in a green subpixel of the liquid crystal panel according to Embodiment 1 of the present invention.

FIG. 17

FIG. 17 is a graph showing VT curves obtained by varying the relative permittivity of an insulating layer in a red subpixel of the liquid crystal panel according to Embodiment 1 of the present invention.

FIG. 18 is a graph showing white-state VT curves obtained by combining R, G, and B VT curves as observed from a square angle.

FIG. 19

FIG. 19 is a graph showing VT curves obtained by varying relative permittivity in a subpixel of each color.

FIG. 20

FIG. 20 is a graph showing VT curves against normalized transmittance that rise in identical shapes to a VT curve representing a blue subpixel with a relative permittivity of 3, with varying relative permittivity in an insulating layer in a subpixel of each color.

FIG. 21

FIG. 21 is a cross-sectional view schematically showing a configuration of a main part of a liquid crystal panel according to Embodiment 2 of the present invention.

FIG. 22

FIG. 22 is a graph showing oblique tone-luminance ratios with respect to a square gradation in the liquid crystal panel according to Embodiment 2 of the present invention.

FIG. 23 is a cross-sectional view schematically showing a configuration of a main part of a liquid crystal panel according to Embodiment 3 of the present invention.

FIG. 24

FIG. 24 is a graph showing oblique tone-luminance ratios with respect to a square gradation in the liquid crystal panel according to Embodiment 3 of the present invention.

FIG. 25 is a cross-sectional view schematically showing a configuration of a main part of a conventional vertical alignment liquid crystal panel based on a transverse electric field drive system.

FIG. 26 shows VT curves obtained in subpixels in the conventional vertical alignment liquid crystal panel based on a transverse electric field drive system shown in FIG. 25, when the liquid crystal panel is looked squarely at.

FIG. 27 is a graph showing oblique tone-luminance ratios with respect to a square gradation in the liquid crystal panel shown in FIG. 25.

FIG. 28 is a plan view schematically showing a configuration of a main part of a liquid crystal display device described in Patent Literature 2.

FIG. 29 is a cross-sectional view schematically showing a configuration of a main part of a liquid crystal display device described in Patent Literature 3.

FIG. 30 is a set of cross-sectional views (a) and (b) each schematically showing a configuration of a main part of a liquid crystal display device described in Patent Literature 4.

FIG. 31 is another cross-sectional view schematically showing a configuration of a main part of a liquid crystal display device described in Patent Literature 4.

DESCRIPTION OF EMBODIMENTS

In order to suppress a change in color that occurs in a vertical alignment liquid crystal panel based on a transverse electric field drive system when the liquid crystal panel is looked squarely at, the inventors first investigated the causes of such a change in color.

Accordingly, prior to a description of the present invention, a configuration of a conventional vertical alignment liquid crystal panel 300 based on a transverse electric field drive system is first schematically described below with reference to FIG. 25.

[Liquid Crystal Panel 300]

Figure 25:
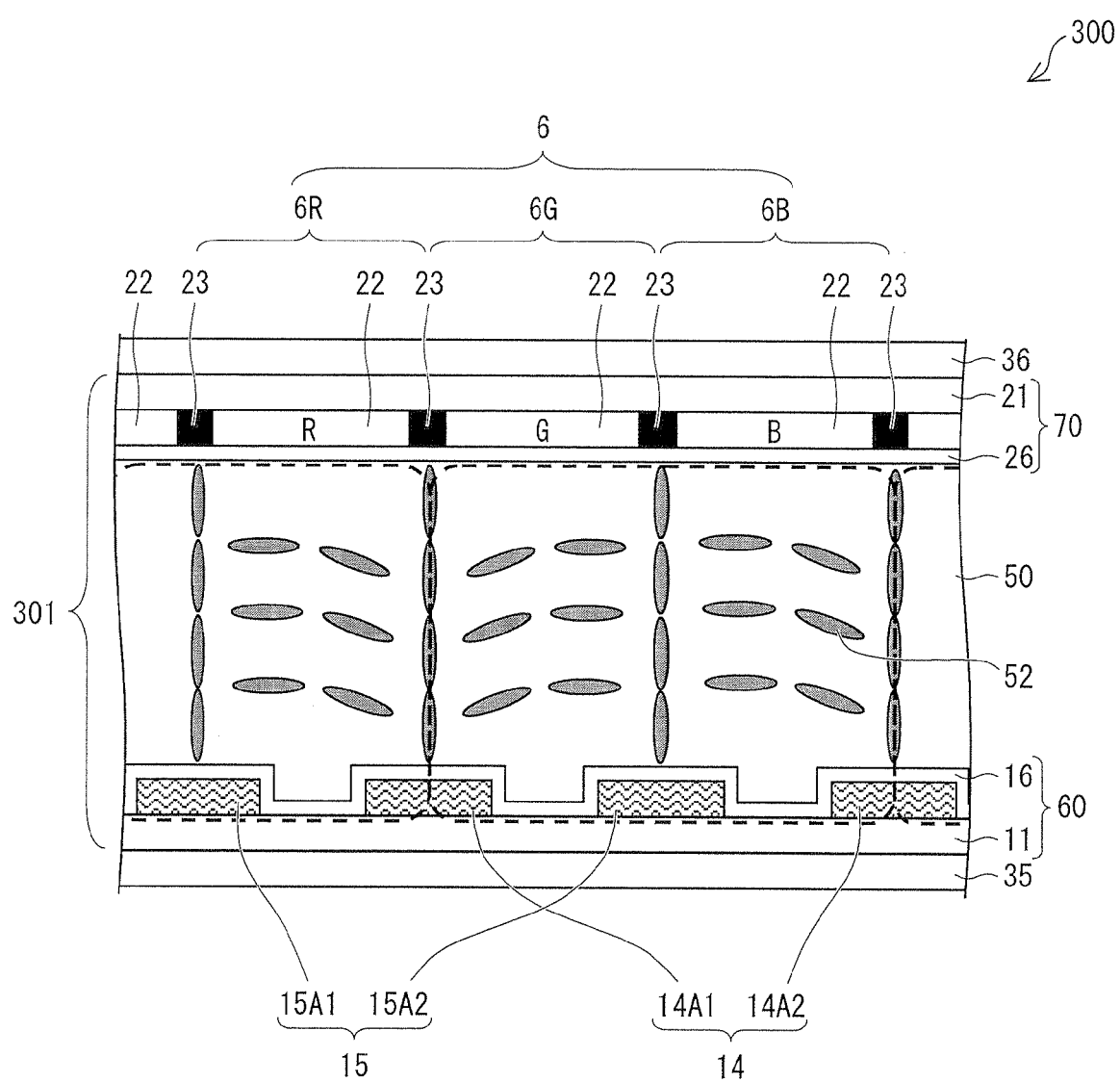
FIG. 25

FIG. 25 is a cross-sectional view schematically showing a configuration of a main part of a conventional vertical alignment liquid crystal panel 300 based on a transverse electric field drive system.

As shown in FIG. 25, the liquid crystal panel 300 includes a substrate 60 (array substrate), a substrate 70 (counter substrate), and a liquid crystal layer 50 sandwiched between the substrate 60 and the substrate 70.

The substrate 60 includes a glass substrate 11, comb electrodes 14 and 15 stacked on the glass substrate 11, and an alignment film 16 stacked on the glass substrate 11 and the comb electrodes 14 and 15.

The comb electrodes 14 and 15 have their branch electrodes 14A (14A1, 14A2, ... 14Am, where m is an integer of 1 or greater) and branch electrodes 15A (15A1, 15A2, ... 15An, where n is an integer of 1 or greater) disposed alternately in such a manner as to engage with one another. It should be noted here that the branch electrodes 14A and 15A are equivalent to the teeth of combs.

The comb electrode 14 (first electrode), which is one of the comb electrodes 14 and 15, is a common electrode, and the other comb electrode 15 (second electrode) is a pixel electrode.

Further, the alignment film 16 is a vertical alignment film that causes the liquid crystal molecules of the liquid crystal layer to be aligned perpendicularly to the substrate surfaces when no voltage is applied. The alignment film 16 is provided on the glass substrate 11 in such a manner as to cover the comb electrodes 14 and 15.

Further, the substrate 70 includes a glass substrate 21, R (red), G (green), and B (blue) color filters 22 stacked on the glass substrate 21, a black matrix 23 stacked on the glass substrate 21, and an alignment film 26 stacked on the color filters 22 and the black matrix 23.

Each pixel 6 (i.e., a single pixel) is constituted by three subpixels, namely R, G, and B subpixels 6R, 6G, and 6B (dots). As shown in FIG. 25, the subpixels 6R, 6G, and 6B are provided with the R, G, and B color filters 22, which transmit R, G, and B lights at the respective wavelengths.

The following gives a specific description of a method for manufacturing a liquid crystal panel 300 used for verification.

First, as shown in FIG. 25, comb electrodes 14 and 15 of ITO 1000 Å in thickness and 4 μm in electrode width L were formed at an interelectrode space S of 4 μm from each other on a glass substrate 11.

Next, alignment film paint (γ-butyrolactone solution marketed as "JALS-204" with a solid content of 5% by weight) manufactured by JSR Corporation was applied onto the glass substrate 11 by spin coating in such a manner as to cover the comb electrodes 14 and 15. After that, by sintering for two hour at 200° C., a substrate 60 was formed which had a surface that would face a liquid crystal layer 50 and which had an alignment film 16 provided as a vertical alignment film on that surface.

Meanwhile, color filters 22 and a black matrix 23, each 1.2 μm in thickness, were formed on a glass substrate 21 in the usual manner. Next, a vertical alignment film was formed as an alignment film 26 on the color filters 22 and the black matrix 23 by using the same material and the same process as those used to form the alignment film 16. Thus formed was a substrate 70 in which the color filters 22 and the black matrix 23 were stacked on the glass substrate 21 and the alignment film 26 was stacked on the color filters 22 and the black matrix 23. Further, the alignment films 16 and 26 thus formed each had a dry film thickness of 1000 Å (=0.1 μm).

After that, resin beads 3.25 μm in diameter (marketed as "Micropearl SP20325"; manufactured by Sekisui Chemical Co., Ltd.) were dispersed as spacers onto one of the substrates 60 and 70. Meanwhile, a sealing resin (marketed as "Structbond XN-21S"; manufactured by Mitsui Toatsu Chemicals, Inc.) was printed as a sealing agent on the other substrate that faced the above substrate.

Next, the substrates 60 and 70 were joined together and sintered for one hour at 135° C.

After that, a positive liquid crystal material ($\Delta\epsilon=20$, $\Delta n=0.15$) manufactured by Merck & Co., Inc was encapsulated as a liquid crystal material in a space between the substrates 60 and 70 by a vacuum injection method, whereby a liquid crystal cell 301 was fabricated in which the liquid crystal layer 50 was sandwiched between the pair of substrates 60 and 70.

Then, polarizing plates 35 and 36 were joined on the front and back surfaces of the liquid crystal cell 301 so that the transmission axes of the polarizing plates 35 and 36 were orthogonal to each other and the direction of extension of the respective branch electrodes 14A and 15A of the comb electrodes 14 and 15 and the transmission axes of the polarizing plates 35 and 36 form an angle of 45 degrees. In this manner, the liquid crystal panel 300 shown in FIG. 25 was fabricated.

Figure 26:
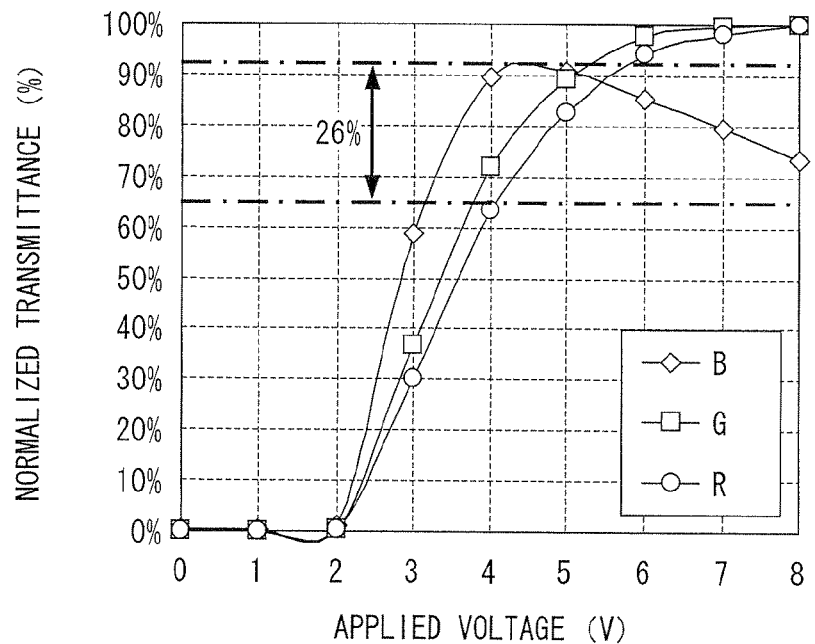
FIG. 26

FIG. 26 shows VT curves obtained in the subpixels 6R, 6G, and 6B in the conventional vertical alignment liquid crystal panel 300 based on a transverse electric field drive system shown in FIG. 25, when the liquid crystal panel 300 is looked squarely at (from a polar angle of 0 degree). In FIG. 26, the horizontal axis represents applied voltage, and the vertical axis represents normalized transmittance (transmittance ratio) obtained by normalizing transmittance.

Further, Table 1 shows a relationship between the applied voltage and the normalized transmittance in the subpixels 6R, 6G, and 6B as shown in FIG. 26.

TABLE 1

|  |  | Transmittance | | |
|---|---|---|---|---|
|  |  | B | G | R |
| Applied | 0 V | 1% | 0% | 0% |
| voltage | 1 V | 1% | 0% | 0% |

TABLE 1-continued

| | Transmittance | | |
|---|---|---|---|
| | B | G | R |
| 2 V | 1% | 0% | 0% |
| 3 V | 59% | 37% | 30% |
| 4 V | 89% | 72% | 63% |
| 5 V | 91% | 89% | 83% |
| 6 V | 85% | 98% | 94% |
| 7 V | 80% | 100% | 98% |
| 8 V | 73% | 100% | 100% |

As shown in FIG. 26, while the VT curves obtained in the R (red) subpixel 6R and the G (green) subpixel 6G are identical in shape to each other, the VT curve obtained in the B (blue) subpixel 6B reaches its maximum value at a lower voltage than those obtained in the subpixels 6R and 6G and then turns down to a lower level than those obtained in the subpixels 6R and 6G.

For this reason, in the liquid crystal panel 300, the color of white, which is made by mixing the three colors of R, G, and B, appears yellowish due to a decrease in the B component (blue component). This is the reason why such a change in color occurs in the vertical alignment liquid crystal panel 300 based on a transverse electric field drive system when the liquid crystal panel 300 is looked squarely at.

Therefore, in order to prevent a change in color from occurring as a result of the application of voltage, it is desirable that the VT curves obtained in the subpixels 6R, 6G, and 6B be identical in shape to one another.

Accordingly, in order to make the VT curves obtained in the R, G, and B subpixels 6R, 6G, and 6B uniform in shape, the inventors first attempted to partially change a V-T characteristic in a driven pixel to give the driven pixel two or more different V-T characteristics (hereinafter referred to as "VT multiplication").

Among various display devices, liquid crystal display devices have such advantages as thinness, light weight, and low power consumption, but have such problems as narrow viewing angle characteristics. A possible reason for this is that liquid crystal display devices vary in display characteristic depending on viewing angles.

A liquid crystal display device carries out a display by applying an electric field to the liquid crystal layer so that the liquid crystal molecules in the liquid crystal cell move (rotate) and thereby controlling the amount of light that travels through the liquid crystal cell. However, since the liquid crystal molecules are rod-shaped, they vary in birefringent state, for example, between a case where the liquid crystal panel of the liquid crystal display device is looked squarely at and a case where the liquid crystal panel is looked obliquely at. For this reason, V (voltage)-T (transmittance) characteristics vary depending on viewing angles.

This results in such a problem that there occurs an excess brightness phenomenon, for example, as observed from an oblique angle so that the content of a display on the liquid crystal panel becomes hard to look at from an oblique angle. It should be noted that the term "excess brightness phenomenon as observed from an oblique angle" means a phenomenon (excess luminance) where the transmittance as observed from an oblique angle in a black display during the application of voltage is not sufficiently low, so that the display appears excessively bright.

In order to solve such problems, some technologies have recently been proposed for improving a viewing angle characteristic by averaging, through VT multiplication, V-T mismatches between a case where the liquid crystal panel is looked squarely at and a case where the liquid crystal panel is looked obliquely at (e.g., see Patent Literatures 2 to 4).

Figure 28:
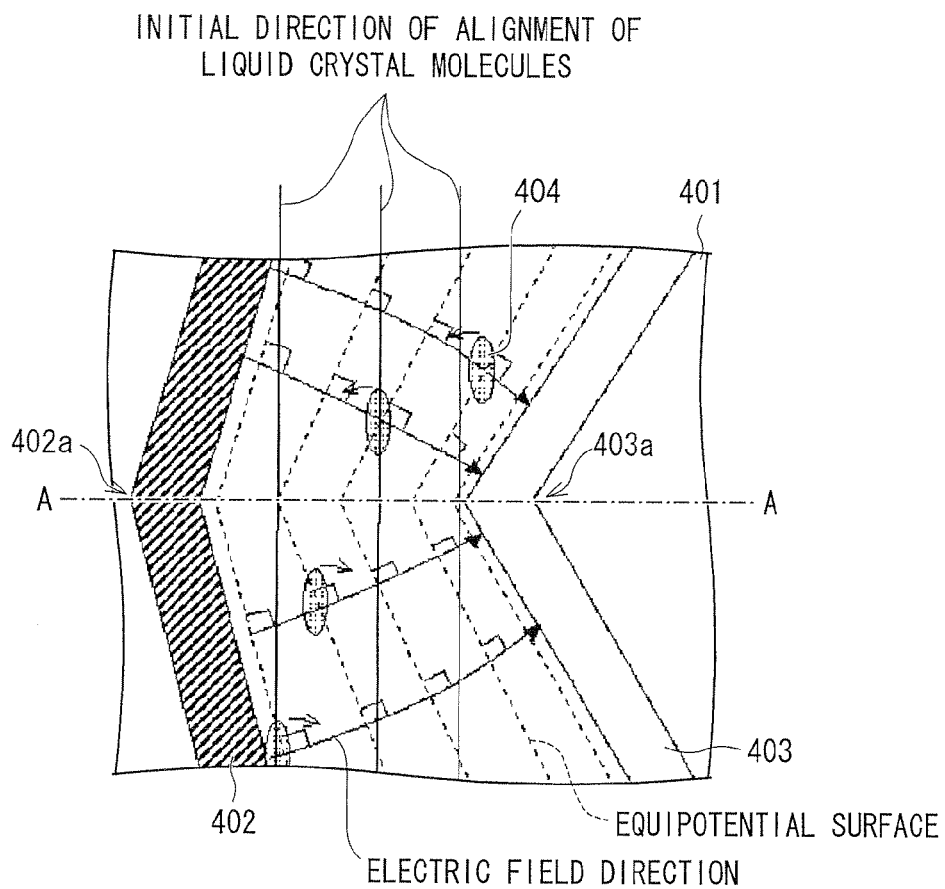
FIG. 28

FIG. 28 is a plan view schematically showing a configuration of a main part of a liquid crystal display device described in Patent Literature 2.

As shown in FIG. 28, the liquid crystal display device described in Patent Literature 2 is a horizontal-alignment and transverse-electric-field-driven liquid crystal display device, such as an IPS mode, which carries out a display by applying, to a horizontal alignment liquid crystal cell whose liquid crystal molecules 404 are aligned along a direction parallel to the substrate surfaces when no voltage is applied, a transverse electric filed that is generated between drive electrodes 402 and 403 (a pixel electrode and a common electrode) provided on a substrate 401.

When, in such a horizontal-alignment and transverse-electric-field-driven liquid crystal display device, VT multiplication is carried out by providing the drive electrodes 402 and 403 with bend sections 402a and 403a and forming the drive electrodes so that the shapes of the drive electrodes are symmetrical about a line A-A connecting the bend sections 402a and 403a, electric fields are generated in different directions in two regions between the drive electrodes divided by the line A-A.

For this reason, when, in such a horizontal-alignment and transverse-electric-field-driven liquid crystal display device, the drive electrodes are provided with the bend sections 402a and 403a as described above, the two regions are given different colors as observed from an oblique angle in a white display state, and the different colors compensate for each other, so that a reduction in coloring is achieved.

However, in such a liquid crystal display device, it is necessary to form the drive electrodes 402 and 403 in such a manner that the aperture ratio of a pixel region is kept high. For this reason, the electrodes cannot be formed close to each other, and the application of a low voltage results in a small electric field; therefore, it takes time to respond.

In view of this, Patent Literature 2 gradually changes the interelectrode space between the drive electrodes 402 and 403 within the pixel by further making the drive elements 402 and 403 different in bending angle from each other as shown in FIG. 28 and thereby gradually changes the ratio of the width of each of the electrodes to the interelectrode space within the pixel.

By so doing, Patent Literature 2 achieves a reduction in coloring as observed from an oblique angle, and at the same time, achieves an improvement in response in a halftone display by causing the application of a high voltage to result in great field intensity in a part where the interelectrode space is wide and by causing a large electric field to be applied with a low voltage in a part where the interelectrode space is narrow.

However, the method described in Patent Literature 2 causes a decrease in aperture ratio because an increase in angle difference leads to an increase in the amount of space that is occupied by the drive electrodes within the pixel. For this reason, such a method for carrying out VT multiplication by providing the drive electrodes 402 and 403 with the bend sections 402a and 403a as in Patent Literature 2 is greatly restricted by the aperture ratio anyway.

Figure 29:
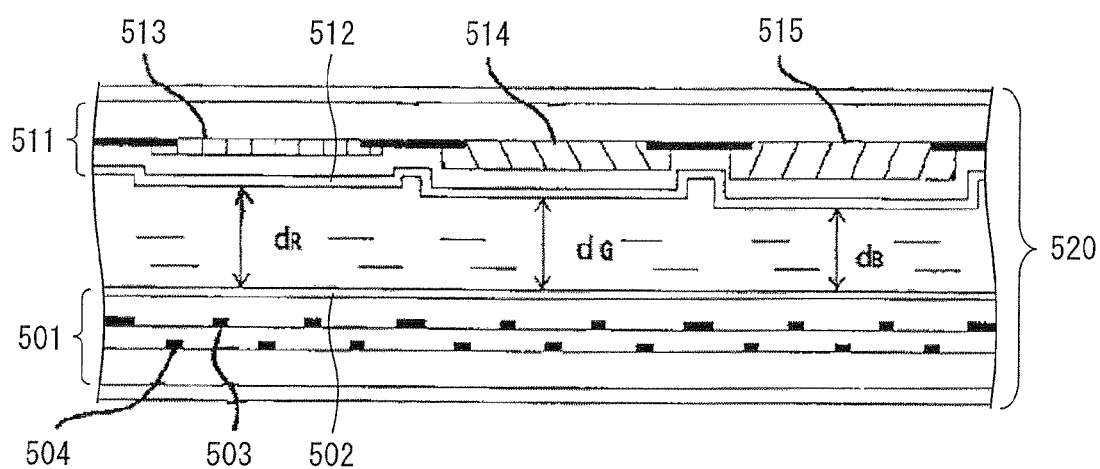
FIG. 29

FIG. 29 is a cross-sectional view schematically showing a configuration of a main part of a liquid crystal display device described in Patent Literature 3.

As shown in FIG. 29, the liquid crystal display device described in Patent Literature 3 is a horizontal-alignment and transverse-electric-field-driven liquid crystal display device which includes a horizontal alignment liquid crystal cell 520 whose pair of substrates 501 and 511 have alignment films 502 and 512 that are identical in rubbing direction to each other and which carries out a display by applying, to the liquid crystal cell 520, a transverse electric filed that is generated between a pixel electrode 503 and a common electrode 504 that are provided on the substrate 501.

Patent Literature 3 discloses that a liquid crystal display device that is completely free of coloring regardless of which angle it is looked at from can be achieved through carrying out VT multiplication by, as shown in FIG. 29, providing the other substrate 511 with R (red), G (green), and B (blue) color layers 513 to 515 that transmit different wavelengths from one another and varying cell thicknesses dR, dG, and dB from one another within the pixel according to the wavelengths that the color layers 513 to 515 transmit.

However, as mentioned above, the technology described in Patent Literature 3 makes it necessary to vary the cell thicknesses dR, dG, and dB from one another within the pixel according to the wavelengths that the color layers 513 to 515 transmit. This imposes strict technical constraints on cell thickness setting and, furthermore, complicates the manufacturing processes.

Figure 30:
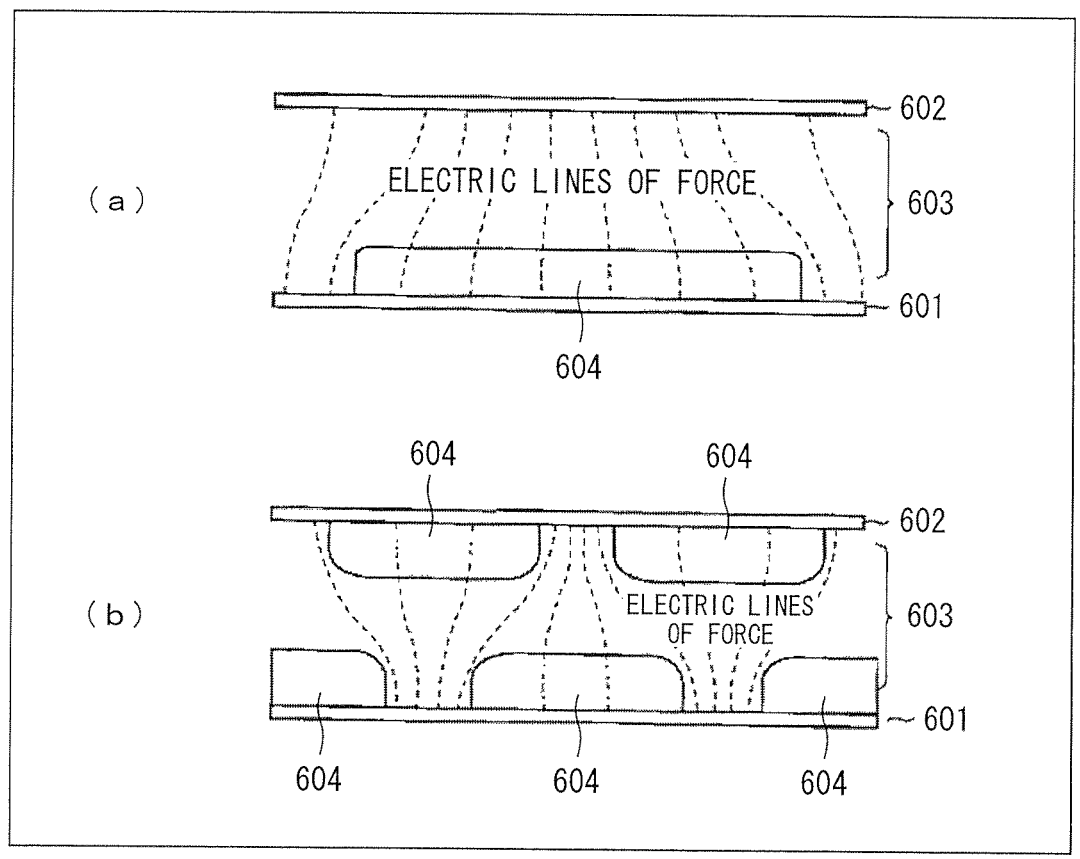
FIG. 30
Figure 31:
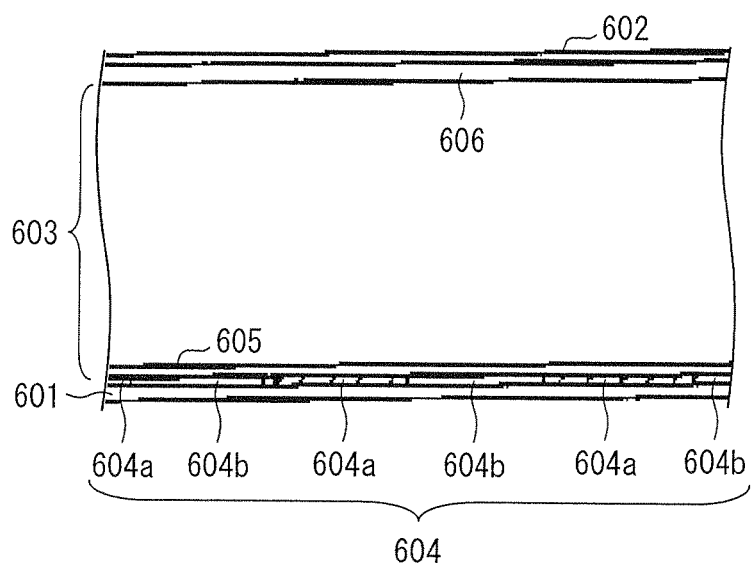
FIG. 31

(a) and (b) of FIG. 30 and FIG. 31 are cross-sectional views each schematically showing a configuration of a main part of a liquid crystal display device described in Patent Literature 4.

As shown in (a) and (b) of FIG. 30 and FIG. 31, the liquid crystal display device described in Patent Literature 4 is a longitudinal-electric-field-driven (vertical-alignment and longitudinal-electric-field-driven or horizontal-alignment and transverse-electric-field-driven) liquid crystal display device that carries out a display by applying, to a liquid crystal layer 603 sandwiched between a pair of substrates (not illustrated) provided with drive electrodes 601 and 602 respectively, a longitudinal electric field that is generated between the drive electrodes 601 and 602.

In the example shown in (a) of FIG. 30, VT multiplication is carried out by providing an insulating layer 604 on the drive electrode 601 of one of the pair of substrates. Further, in the example shown in (b) of FIG. 30, VT multiplication is carried out by providing insulating layers 604 on the drive electrodes 601 and 602 provided on the substrates, respectively.

According to Patent Literature 4, when, in such a longitudinal-electric-field-driven liquid crystal display device as those shown in (a) and (b) of FIG. 30 and FIG. 31, an insulating layer 604 that aims an applied longitudinal electric field into different directions in the pixel region is provided on at least either of the drive electrodes, the insulating layer 604 causes electric lines of force to be inclined from the perpendicular to the drive electrodes 601 and 602, for example, as indicated by dotted lines in (a) and (b) of FIG. 30.

Furthermore, in the example shown in FIG. 31, VT multiplication is carried out by evenly forming an insulating layer 604 on the drive electrode 601 of one of the pair of substrates and then irradiating a region 604a of the insulating layer 604 with ultraviolet rays so that the region 604 irradiated with ultraviolet rays is lower in relative permittivity than a region 604b not irradiated with ultraviolet rays ($\varepsilon > 3$). It should be noted that the example shown in FIG. 31 has vertical alignment films 605 and 606 provided on the insulating layer 604 and the other drive electrode 602, respectively.

However, the technologies shown in (a) and (b) of FIG. 30 bring about effects in a VA mode in which electric field driving is carried out in a vertical direction.

Meanwhile, the inventors verified the technology described in FIG. 31 for its viewing angle characteristic by using a vertical alignment (VA) type of vertical electric field liquid crystal panel 200 shown later in FIG. 5. As a result of the verification, the inventors were not able to sufficiently improve the viewing angle characteristic.

Therefore, although studies have conventionally been carried out on VT multiplication in various display systems, a liquid crystal panel which shows little excess brightness when looked at from an oblique angle, which has an excellent viewing angle characteristic, which does not require a special change in cell thickness or special design of drive electrodes, and which can be manufactured through simple steps and a liquid crystal display device including such a liquid crystal panel are yet to be known, let alone the object of the present invention, i.e., suppression of changes in color as observed in front of a vertical alignment liquid crystal panel based on a transverse electric field drive system and a liquid crystal display device including such a liquid crystal panel.

Accordingly, the inventors made it a primary object to provide a vertical alignment liquid crystal panel, based on a transverse electric field drive system, which shows few changes in color when looked squarely at and a liquid crystal display device including such a liquid crystal panel. Furthermore, in addiction to a reduction in change in color as observed from a square angle, the inventors diligently studied a liquid crystal panel which shows little excess brightness when looked at from an oblique angle, which has an excellent viewing angle characteristic, which does not require a special change in cell thickness or special design of drive electrodes, and which can be manufactured through simple steps and a liquid crystal display device including such a liquid crystal panel.

That is, the yellowish change in color tone as observed when the liquid crystal panel is looked squarely at is due to the difference in VT curve among the colors. In order to solve this problem, VT multiplication needs to be carried out. Further, VT multiplication is also effective in suppressing excess brightness as observed from an oblique angle.

Accordingly, as a result of their diligent study, the inventors found that a liquid crystal panel which shows no excess brightness when looked obliquely at, which is capable of high-speed response, and which can be manufactured through simple steps can be achieved by providing, in each pixel of a vertical alignment liquid crystal panel based on a transverse electric field drive system, at least two regions constituted by insulating layers that are different in relative permittivity from each other.

As mentioned above, Patent Literature 4 discloses that VT multiplication of a VA type of liquid crystal display device is made possible by providing an insulating layer with regions that are different in relative permittivity from each other. However, this does not allow a sufficient improvement in viewing angle characteristic to be expected from a VA type of liquid crystal display device.

However, as a result of their further diligent study, the inventors found, surprisingly, that providing at least either of the substrates with an insulating layer in a vertical alignment liquid crystal panel based on a transverse electric field drive system, partially changing the relative permittivity of the insulating layer, and providing, in each pixel, at least two regions that are different in relative permittivity from each other not only make it possible to easily carry out VT multiplication, but also sufficiently suppress excess brightness as observed from an oblique angle.

When, in such a vertical alignment liquid crystal panel based on a transverse electric field drive system, at least two regions constituted by insulating layers that are different in relative permittivity from each other are provided in each pixel, equipotential lines that are different in shape from each other are formed in the regions corresponding to the respective insulating layers in the liquid crystal panel, whereby the condition of electric fields in the pixel is partially changes and at least two electric field regions having different voltage-transmittance curves (hereafter referred to as "VT curves") are formed in the pixel. Thus, sufficient suppression of excess brightness as observed from an oblique angle is achieved through simple steps.

Moreover, since a vertical alignment liquid crystal panel based on a transverse electric field drive system has a arched (bent) liquid crystal alignment distribution formed within the cell when an electric field is applied, it is possible to achieve high-speed response based on bend alignment, a wide viewing angle based on a self-compensating array, and high contrast based on vertical alignment.

However, the color change problem cannot be solved simply by carrying out VT multiplication as described above.

Accordingly, the inventors further diligently studied to reduce the yellowish change in color tone as observed when the liquid crystal panel is looked squarely at.

As a result, the inventors found that the color as observed when the liquid crystal panel is looked squarely at can be adjusted by combining the relative permittivities of the insulating layers in the subpixels of the respective colors so that the VT curves of the respective colors are similar in shape to one another, thus accomplishing the present invention.

That is, the inventors found that providing at least either of the pair of substrates with an insulating layer in a vertical alignment liquid crystal panel based on a transverse electric field drive system and setting the relative permittivities of the insulating layers in the subpixels of the respective colors within particular ranges prevent a tone reversal and, furthermore, cause the VT curves obtained in the respective subpixels to be similar in shape to one another, and that as a result, a liquid crystal panel can be provided which shows few changes in color when looked squarely at.

Further, assuming that the sole problem to be solved is a change in color, the inventors also found that in a case where the liquid crystal panel has an insulating layer whose relative permittivity ∈ is 3, it is not indispensable for the insulating layer to have, in the subpixels of the respective colors, regions that are different in relative permittivity ∈ from one another.

That is, it was found that in order to prevent a change in color from occurring as a result of the application of voltage, it is only necessary that a tone reversal be prevented and that the VT curves obtained in the R, G, and B subpixels 6R, 6G, and 6B be similar in shape (or, desirably, be identical in shape) to one another.

Further, the inventors found that a liquid crystal panel which shows few changes in color when looked squarely at, which has an excellent viewing angle characteristic, and which can be manufactured through simple steps can be provided through carrying out VT multiplication by providing at least two regions, constituted by insulating layers that are different in relative permittivity from each other, in each pixel, composed of a plurality of subpixels having color filters of the respective colors, of a vertical alignment liquid crystal panel based on a transverse electric field drive system and thereby providing at least two regions that are different in shape of equipotential lines from each other and through setting the relative permittivities of the insulating layers in the subpixels of the respective colors so that the VT curves of the respective colors are similar in shape to one another.

The following describes embodiments of the present invention in detail.

[Embodiment 1]

An embodiment of the present invention is described below with reference to FIGS. 1 through 20.

First, a configuration of a liquid crystal panel according to the present embodiment and a configuration of a liquid crystal display device according to the present embodiment are schematically described below.

Figure 3:
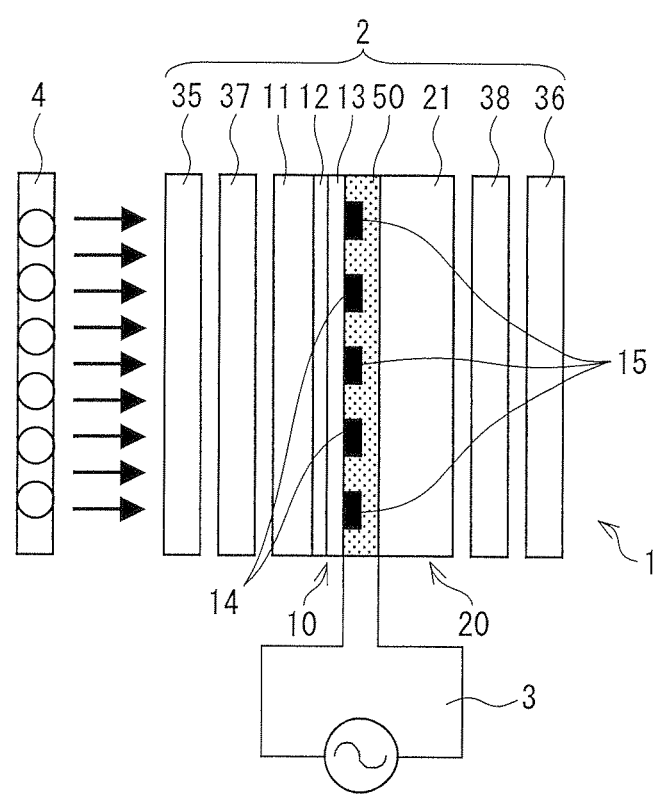
FIG. 3

FIG. 3 is a cross-sectional view schematically showing a configuration of a liquid crystal display device according to the present embodiment.

As shown in FIG. 3, a liquid crystal display device 1 according to the present embodiment includes a liquid crystal panel 2 (liquid crystal display panel, liquid crystal display element), a driving circuit 3, and a backlight 4 (lighting device). The driving circuit 3 and the backlight 4 are configured in the same manners as their conventional counterparts. Therefore, their configurations are not described below.

Figure 1:
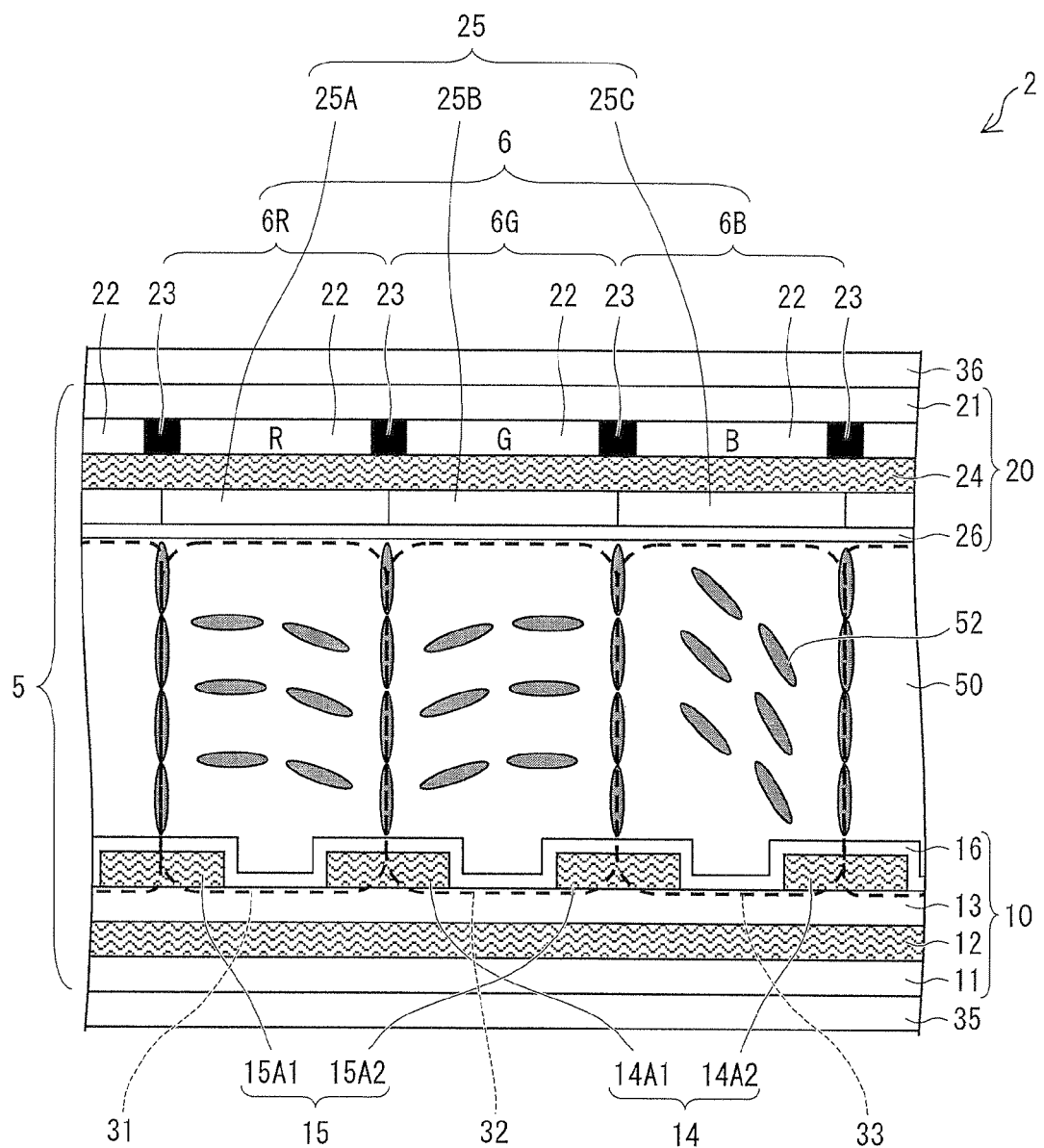
FIG. 1

FIG. 1 is a cross-sectional view schematically showing a configuration of a main part of the liquid crystal panel 2. FIG. 2 is a plan view showing a relationship between comb electrodes of the liquid crystal panel 2 and electric field regions that are different in shape of equipotential lines.

The liquid crystal panel 2 according to the present embodiment is a vertical alignment liquid crystal panel based on a transverse electric field drive system.

As shown in FIGS. 1 and 3, the liquid crystal panel 2 according to the present embodiment includes a liquid crystal cell 5, polarizing plates 35 and 36, and, as needed, wave plates 37 and 38.

The liquid crystal cell 5 includes: a pair of substrates 10 and 20 placed opposite each other to serve as an array substrate and a counter substrate; and a liquid crystal layer 50 sandwiched between the pair of substrates 10 and 20.

Further, at least either of the pair of substrates 10 and (i.e., at least the viewer's side substrate) includes a transparent substrate, such as a glass substrate, serving as an insulating substrate (liquid crystal layer retaining member, base substrate). In the following, the present embodiment is described by taking, as an example, a case where the insulating substrate used is a glass substrate. However, the present embodiment is not to be limited to such an example.

As the substrates 10 and 20, an array substrate such as a TFT (thin-film transistor) substrate and a CF (color filter) substrate or the like can be used, for example.

It should be noted that the following description assumes that the display surface side (viewer's side) substrate is an upper substrate and the other substrate is a lower substrate, and takes, as an example, a case where an array substrate is used as the lower substrate 10 and a counter substrate is used as the upper substrate 20. However, the present embodiment is not to be limited to such an example.

First, the components of the liquid crystal cell 5 are described here. To start with, a configuration of the substrate 10 (first substrate, array substrate) is described.

The substrate 10 is an array substrate as described above, and includes TFTs (not illustrated), for example, serving as switching elements.

As shown in FIG. 1, the substrate 10 includes: a glass substrate 11; a solid electrode 12 (third electrode) stacked on the glass substrate 11; an insulating layer 13 (array-side insulating layer) stacked on the solid electrode 12; comb electrodes 14 and 15 (first and second electrodes, see FIG. 2) stacked on the insulating layer 13; and an alignment film 16 stacked on the insulating layer 13 and the comb electrodes 14 and 15.

The solid electrode 12 and the comb electrodes 14 and 15 are electrodes for generating transverse electric fields.

The solid electrode 12 is a common electrode solidly formed on the glass substrate 11 substantially all over that surface of the glass substrate 11 which faces the substrate 20, in such a manner as to cover a display region in the substrate 10 (a region surrounded by a sealing agent).

Further, the insulating layer 13 is solidly formed on the whole display region in the substrate 10 in such a manner as to cover the solid electrode 12.

The comb electrodes 14 and 15 formed on the insulating layer 13 are comb-shaped electrodes constituted by trunk electrodes (trunk lines) and branch electrodes 14A and 15A (branch lines) extending from the trunk electrodes, respectively.

As shown in FIGS. 1 and 2, the comb electrodes 14 and 15 have their branch electrodes 14A (14A1, 14A2, . . . 14Am, where m is an integer of 1 or greater) and branch electrodes 15A (15A1, 15A2, . . . 15An, where n is an integer of 1 or greater) disposed alternately in such a manner as to engage with one another. It should be noted here that the branch electrodes 14A and 15A are equivalent to the teeth of combs.

It should be noted that the numbers (m, n) of teeth (branch electrodes 14A and 15A) of the comb electrodes 14 and 15 that are provided in each pixel are not particularly limited, and as such, are determined in terms of a relationship with a pixel pitch or the like. For example, in a case where the pixel pitch is 100 μm, where the comb electrodes 14 and 15 each have an electrode width L (i.e., the width of each branch electrode 14A or 15A serving as an electrode line) of 4 μm, and where the comb electrodes 14 and 15 are placed at an interelectrode space S (i.e., the distance between branch electrodes 14 and 15 that serve as a space) of 4 μm from each other, it is possible to provide a total of twelve branch electrodes 14A and 15A, namely six branch electrodes 14 and six branch electrodes 15A in each of the comb electrodes 14 and 15, in each pixel.

The comb electrode 14 (first electrode), which is one of the comb electrodes 14 and 15, is a common electrode having the same potential (mainly 0 V) as the solid electrode 12. Further, the other comb electrode 15 (second electrode) is a pixel electrode, connected to a signal line and a switching element such as a TFT via a drain electrode (not illustrated), to which a signal corresponding to a video signal is applied.

Further, the alignment film 16 is a so-called vertical alignment film that causes the liquid crystal molecules of the liquid crystal layer to be aligned perpendicularly to the substrate surfaces when no electric field is applied. It should be noted here that the term "perpendicular" encompass "substantially perpendicular". The alignment film 16 is provided above the glass substrate 11 in such a manner as to cover the comb electrodes 14 and 15.

As described above, the substrate 10 has a configuration that is similar to the electrode configuration of an electrode substrate (array substrate) in a liquid crystal panel based on a display system of a so-called FFS (fringe field switching) mode in which a common electrode and a pixel electrode are lapped over each other via an insulating layer. Therefore, a substrate having such a configuration is hereinafter referred to as a substrate of an "FFS structure".

However, the liquid crystal panel 2 according to the present embodiment merely employs the FFS structure as the electrodes configuration of the substrate 10, and as such, is different from a so-called FFS mode liquid crystal panel.

In the FFS mode, when no voltage is applied, liquid crystal molecules sandwiched between a pair of substrates are homogeneously aligned so that their longer sides are parallel to the substrate surfaces. On the other hand, in the liquid crystal panel 2 according to the present embodiment, when no voltage is applied, liquid crystal molecules 52 sandwiched between the pair of substrates 10 and 20 are homeotropically aligned so that their longer sides are perpendicular to the substrate surfaces. For this reason, the liquid crystal panel 2 according to the present embodiment is totally different in behavior of the liquid crystal molecules 52 from the FFS mode.

Further, assuming that L is the electrode width L of each comb electrode, S is the interelectrode distance S, and D is the cell gap (thickness of the liquid crystal layer), a display is carried out in the FFS mode by generating a so-called fringe electric field by making the interelectrode space S smaller than the electrode width L and the cell gap D.

However, the present embodiment has its interelectrode space S set greater than its cell gap D as will be described later in examples. It should be noted, however, that in the present invention, there is not necessarily a correlation between the transmittance of the liquid crystal cell 5 as a whole and the cell gap D. For this reason, the cell gap D is not particularly limited.

Next, a configuration of the substrate 20 (second substrate, CF substrate) is described.

The substrate 20 includes a glass substrate 21, R (red), G (green), and B (blue) color filters 22 stacked on the glass substrate 21, a black matrix 23 stacked on the glass substrate 21, a solid electrode 24 (fourth electrode) stacked on the color filters 22 and the black matrix 23, an insulating layer 25 (CF-side insulating layer) stacked on the solid electrode 24, and an alignment film 26 stacked on the insulating layer 25.

Each pixel 6 (i.e., a single pixel) is constituted by three subpixels, namely R, G, and B subpixels 6R, 6G, and 6B (dots). As shown in FIG. 1, the subpixels 6R, 6G, and 6B are provided with the R, G, and B color filters 22, which transmit R, G, and B lights at the respective wavelengths.

It should be noted that for convenience of illustration and explanation, it is assumed in FIGS. 1 and 2 that each of the subpixels 6R, 6G, and 6B are provided in correspondence with a space between adjacent branch electrodes 15A and 14A of the comb electrodes 14 and 15. However, since, as mentioned above, the numbers (m, n) of branch electrodes 14A and 15A are determined, for example, in terms of a relationship between (i) the electrode width L of each of the comb electrodes 14 and 15 and the interelectrode space S between the comb electrodes 14 and 15 and (ii) a pixel pitch, it goes without explaining that a plurality of branch electrodes 15A and 14A may be provided in each of the subpixels 6R, 6G, and 6B.

Further, the solid electrode 24 is a common electrode solidly formed all over a display region in the substrate 20 (i.e., a region surrounded by a sealing agent; not illustrated) in such a manner as to cover the color filters 22 and the black matrix 23.

Further, the insulating layer 25 is solidly formed on the whole display region in the substrate 20 in such a manner as to cover the solid electrode 24. The insulating layer 25 has provided in each pixel 6 at least two regions constituted by insulating layers that are different in relative permittivity from each other. As such, the insulating layer 25 functions both as an overcoat layer (planarizing layer) and a VT multiplication layer that forms at least two electric field regions that are different in shape of equipotential lines from each other.

As with the alignment film 16, the alignment film 26 is a so-called vertical alignment film. The alignment film 26 is solidly provided in such a manner as to cover the insulating layer 25.

Next, materials for the layers in the substrates 10 and 20 and method for forming such layers are described.

The comb electrodes 14 and 15 and the solid electrodes 12 and 24 are not to be particularly limited as long as at least the solid-state electrode provided on the viewer's side substrate is made of a transparent electrode material. These electrodes may each be made of a transparent electrode material such as ITO (indium tin oxide) or IZO (indium zinc oxide) or of a metal such as aluminum. Further, these electrodes may be made of the same electrode material as each other or may be made of different electrode materials respectively.

These electrodes can be formed (laminated) by employing any of conventionally publicly known methods such as sputtering, vacuum deposition, and plasma CVD without any particular limitation. Further, among these electrodes, the comb electrodes 14 and 15 can be pattern-formed by employing a publicly known patterning method such as photolithography without any particular limitation.

These electrodes are not to be particularly limited in film thickness; however, it is preferable that these electrodes each have a film thickness set within a range of 100 Å to 2000 Å.

Further, the insulating layers 13 and 25 can each be made of any of various insulating materials examples of which include organic insulating materials such as acrylic resin and inorganic insulating materials such as silicon nitride (SiN).

In the present embodiment, the insulating layer 13 is constituted by a single layer, i.e., made of an identical material (one type of insulating material) all over the region in which the insulating layer 13 is formed.

Meanwhile, the insulating layer 25 has provided in each pixel 6 at least two regions (i.e., at least two types of insulating layer) made of insulating materials that are different in relative permittivity from each other.

The subpixels 6R, 6G, and 6B may be provided with insulating layers 25 made of insulating materials having different relative permittivities from one another, respectively, or insulating layers 25 in any two of these three subpixels 6R, 6G, and 6B constituting each pixel 6 may be commonly made of insulating materials that are equal in relative permittivity to each other (e.g., identical insulating materials). Therefore, three or two types of insulating layer made of insulting materials that are different in relative permittivity may be formed as the insulating layers 25 in each pixel 6.

FIG. 1 shows an example where assuming that the insulating layer 25 has regions 25A, 25B, and 25C bordering each other along the central parts of the branch electrodes 15A and 14A of the comb electrodes 14 and 15 and corresponding to the space between the branch electrodes 15A1 and 14A1, the space between the branch electrodes 14A1 and 15A2, and the space between the branch electrodes 15A2 and 14A2, respectively, the regions 25A and 25B, which correspond to the subpixels 6R and 6G, are equal in relative permittivity to each other and the region 25C, which corresponds to the subpixel 6B, is different in relative permittivity from the regions 25A and 25B.

For this reason, assuming that as shown in FIGS. 1 and 2, there are electric field regions 31 to 33 bordering each other along the central parts of the branch electrodes 15A and 14A of the comb electrodes 14 and 15 in the liquid crystal panel 2 and corresponding to the space between the branch electrodes 15A1 and 14A1, the space between the branch electrodes 14A1 and 15A2, and the space between the branch electrodes 15A2 and 14A2, respectively, the electric field regions 31 and 32, which correspond to the subpixels 6R and 6G, and the electric field region 33, which corresponds to the subpixel 6B, are different in shape of equipotential lines from each other as shown in FIG. 1.

In other words, in the example shown in FIG. 1, two electric field regions that are different in shape of equipotential lines from each other, namely a first electric filed region constituted by the electric field regions 31 and a second electric field region constituted by the electric field region 33, are provided in each pixel 6.

It should be noted, however, that the example showing in FIG. 1 is merely an embodiment. The liquid crystal panel 2 may have provided in each pixel 6 three electric field regions that are different in shape of equipotential lines from one another. Further, there is no particular limitation on a combination of the first electric field region and the second electric field region, i.e., a combination of subpixels that are identical in shape of equipotential lines and an subpixel that is different in shape of equipotential lines.

That is, in adjacent ones of the regions 25A to 25C (i.e., adjacent regions for insulating layer formation), as mentioned above, insulating layers made of insulting materials having different relative permittivities, respectively, may be formed as the insulating layer 25. Alternatively, in any two of the regions, an insulating layer made of an insulting material having a different relative permittivity from the other one of the regions may be formed.

Alternatively, at least two regions that are different in relative permittivity from each other may also be provided in any one of the subpixels 6R, 6G, and 6B. That is, the number of electric field regions that are formed in each pixel 6 in the liquid crystal panel 2 is not to be particularly limited as long as it is a plural number of 2 or greater, and can be appropriately set according to the pixel pitch and the numbers of branch electrodes 14A and 15A equivalent to the teeth of the comb electrodes 14 and 15 formed in each pixel 6.

It should be noted that for efficient bending of an electric field, it is preferable that the insulating layer 25 have a thickness falling within a range of 1 μm or greater to 5.0 μm or less for example or, more preferably, 2.3 μm or greater to 5.0 μm or less.

Further, from a point of view of efficient bending of an electric field, it is preferable that the difference between the relative permittivity ($\in$) of the insulating layer 25 in the first electric field region and the relative permittivity ($\in$) of the insulating layer 25 in the second electric field region fall within a range of 2 to 4.5.

Further, the insulating layers 13 and 25 may be commonly made of an identical insulating material or may be made of different insulating materials from each other.

These insulating layers 13 and 25 can be formed (laminated) by employing any of conventionally publicly known methods such as sputtering, vacuum deposition, plasma CVD, and coating, without any particular limitation, according to the insulating material(s) used and the like.

Further, an example of a method for partially changing the relative permittivity of the insulating layer 25 is a method including the steps of forming a solid-state layer on the whole display region from any one of the types of insulating material of which the insulating film 25 can be made; then eliminating a portion of the solid-state insulating layer by photolithography; and forming, in the portion from which the insulating layer has been eliminated, an insulating film made of an insulating material having a different relative permittivity. It should be noted that in this case, the insulating layer that is formed in the portion from which the insulating layer has been eliminated is preferably formed in such a manner as to have the same film thickness as that portion of the insulating layer which has been eliminated.

Further, the relative permittivity of the insulating layer 25 can also be partially changed by partially irradiating the solidly formed insulating layer 25 with ultraviolet rays or the like.

By thus making the insulating layer 25 have a constant thickness regardless of its relative permittivity, the need to control a plurality of cell thicknesses (thickness of the liquid crystal layer 50) in each pixel 6 is eliminated and manufacturing is facilitated.

Further, in a case of providing, in each pixel 6, such a region that the directors of liquid crystal molecules 52 is symmetrical, breaking of the symmetry of the directors becomes unlikely when the cell thicknesses in that pixel 6 are uniform; therefore a further improvement in viewing angle characteristic is can be achieved.

Further, materials for the alignment films 16 and 26 and methods for forming the alignment films 16 and 26 are not to be particularly limited. The alignment films 16 and 26 can each be formed, for example, by applying a publicly known alignment film material having vertical alignment controlling force onto the comb electrodes 14 and 15 or onto the color filters 22 and the black matrix 23.

The liquid crystal cell 5 in the liquid crystal panel 2 is formed by joining the substrate 10 and the substrate 20 together with a sealing agent via spacers (not illustrated) and filling the space between the substrates 10 and 20 with a medium containing a liquid crystal material.

It is possible to use, as the liquid crystal material, either a p-type (positive) liquid crystal material whose liquid crystal molecules 52 have positive dielectric anisotropy $\Delta \in$ or an n-type (negative) liquid crystal material whose liquid crystal molecules 52 have negative dielectric anisotropy $\Delta \in$.

A specific example of the p-type liquid crystal material is a nematic liquid crystal material, and a specific example of the n-type liquid crystal material is a banana-type liquid crystal material. The present embodiment is described by taking, as an example, a case where a p-type liquid crystal material is used as the liquid crystal material. However, the sole difference between a case where a p-type liquid crystal material is used and a case where an n-type liquid crystal material is used is a difference in the direction of bend arrangement (bend alignment), and the present invention is not to be limited thereby in any way.

As shown in FIGS. 1 and 3, the liquid crystal panel 2 is formed by joining the polarizing plates 35 and 36 and, as needed, the wave plates 37 and 38 to the liquid crystal cell 5.

As shown in FIGS. 1 and 3, the polarizing plates 35 and 36 are provided on those surfaces of the substrates 10 and 20 opposite those surfaces of the substrates 10 and 20 which face the liquid crystal layer 50, respectively. Further, as shown in FIG. 3, the wave plates 37 and 38 are provided as needed, for example, between the polarizing plates 35 and 36 and the substrates 10 and 20, respectively. It should be noted that the wave plate 37 or 38 may be provided on either surface of the liquid crystal panel 2. Further, in the case of a display device that uses squarely transmitted light, the wave plates 37 and 38 are not indispensable.

The polarizing plates 35 and 36 are disposed, for example, so that the transmission axes of the polarizing plates 35 and 36 are orthogonal to each other and the direction of extension of the respective branch electrodes 14A and 15B of the comb electrodes 14 and 15 and the transmission axes of the polarizing plates 35 and 36 form an angle of 45 degrees.

Next, a display system (vertical alignment transverse electric field mode) of the liquid crystal panel 2 is described below with reference to FIG. 1.

The liquid crystal panel 2 is configured such that vertical alignment films are provided as the alignment films 16 and 26 on the surfaces of the substrates 10 and 20. This allows the liquid crystal molecules 52 in the liquid crystal panel 2 to be aligned perpendicularly to the substrate surfaces when no electric field is applied.

The liquid crystal panel 2 carries out a display by giving a potential difference between the pixel electrode and the common electrode in the substrate 10. That is, the liquid crystal panel 2 carries out a display by giving potential differences between the pair of comb electrodes 14 and 15 and between the comb electrode 15 and the solid electrode 12. These potential differences cause transverse electric fields to be generated between the pair of comb electrodes 14 and 15 and between the comb electrode 15 and the solid electrode 12, so that electric lines of force between the comb electrodes 14 and 15 are semicircularly curved. The liquid crystal molecules 52 are arranged according to a distribution of electric field intensity within the liquid crystal cell 5 and binding force from the interface.

Thus, in a case where a p-type liquid crystal material is used, the liquid crystal molecules 52 come into arched bend arrangement through the thickness of the substrates as shown in FIG. 1. It should be noted that in a case where an n-type liquid crystal material is used, the liquid crystal molecules 52 come into arched bend arrangement within the plane of the substrates. Therefore, in either case, birefringence is exerted on light that travels in a direction perpendicular to the substrate surfaces.

Thus, the liquid crystal panel 2 carries out a display by rotating the liquid crystal molecules 52 with a transverse electric field that is generated between the comb electrodes 14 and 15 and thereby controlling the amount of light that travels through the liquid crystal panel 2.

When a voltage is applied, the liquid crystal molecules 52 continuously change from homeotropic alignment to bend arrangement. As a result, the liquid crystal layer 50 always exhibits bend arrangement as shown in FIG. 1 during normal driving, thus enabling high-speed gray-to-gray response.

Further, the vertical alignment transverse electric field mode controls the direction of alignment of the liquid crystal molecules 52 by driving with a transverse electric field while keeping the high-contrast characteristic that is achieved through vertical alignment. For this reason, unlike the MVA mode, the vertical alignment transverse electric field mode does not require control of alignment with use of projections, and as such, has an excellent viewing angle characteristic with a simple pixel configuration.

Further, by carrying out transverse electric field driving in the vertical alignment mode as described above, a bent (arched) electric field is formed when an electric field is applied, and two domains that are different in director orientation from each other by substantially 180 degrees are formed between the adjacent comb electrodes 14 and 15, with the result that a wide viewing angle characteristic can be obtained.

Therefore, the liquid crystal panel 2 has the advantage of giving high-speed response based on bend alignment, a wide viewing angle based on a self-compensating array, and high contrast based on vertical alignment, and also have the advantages being simple in structure, easy to manufacture, and inexpensive to manufacture.

Moreover, since the liquid crystal panel 2 has an FFS structure as described above, those liquid crystal molecules on the comb electrodes 14 and 15, as well as those between the comb electrodes 14 and 15, are driven. For this reason, the liquid crystal panel 2 has the advantage of being larger in aperture than in a case where the solid electrode 12 is not provided.

Next, a method for manufacturing such a liquid crystal panel 2 is specifically described by taking, as an example, a method for manufacturing samples (liquid crystal panels (1) to (3)) used for verification to be described later, and results obtained by verifying the effectiveness of the liquid crystal panel 2 are explained below.

However, the specific size, material, and manufacturing method of each component in the following description are merely a set of conditions used for verification as described above, and the scope of the present invention should not be interpreted in a limited way because of the following description. As for the following manufacturing method, the samples were manufactured under the same conditions unless otherwise noted.

[Liquid Crystal Panels (1) to (3)]

First, as shown in FIG. 1, a film of ITO, 1000 Å in thickness, was formed entirely on a glass substrate 11 by sputtering, whereby a solid electrode 12 was formed which covered the whole display region of the glass substrate 11.

Next, an acrylic insulating material (first insulating material) having a relative permittivity $\in$ of 3.7 was applied by spin coating and formed into a film, 1 to 3 µM in thickness, by sputtering to cover an entire surface of the solid electrode 12. In this manner, an insulating layer 13 of a different thickness was formed as an array-side insulating layer in each sample.

Then, comb electrodes 14 and 15 of ITO, each 1000 Å in thickness and 4 µm in electrode width L, were formed as upper electrodes at an interelectrode space S of 4 µm from each other on the insulating layer 13.

Next, alignment film paint (y-butyrolactone solution marketed as "JALS-204" with a solid content of 5% by weight) manufactured by JSR Corporation was applied onto the insulating layer 13 by spin coating in such a manner as to cover the comb electrodes 14 and 15. After that, by sintering for two hour at 200° C., a substrate 10 was formed which had a surface that would face a liquid crystal layer 50 and which had an alignment film 16 provided as a vertical alignment film on that surface.

Meanwhile, color filters 22 and a black matrix 23, each 1.2 µm in thickness, were formed on a glass substrate 21 in the usual manner. Next, a film of ITO, 1000 Å in thickness, was formed entirely on the color filters 22 and the black matrix 23 by sputtering, whereby a solid electrode 24 was formed which covered the whole display region of the glass substrate 21.

Next, an insulating layer 25 that varies in relative permittivity from one part to another was formed on the solid electrode 24 in the following manner. First, the acrylic insulating material (first insulating material) having a relative permittivity $\in$ of 3.7 was applied onto the solid electrode 24 by spin coating and formed into a film, 1 to 3 µm in thickness, to cover an entire surface of the solid electrode 24.

After that, regions that are different in relative permittivity were formed by eliminating a portion of the insulating layer made of the first insulating material by photolithography and forming an insulating film of SiN (second insulating material) having a relative permittivity $\in$ of 6.9 by sputtering in the portion from which the insulating layer has been eliminated, in such a manner that the resulting insulating layer has the same film thickness as that portion of the insulating layer which has been eliminated. In this manner, an insulating layer 25 of a different thickness was formed as a CF-side insulating layer in each sample. The insulating layer 25 had two regions that are different in relative permittivity from each other in each pixel as mentioned above.

Next, a vertical alignment film was formed as an alignment film 26 on the insulating layers 25 by using the same material and the same process as those used to form the alignment film 16, whereby a substrate 20 was formed. The alignment films 16 and 26 thus formed each had a dry film thickness of 1000 Å (=0.1 µm).

After that, resin beads 3.25 µm in diameter (marketed as "Micropearl SP20325"; manufactured by Sekisui Chemical Co., Ltd.) were dispersed as spacers onto one of the substrates 10 and 20. Meanwhile, a sealing resin (marketed as "Structbond XN-21S", manufactured by Mitsui Toatsu Chemicals, Inc.) was printed as a sealing agent on the other substrate that faced the above substrate.

Next, the substrates 10 and 20 were joined together and sintered for one hour at 135° C.

After that, a positive liquid crystal material ($\Delta\in=20$, $\Delta n=0.15$) manufactured by Merck & Co., Inc was encapsulated as a liquid crystal material in a space between the substrates 10 and 20 by a vacuum injection method, whereby a liquid crystal cell 5 was fabricated in which the liquid crystal layer 50 was sandwiched between the pair of substrates 10 and 20.

Then, polarizing plates 35 and 36 were joined on the front and back surfaces of the liquid crystal cell 5 so that the transmission axes of the polarizing plates 35 and 36 were orthogonal to each other and the direction of extension of the respective branch electrodes 14A and 15A of the comb electrodes 14 and 15 and the transmission axes of the polarizing plates 35 and 36 form an angle of 45 degrees. In this manner, liquid crystal panels (1) to (3) were each fabricated in the form of a liquid crystal panel 2 (liquid crystal display element) shown in FIG. 1. The liquid crystal panels (1) to (3) differed in thickness of the insulating layers 13 and 25 from one another.

Next, for verification of the effectiveness of the liquid crystal panel 2, a structure of a comparative liquid crystal panel is described below together with a method for manufacturing such a liquid crystal panel.

It should be noted that the following description mainly explains points of difference from the liquid crystal panel 2. Further, those components having the same functions as those of the liquid crystal panels 2 and 300 described above are given the same reference numerals, and as such, are not described below.

[Liquid Crystal Panel 100]

Figure 4:
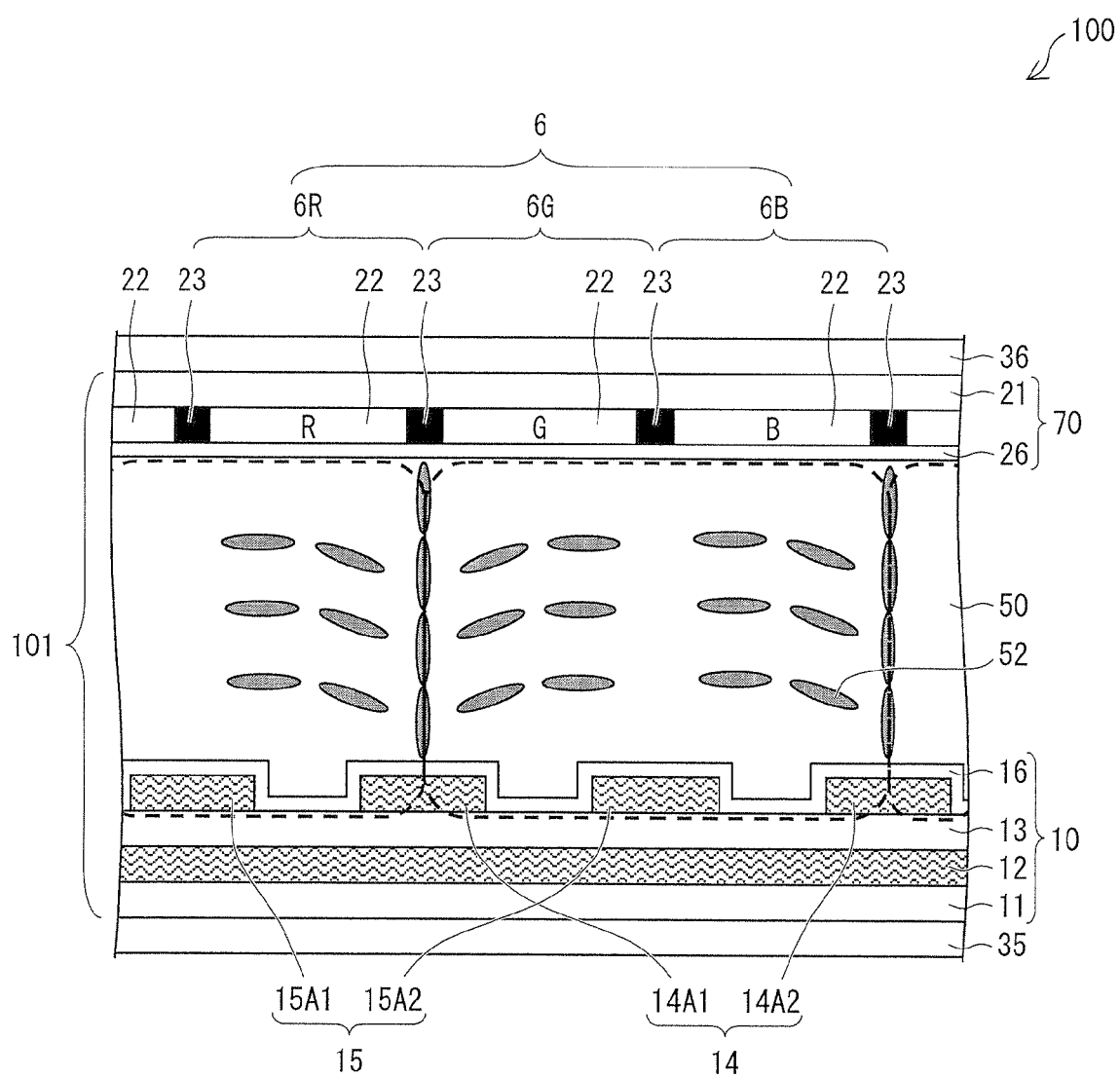
FIG. 4

FIG. 4 is a cross-sectional view schematically showing a configuration of a main part of a comparative liquid crystal panel 100.

The comparative liquid crystal panel 100 shown in FIG. 4 differs from the liquid crystal panel 2 shown in FIG. 1 in that the substrate 20 is replaced by a substrate 70 not provided with a solid electrode 24 or an insulating layer 25 serving as a CF-side insulating layer.

The substrate 70 has the same configuration as the substrate 20 shown in FIG. 1, except that the substrate 70 is not provided with a solid electrode 24 or an insulating layer 25 serving as a CF-side insulating layer.

The following gives a specific description of a method for manufacturing samples (liquid crystal panels (A) to (C)) of liquid crystal panel 100 having a structure shown in FIG. 4. The samples were used for verification. As for the following manufacturing method, too, the samples were manufactured under the same conditions unless otherwise noted.

[Liquid Crystal Panels (A) to (C)]

First, substrates 10 having the same structure as those in the liquid crystal panels (1) to (3) were formed by using the same materials and the same processes as those used for the method for manufacturing the substrates 10 in the liquid crystal panels (1) to (3).

Meanwhile, substrates 70 for use in liquid crystal panels (A) to (C) were formed by using the same materials and the same processes as those used for the method for manufacturing the substrates 20 in the liquid crystal panels (1) to (3), except that neither a solid electrode 24 nor an insulating layer 25 was formed.

Specifically, color filters 22 and a black matrix 23 were formed on each glass substrate 21 by using the same materials and the same processes as those used for the liquid crystal panels (1) to (3).

Next, a vertical alignment film was formed as an alignment film 26 on the color filters 22 and the black matrix 23 by using the same material and the same process as those used to form the alignment film 16. Thus formed was a substrate 70 in which the color filters 22 and the black matrix 23 were stacked on the glass substrate 21 and the alignment film 26 was stacked on the color filters 22 and the black matrix 23. Further, the alignment films 16 and 26 thus formed each had a dry film thickness of 1000 Å (=0.1 μm).

After that, resin beads 3.25 μm in diameter (Micropearl SP20325) were dispersed as spacers onto one of the substrates 10 and 70. Meanwhile, a sealing resin (Structbond XN-21S) was printed as a sealing agent on the other substrate that faced the above substrate.

Next, the substrates 10 and 70 were joined together and sintered for one hour at 135° C.

After that, a positive liquid crystal material ($\Delta \in =20$, $\Delta n=0.15$) manufactured by Merck & Co., Inc was encapsulated as a liquid crystal material in a space between the substrates 10 and 70 by a vacuum injection method, whereby a liquid crystal cell 101 was fabricated in which the liquid crystal layer 50 was sandwiched between the pair of substrates 10 and 70.

Then, polarizing plates 35 and 36 were joined on the front and back surfaces of the liquid crystal cell 101 in the same manner as in the liquid crystal panels (1) to (3). In this manner, the liquid crystal panels (A) to (C) were each fabricated in the form of a comparative liquid crystal panel 100 (liquid crystal display element) shown in FIG. 4. The liquid crystal panels (A) to (C) differed in thickness of the insulating layers 13 from one another.

Next, a structure of another comparative liquid crystal panel is described below together with a method for manufacturing such a liquid crystal panel.

It should be noted that the following description mainly explains points of difference from the liquid crystal panel 2. Further, those components having the same functions as those of the liquid crystal panels 2, 100, and 300 described above are given the same reference numerals, and as such, are not described below.

[Liquid Crystal Panel 200]

Figure 5:
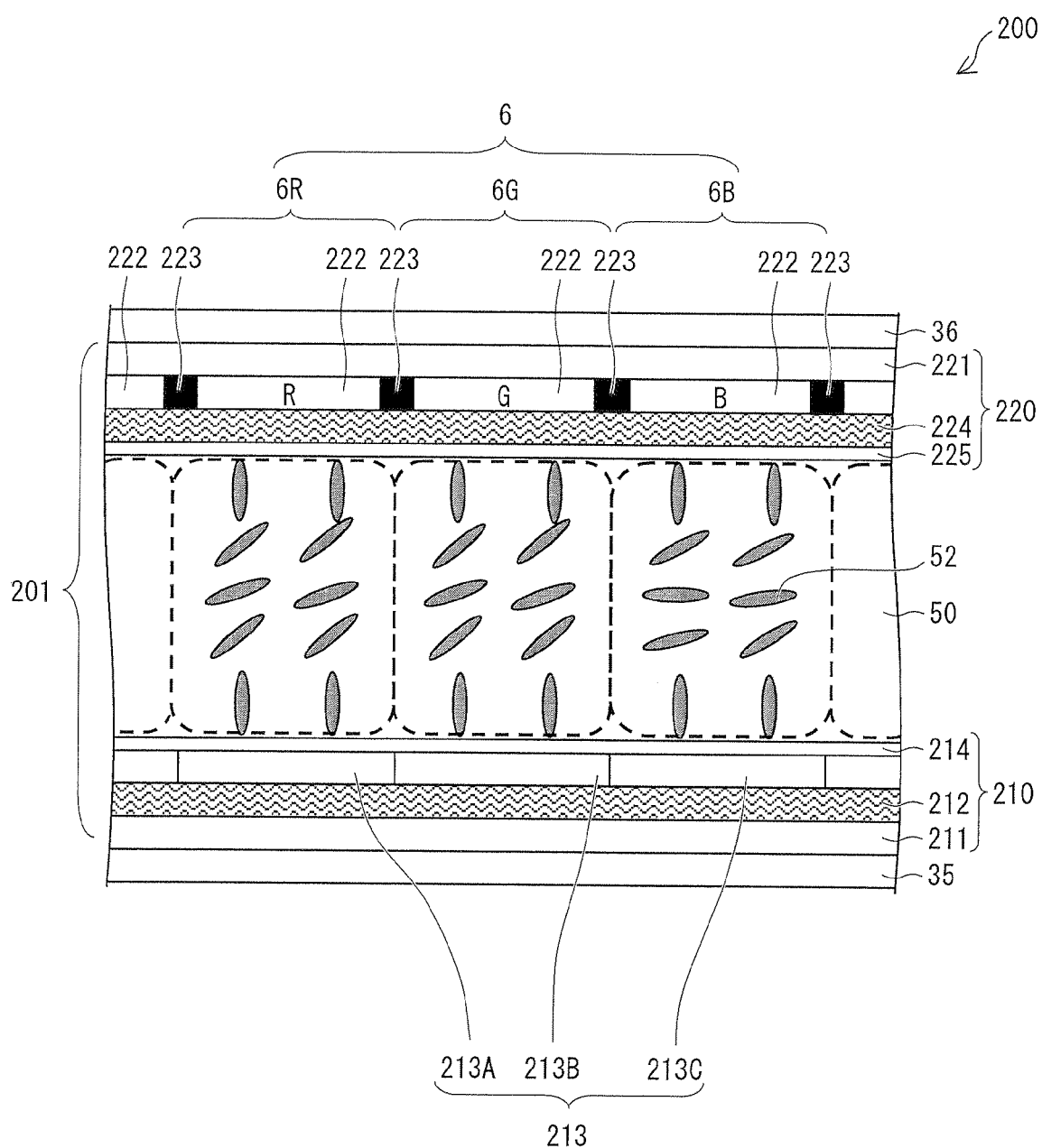
FIG. 5

FIG. 5 is a cross-sectional view schematically showing a configuration of a main part of a comparative liquid crystal panel 200.

As shown in FIG. 5, the liquid crystal panel 200 is a vertical alignment (VA) type of vertical electric field liquid crystal panel, and as such, is different in display system from the liquid crystal panel 2.

As shown in FIG. 5, the liquid crystal panel 200 includes a substrate 210 (array substrate), a substrate 220 (counter substrate), and a liquid crystal layer 50 sandwiched between the substrates 210 and 220.

The substrate 210 includes a glass substrate 211, an array electrode 212 (pixel electrode) stacked on the glass substrate 11 and constituted by a solid electrode, and an insulating layer 213 stacked on the array electrode 212, and an alignment film 214 stacked on the insulating layer 213.

The substrate 220 includes a glass substrate 221, color filters 222 stacked on the glass substrate 221, a black matrix 223 stacked on the glass substrate 221, a counter electrode 224 (common electrode) stacked on the color filters 222 and the black matrix 223 and constituted by a solid electrode, and an alignment film 225 stacked on the counter electrode 224.

The alignment films 214 and 225 are vertical alignment films, and the liquid crystal layers 50 contains liquid crystal molecule 52 that are aligned perpendicularly to the substrates 210 and 220 when no voltage is applied.

The insulating layer 213 has provided in each pixel 6 two regions constituted by insulating layers that are different in relative permittivity from each other. That is, in the liquid crystal panel 200, the insulating layer 213 that varies in relative permittivity from one part to another is provided on the array electrode 212 serving as a solid electrode on the side of the substrate 210 serving as an array substrate.

FIG. 5 shows an example where regions 213A and 213B in the insulating layer 213 which correspond to the subpixels 6R and 6G are equal in relative permittivity to each other and a region 213C in the insulating layer 213 which corresponds to the subpixel 6B is different in relative permittivity from the regions 213A and 213B.

The following gives a specific description of a method for manufacturing samples (liquid crystal panels (D) and (E)) of liquid crystal panel 200 having a structure shown in FIG. 5. The samples were used for verification. As for the following manufacturing method, too, the samples were manufactured under the same conditions unless otherwise noted.

[Liquid Crystal Panels (D) and (E)]

First, as shown in FIG. 5, a film of ITO, 1000 Å in thickness, was formed entirely on a glass substrate 211 by sputtering, whereby a solid-state array electrode 212 was formed which covered the whole display region of the glass substrate 211.

Next, an insulating layer 213 that varies in relative permittivity from one part to another was formed on the array electrode 212 in the following manner. First, an acrylic insulating material (first insulating material) having a relative permittivity $\in$ of 3.7 was applied onto the array electrode 212 by spin coating and formed into a film, 1 to 3 μm in thickness, to cover an entire surface of the solid electrode 212.

After that, regions that are different in relative permittivity were formed by eliminating a portion of the insulating layer made of the first insulating material by photolithography and forming an insulating film of SiN (second insulating material) having a relative permittivity $\in$ of 6.9 by sputtering in the portion from which the insulating layer has been eliminated, in such a manner that the resulting insulating layer has the same film thickness as that portion of the insulating layer which has been eliminated. In this manner, an insulating layer 213 of a different thickness was formed as an array-side insulating layer in each sample. The insulating layer 213 had two regions that are different in relative permittivity from each other in each pixel as mentioned above.

Next, a vertical alignment film was formed as an alignment film 214 on the insulating layer 213 by using the same material and the same process as those used to form the alignment films 16 of the liquid crystal panels (1) to (3). Thus formed was a substrate 210 in which the array electrode 212 was stacked on the glass substrate 211, in which the insulating layer 213 was stacked on the array electrode 212, and in which the alignment film 214 was stacked on the insulating layer 213.

Meanwhile, color filters 222 and a black matrix 223 were formed on a glass substrate 221 by using the same materials and the same processes as those used for the liquid crystal panels (1) to (3). Furthermore, a film of ITO, 1000 Å in thickness, was formed entirely on the color filters 222 and the black matrix 223 by sputtering, whereby a counter electrode 224 was formed which covered the whole display region of the glass substrate 221.

Next, a vertical alignment film was formed as an alignment film 225 on the counter electrode 224 by using the same material and the same process as those used to form the alignment film 16. Thus formed was a substrate 220 in which the color filters 222 and the black matrix 223 were stacked on the glass substrate 221, in which the counter electrode 224 was stacked on the color filters 222 and the black matrix 223, and in which the alignment film 225 was stacked on the counter electrode 224. Further, the alignment films 214 and 225 thus formed each had a dry film thickness of 1000 Å (=0.1 μm).

After that, resin beads 3.25 μm in diameter (Micropearl SP20325) were dispersed as spacers onto one of the substrates 210 and 220. Meanwhile, a sealing resin (Structbond XN-21S) was printed as a sealing agent on the other substrate that faced the above substrate.

Next, the substrates 210 and 220 were joined together and sintered for one hour at 135° C.

After that, a negative liquid crystal material ($\Delta\epsilon=-3$, $\Delta n=0.1$) manufactured by Merck & Co., Inc was encapsulated as a liquid crystal material in a space between the substrates 210 and 220 by a vacuum injection method, whereby a liquid crystal cell 201 was fabricated in which the liquid crystal layer 50 was sandwiched between the pair of substrates 210 and 220.

Then, polarizing plates 35 and 36 were joined on the front and back surfaces of the liquid crystal cell 201 in the same manner as in the liquid crystal panels (1) to (3). In this manner, the liquid crystal panels (D) and (E) were each fabricated in the form of a comparative liquid crystal panel 200 (liquid crystal display element) shown in FIG. 5. The liquid crystal panels (D) and (E) differed in thickness of the insulating layers 213 from each other.

Next, results obtained by verifying the effectiveness of the liquid crystal panel 2 with use of the comparative liquid crystal panels 100, 200, and 300 are explained below.

First, prior to an explanation of an improvement in change in color as observed from a square angle, an effect of improvement in viewing angle characteristic of the liquid crystal panel 2 by VT multiplication is explained.

[Viewing Angle Characteristic]

First, results obtained by verifying the viewing angle characteristic of the liquid crystal panel 2 according to the present embodiment in comparison with the liquid crystal panel 100 are explained.

It should be noted that the following description treats, as a V-T characteristic in each electric field region, a V-T characteristic in each electric field region that corresponds to a total average of birefringence (specifically, a V-T characteristic in a white state), and does not look into V-T characteristics for each separate color. V-T characteristics for each separate color will be looked into in the review below of changes in color as observed from a square angle.

(Shapes of Equipotential Lines)

As mentioned above, the liquid crystal panel 2 according to the present embodiment has provided in each pixel 6 two electric field regions that are different in shape of equipotential lines from each other.

Accordingly, first, the results of simulation calculations of (i) distributions of fields within the liquid crystal cells 5 and 101 of the liquid crystal panels 2 and 100 fabricated on the basis of the material property values and cell configurations as described in the aforementioned manufacturing methods and (ii) distributions of liquid crystal directors within the liquid crystal cells 5 and 101 in the presence of voltage are shown in FIGS. 6 and 7, respectively.

The simulations were run by using an "LCD-MASTER" manufactured by SHINTECH, Inc. Further, during the simulations, the electrode width L was 4 μm and the interelectrode space was 6 μm.

In the example shown in FIG. 6, two groups of electric fields are formed with each branch electrode 14A of the comb electrode 14 interposed therebetween. That is, in the liquid crystal cell 5, the first electric field region and the second electric field region, which are adjacent to each other, have their respective groups of electric fields formed therein. As shown in FIG. 6, the group of electric fields in the first electric field region and the group of electric fields in the second electric field region are different from each other. This means that the groups of electric fields in the electric field regions are different in shape (curvedness) of equipotential lines from each other.

As shown in FIG. 6, both in the first and second electric field regions, the equipotential lines in the groups of electric fields in these electric field regions are shaped in such a manner as to be closed in the respective regions.

However, as can be seen from the shape of each group of electric fields, the first electric field region and the second electric field region are different in closed shape of equipotential lines. That is, the equipotential lines in the left electric field region (first electric field region) in FIG. 6 are more distorted than those in the right electric field region (second electric field region) in FIG. 6.

Specifically, as compared with the equipotential lines in the second electric field region, the equipotential lines in the first electric field region are at narrower intervals in an area near the substrate 10 and, on the other hand, are at wide intervals in an area near the substrate 20.

Further, since the first electric region and the second electric region are different in shape of equipotential lines from each other as described above, the first electric region and the second electric region are different in alignment direction (director) of liquid crystal molecules 52 from each other.

Since the directions of alignment of the liquid crystal molecules 52 vary between the electric field regions, the first electric region and the second electric region exhibit different VT characteristics (VT curves). That is, the liquid crystal panel 2 is finished with so-called VT multiplication.

Meanwhile, as shown in FIG. 7, in the liquid crystal cell 101 of the comparative liquid crystal panel 100, two groups of electric fields are formed with each branch electrode 14A of the comb electrode 14 interposed therebetween. However, the two groups of electric fields thus formed are substantially identical in shape to each other, and the shapes of equipotential lines in the groups of electric fields in the electric field regions are substantially identical. Further, the shapes of equipotential lines in the groups of electric fields in the electric field regions are all open.

As shown in FIG. 7, in a case where the comparative liquid crystal panel 100 is used, the groups of electric fields are identical in curvedness of equipotential lines to each other. This means that in the comparative liquid crystal panel 100, electric filed regions bordering each other along the central portions of the branch electrodes 14A and 15A of the comb electrodes 14 and 15 and corresponding to the spaces between the branch electrodes 14A and 15A are identical in alignment direction (director) of liquid crystal molecules 52 to one another. In other words, the electric field regions in the comparative liquid crystal panel 100 exhibit identical VT characteristics (VT curves), and the comparative liquid crystal panel 100 does not include a second electric field region that is different in shape of equipotential lines from a first electric field region.

Next, a relationship between the orientation of the director of a liquid crystal molecule 52 and birefringence, VT curves in the liquid crystal panel 2, and tone-luminance ratios are explained in order.

(Relationship Between the Orientation of the Director of a Liquid Crystal Molecule 52 and Birefringence)

Figure 8:
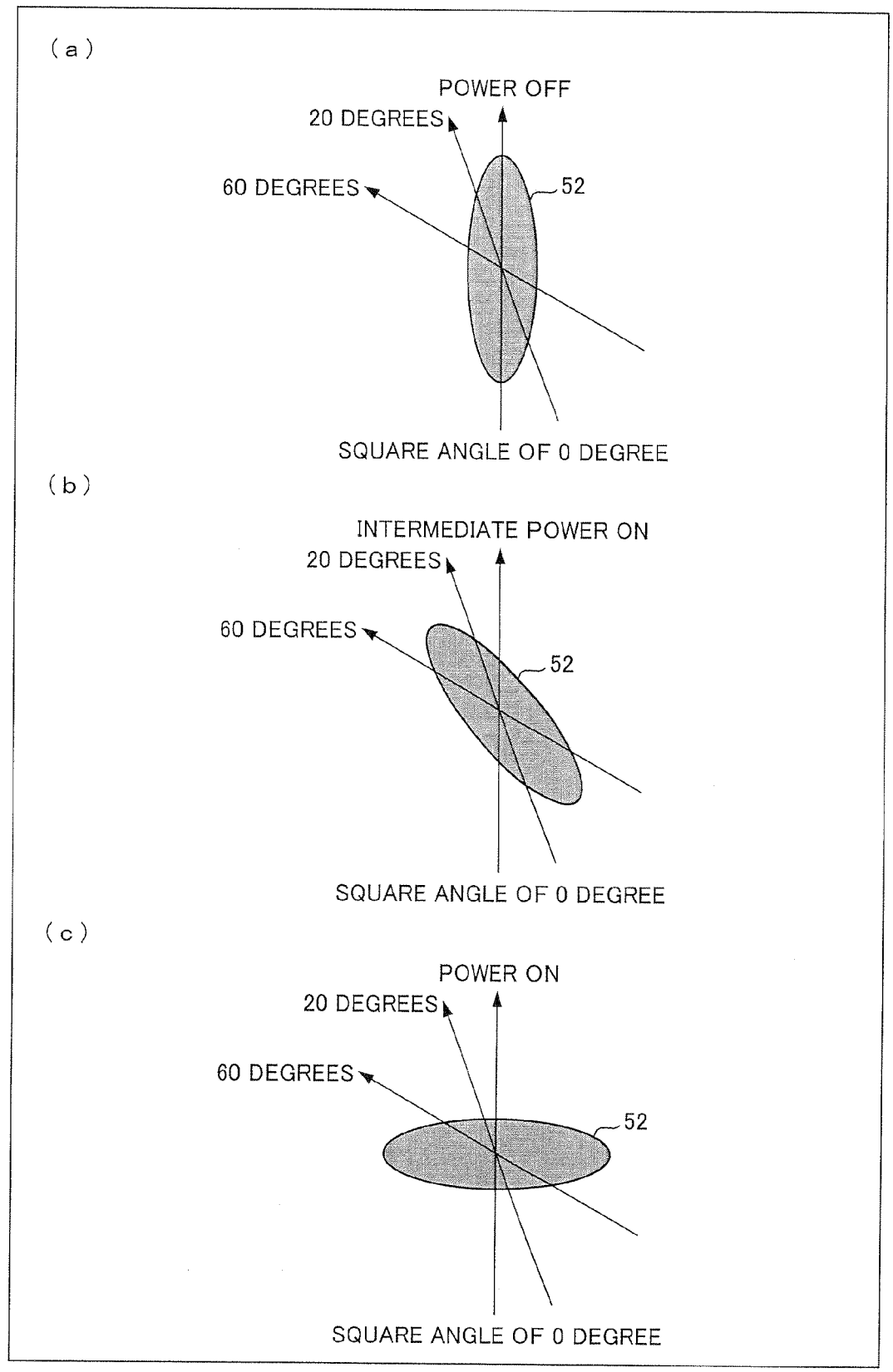
FIG. 8

(a) through (c) of FIG. 8 show relationships between directions of the director of a liquid crystal molecule 52 and directions in which light beams travel, with different voltages applied to the liquid crystal molecule 52, (a) with no voltage being applied to the liquid crystal molecule 52, (b) with an intermediate voltage being applied to the liquid crystal molecule 52, (c) with a normal voltage being applied to the liquid crystal molecule 52, respectively. Further, the arrows indicate directions in which light beams travel or, specifically, a light beam from a square angle (SQUARE ANGLE 0 DEGREE), a light beam from a polar angle of 20 degrees (20 DEGREES), and a light beam from a polar angle of 60 degrees (60 DEGREES), respectively.

First, a relationship between the inclination of a liquid crystal molecule 52 and birefringence is explained.

As shown in (a) through (c) of FIG. 8, the application of an electric field (e.g., OFF→intermediate→ON) to a rodlike liquid crystal molecule 52 causes a change in the orientation of the director of the liquid crystal molecule 52. When this change occurs or, especially, when a voltage that is close to the intermediate voltage has been applied to the liquid crystal molecule 52, there are increases in length of the optical paths of light beams especially from oblique angles (polar angles of 20 to 60 degrees) with respect to a long side of the liquid crystal molecule 52.

Birefringence is a product of the refractive index difference $\Delta n$ and the distance d. Therefore, when a voltage that is close to the intermediate voltage has been applied to the liquid crystal molecule 52, there is an increase in birefringence of the liquid crystal molecule 52. Since the birefringence occurs at the oblique angles, there is a rise in transmittance as observed when the liquid crystal panel 2 is looked squarely at. For this reason, at a voltage that is close to the intermediate voltage, there is an increase in the difference in luminance between a case where the liquid crystal panel 2 is looked squarely at and a case where the liquid crystal panel 2 is looked obliquely at.

As described above, the rotation of the director of the liquid crystal molecule 52 causes a change in birefringence, and the change in birefringence causes a change in transmittance.

Since, in the liquid crystal panel 2 according to the present embodiment, the first electric field region and the second electric field region are different in shape of equipotential lines from each other as described above, the first electric field region and the second electric field region are different in the orientation of the directors of the liquid crystal molecules 52 from each other.

Next, a relationship between the orientation of the director of a liquid crystal molecule 52 and birefringence is explained by taking, as an example, a case where an intermediate voltage is applied.

(Intermediate Voltage)

Figure 9:
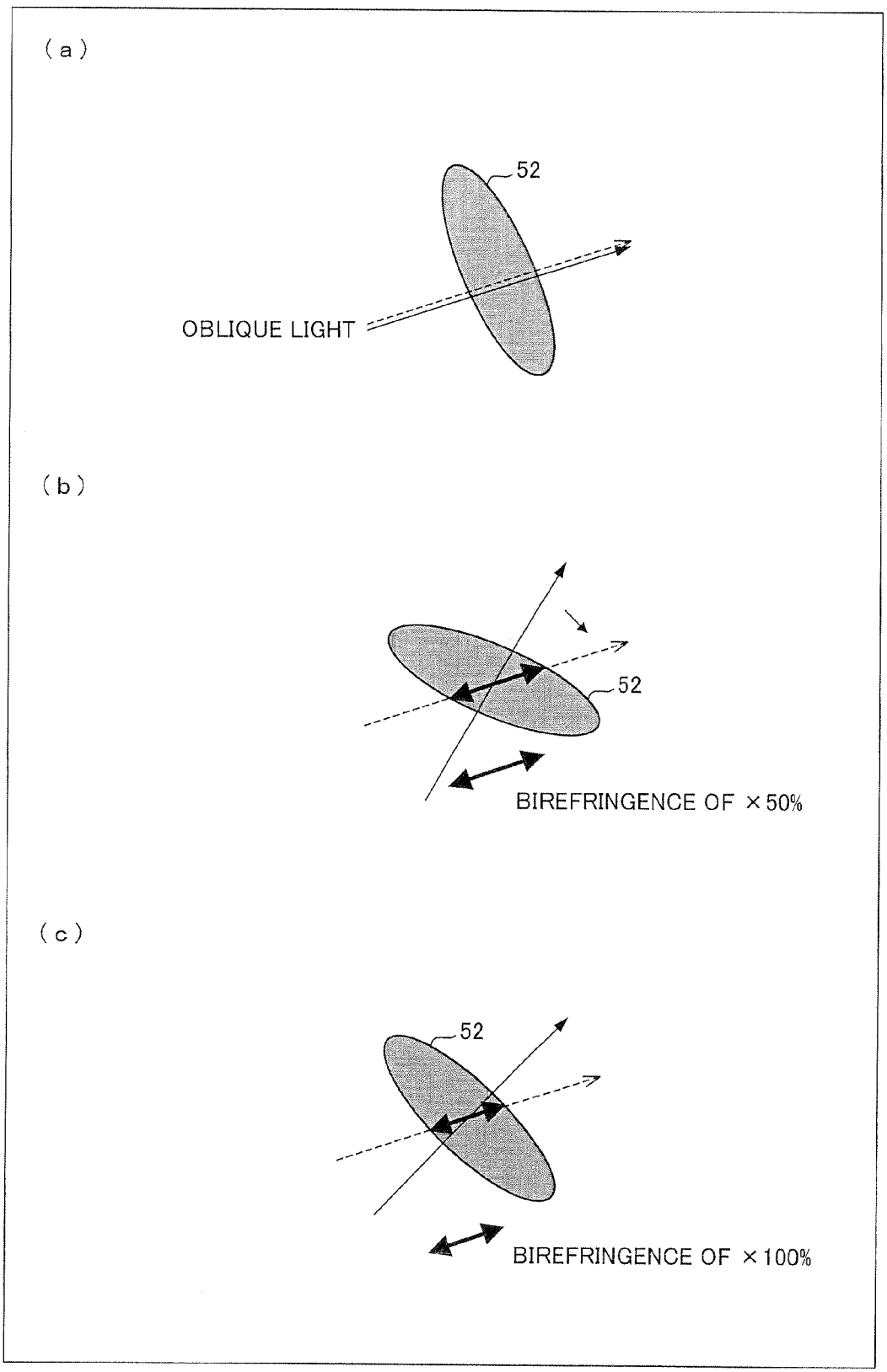
FIG. 9

(a) through (c) of FIG. 9 show (a) a relationship between the orientation of the director of a liquid crystal molecule 52 in a first electric field region in the liquid crystal panel 2 and a direction in which a light beam travels, with an intermediate voltage being applied to the liquid crystal molecule 52, (b) a relationship between the orientation of the director of a liquid crystal molecule 52 in a second electric field region in the liquid crystal panel 2 and a direction in which a light beam travels, with an intermediate voltage being applied to the liquid crystal molecule 52, and (c) a relationship between the orientation of the director of a liquid crystal molecule 52 in a first electric field region in the liquid crystal panel 100 and a direction in which a light beam travels, with an intermediate voltage being applied to the liquid crystal molecule 52. As explained earlier, the directors of liquid crystal molecules in the electric field regions are identical.

Birefringence reaches its minimum in a case where a ray of light and the minor axis of the director of a liquid crystal molecule 52 are orthogonal to each other.

In the liquid crystal panel 2 according to the present embodiment, as shown in (a) of FIG. 9, the birefringence by a liquid crystal molecule 52 in the first electric field region reaches its minimum when an intermediated voltage is applied.

On the other hand, in the second electric field region, as shown in (b) of FIG. 9, when an intermediate voltage is applied, there occurs birefringence that is greater than the birefringence by a liquid crystal molecule 52 in the first electric field region. It should be noted that the birefringence caused by the liquid crystal molecule 52 in the second electric field region takes on a greater value than the birefringence occurring in the liquid crystal panel 100 as shown in (c) of FIG. 9.

However, in the liquid crystal panel 2, the total average of birefringence is birefringence obtained by combining the birefringence occurring in the first electric field region as shown in (a) of FIG. 9 and the birefringence occurring in the second electric field region as shown in (b) of FIG. 9. The total average of birefringence is smaller than the birefringence occurring in the liquid crystal panel 100 as shown in (c) of FIG. 9.

For this reason, as will be described later, the liquid crystal panel 2 according to the present embodiment shows less excess transmittance when looked at from an oblique angle than the comparative liquid crystal panel 100.

Specifically, the following shows the appearance of a VT curve corresponding to the total average of birefringence in the present embodiment.

(VT Curves in the Liquid Crystal Panel 2)

As shown in (a) and (b) of FIG. 9, the first electric field region and the second electric field region are different in the orientation of the directors of the liquid crystal molecules 52 from each other when the same electric field is applied. This is because the insulating layer 25 varies in relative permittivity between the first electric field region and the second electric field region.

Since the first electric field region and the second electric field region are different in the orientation of the directors of the liquid crystal molecules 52 from each other as described above, the first electric field region and the second electric field region exhibit different VT curves.

FIG. 10 is a graph showing (i) VT curves obtained in the electric field regions (first electric field region, second electric field region) in the liquid crystal panel 2 by using, as the first insulating material and the second insulating material, two types of insulating material that are different in relative permittivity from each other ($\in=3$, and $\in=7$), respectively, and (ii) a VT curve (composite VT) obtained by combining these VT curves, as observed when the liquid crystal panel 2 is looked squarely at.

In FIG. 10, the curved line indicated by a thin solid line is a VT curve in the first electric field region provided with the insulating layer 25 having a relative permittivity $\in$ of 3, and the curved line indicated by a thick solid line is a VT curve in the second electric field region provided with the insulating layer 25 having a relative permittivity $\in$ of 7. Further, in FIG. 10, the curved line indicated by a dotted line is a VT curve (composite VT) obtained by combining these VT curves.

In the liquid crystal panel 2 according to the present embodiment, gradation voltages are set on the basis of the composite VT curve. On the basis of the composite VT curve shown in FIG. 10, for example, the half-tone voltage (intermediate voltage) is 4 V, and the transmittances as obtained through the insulating layer 25 having a relative permittivity $\in$ of 3 and the insulating layer 25 having a relative permittivity $\in$ of 7 are 35% and 60%, respectively, with respect to the basis.

(Tone-Luminance Ratios)

Next, tone-luminance ratios are explained below with reference to FIGS. 11 and 12.

FIG. 11 is a graph showing oblique gradations with respect to a square gradation of the liquid crystal panel 2 according to the present embodiment. FIG. 12 is a graph showing oblique gradations with respect to a square gradation of the liquid crystal panel 100.

FIG. 11 shows oblique gradations with respect to a square gradation as observed when the liquid crystal panel 2 according to the present embodiment is a liquid crystal panel whose insulating layer 25 has a thickness of 3 μm and is made of two types of insulating material, namely an insulating material having a relative permittivity $\in$ of 3 and an insulating material having a relative permittivity $\in$ of 7 and whose insulating layer 13 has a thickness of 3 μm and is made of an insulating material having a relative permittivity $\in$ of 3. FIG. 12 shows oblique gradations with respect to a square gradation as observed when the liquid crystal panel 100 is a liquid crystal panel whose insulating layer 13 has a thickness of 3 μm and is made of an insulating material having a relative permittivity $\in$ of 3.

The term "square gradation" here means a gradation as observed when the liquid crystal panel 2 or 100 is looked at from an angle normal thereto (azimuth of 0 degrees, polar angle of 0 degree). The term "oblique gradation" here means a gradation as observed when the liquid crystal panel 2 or 100 is looked at from an angle inclined with respect to an angle normal to the liquid crystal panel 2 or 100 in an azimuth (azimuth of 45 degrees) 45 degrees off the absorption axes of the polarizing plates 35 and 36.

Figure 12:
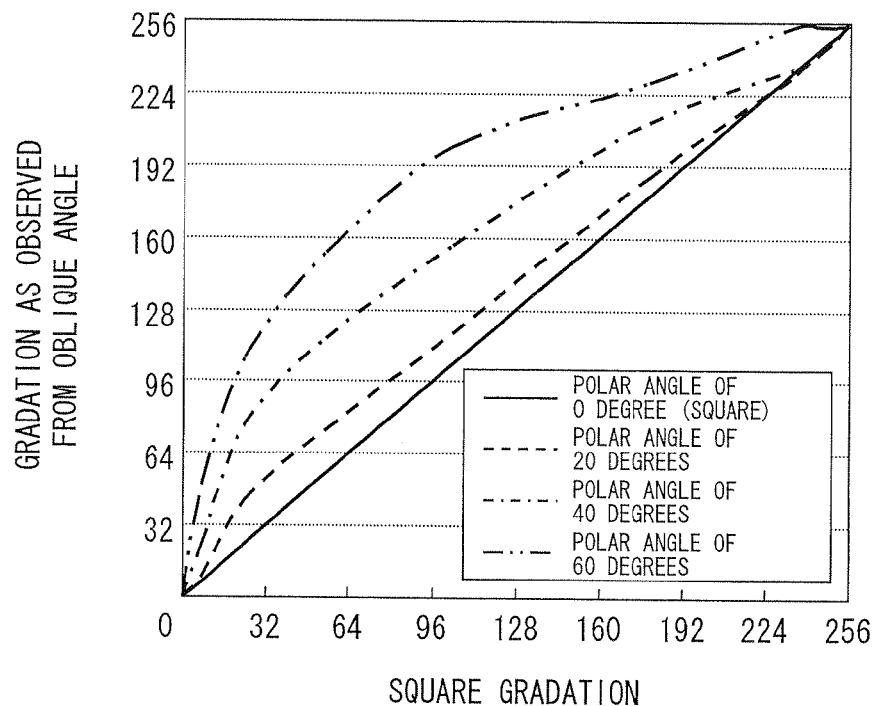
FIG. 12

Further, FIGS. 11 and 12 show gradations as observed from polar angles of 0 degree (square (normal) angle), 20 degrees, 40 degrees, and 60 degrees inclined with respect to the normal angle. Specifically, in each of FIGS. 11 and 12, the solid line, the dotted line, the dashed line, and the chain double-dashed line indicate gradations as observed from polar angles of 0 degree (square), 20 degrees, 40 degrees, and 60 degrees, respectively.

Further, in each of FIGS. 11 and 12, the gradation range differentiates 256 levels. The liquid crystal panel 2 has two types of VT curve occurring within the liquid crystal cell 5. For this reason, FIG. 11 represents gradations as indices in the form of luminance ratios to each separate gradation voltage after combining the VT curves in the two electric field regions in the liquid crystal panel 2.

That is, the oblique gradations with respect to the square gradation in the liquid crystal panel 2 as shown in FIG. 11 are obtained on the basis of the composite VT shown in FIG. 10.

Meanwhile, the oblique gradations with respect to the square gradation in the comparative liquid crystal panel 100 as shown in FIG. 12 are obtained on the basis of not the composite VT but one type of VT curve that is obtained in a case where $\in$=3 as shown in FIG. 10, because the liquid crystal panel 100 exhibits only one type of VT curve.

In both the liquid crystal panels 2 and 100, as shown in FIGS. 11 and 12, the larger the polar angle becomes, the greater an excess in luminance ratio becomes as observed from a square angle.

However, a comparison between FIG. 11 and FIG. 12 shows that in the liquid crystal panel 2, the extent of excess in luminance ratio is more significantly reduced than in the liquid crystal panel 100. That is, the liquid crystal panel 2 is less viewing-angle-dependent than the liquid crystal panel 100.

This is because whereas the liquid crystal panel 2 is finished with VT multiplication as mentioned above, the liquid crystal panel 100 is not finished with VT multiplication, albeit with a parallel electric field generated therein.

That is, in the liquid crystal panel 100, an electric field is controlled solely by the substrate 10 (array substrate) provided with the comb electrodes 14 and 15; therefore, regions having different VT characteristics cannot be formed in each pixel 6. For this reason, the luminance ratio at a polar angle to the tone-luminance ratio as observed from a square angle becomes excessive.

On the other hand, the liquid crystal panel 2 has provided in each pixel 6 at least two regions provided with insulating layers 25 that are different in relative permittivity from each other. For this reason, at least two regions having different VT characteristics are formed in each pixel 6. That is, because of VT multiplication, the extent of excess in luminance ratio as observed from an oblique angle can be reduced.

It should be noted that as described above, FIG. 10 shows a viewing angle characteristic obtained when, as described above, the insulating layer 25 is made by using, as the first insulating material and the second insulating material, two types of insulating material ($\in$=3, and $\in$=7), respectively, and the insulating layers 13 and 25 each have a thickness of 3 μm. However, the present embodiment is not to be limited to this.

(Excess Luminance)

Next, for a preferred difference in relative permittivity between insulating materials and a preferred insulating layer thickness for reducing the extent of excess luminance (excess luminance ratio) as observed from an oblique angle are explained in order.

(Difference in Relative Permittivity)

Figure 13:
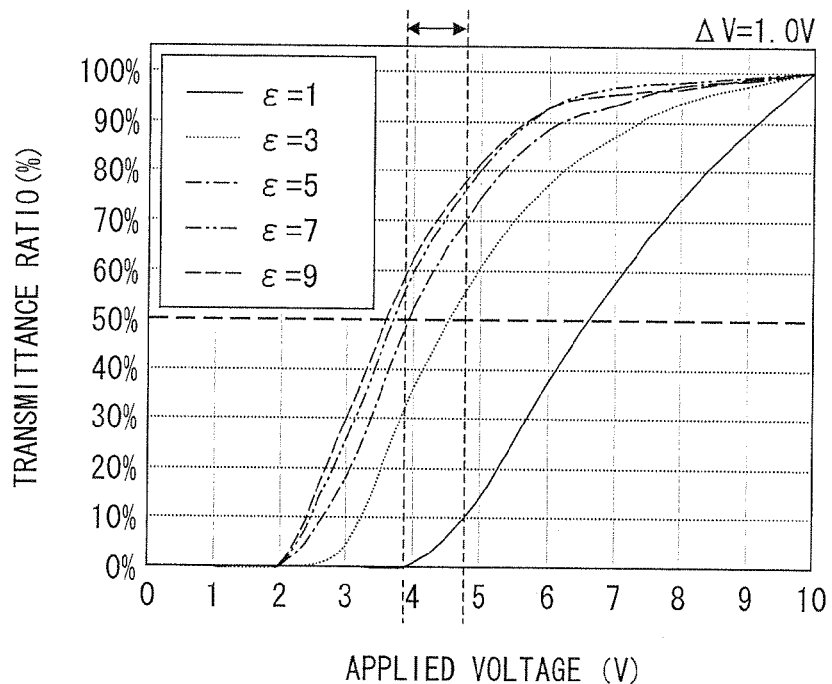
FIG. 13

FIG. 13 shows VT curves obtained by varying the relative permittivity of insulating materials for the insulating layer 25 in the liquid crystal panel 2 by means of simulations. The simulations were run by using an "LCD-MASTER" manufactured by SHINTECH, Inc.

In the case of MPD (multi-pixel drive) with the liquid crystal panel 2 used in a TV (television), it is preferable that a VT difference (ΔV) between different VT regions be 0.8 V or more or, more preferably, 1.0 V or more.

By thus forming, in each pixel 6, regions that are different in half-tone potential from each other by 0.8 V or more, the liquid crystal molecules 52 can be made to vary in alignment direction between the regions so sufficiently that the viewing angle characteristic can be improved. As a result, the viewing angle characteristic can be more surely improved. The term "halftone" here means a median gradation value in the whole gradation range.

It should be noted that ΔV=1.0 can be attained, for example, by causing one of the insulating materials to have a relative permittivity (relative permittivity $\in$) of approximately 3 and the other insulating material to have a relative permittivity (relative permittivity $\in$) of 7 and thereby satisfying Δ∈=4. For this purpose, it is only necessary to use an acrylic resin or the like having a relative permittivity ∈ of approximately 3 as one of the insulating materials and SiN or the like having a relative permittivity ∈ of approximately 7 as the other insulating material.

It should be noted that no big difference was found between a VT curve obtained when an insulating material having a relative permittivity ∈ of 9 was used and a VT curve obtained when an insulating material having a relative permittivity ∈ of 7 was used.

Further, in a case where an insulating material having a relative permittivity ∈ of less than 3 is used as one of the insulating materials, it is easy to obtain a greater VT difference (ΔV) than in a case where an insulating material having a relative permittivity ∈ of 3 is used as one of the insulating materials as described above. However, a decrease in value of ∈ causes a rise in applied voltage, thus leading to an increase in power consumption.

Therefore, for VT multiplication, the difference in relative permittivity (Δ∈) between insulating materials for adjacent insulating layers is preferably 2 or more or, more preferably, 3 or more.

Further, in a case where a material having a relative permittivity ∈ of less than 3 is used as one of the insulating materials, it is easy to obtain a greater VT difference (ΔV) than in a case where an insulating material having a relative permittivity ∈ of 3 is used as one of the insulating materials as described above. However, a decrease in value of ∈ causes a rise in applied voltage, thus possibly leading to an increase in power consumption.

As described above, for VT multiplication, a preferred difference in relative permittivity (relative permittivities for use in insulating layers provided adjacent to each other, Δ∈) is 2 or more or, more preferably, 3 or more.

(Insulating Layer Thickness)

The following looks into viewing angle levels as achieved with varying thicknesses of insulating layers of liquid crystal panels obtained by using the liquid crystal panels (1) to (3), (A) to (F), and 300 as the liquid crystal panels 2, 100, 200, and 300.

FIG. 14 shows tone-luminance ratios as observed from a square angle (polar angle of 0 degree) and oblique angles (polar angles of 10 degrees, 20 degrees, 30 degrees, 40 degrees, and 60 degrees) when the insulating layers 13 and 25 in the liquid crystal panel 2 each have a thickness of 2 μm. That is, the tone-luminance ratios were measured by using the liquid crystal panel (2) as the liquid crystal panel 2. Further, in FIG. 14, the azimuth is a direction 45 degrees off the absorption axes of the polarizing plates 35 and 36, as in FIG. 11.

Figure 27:
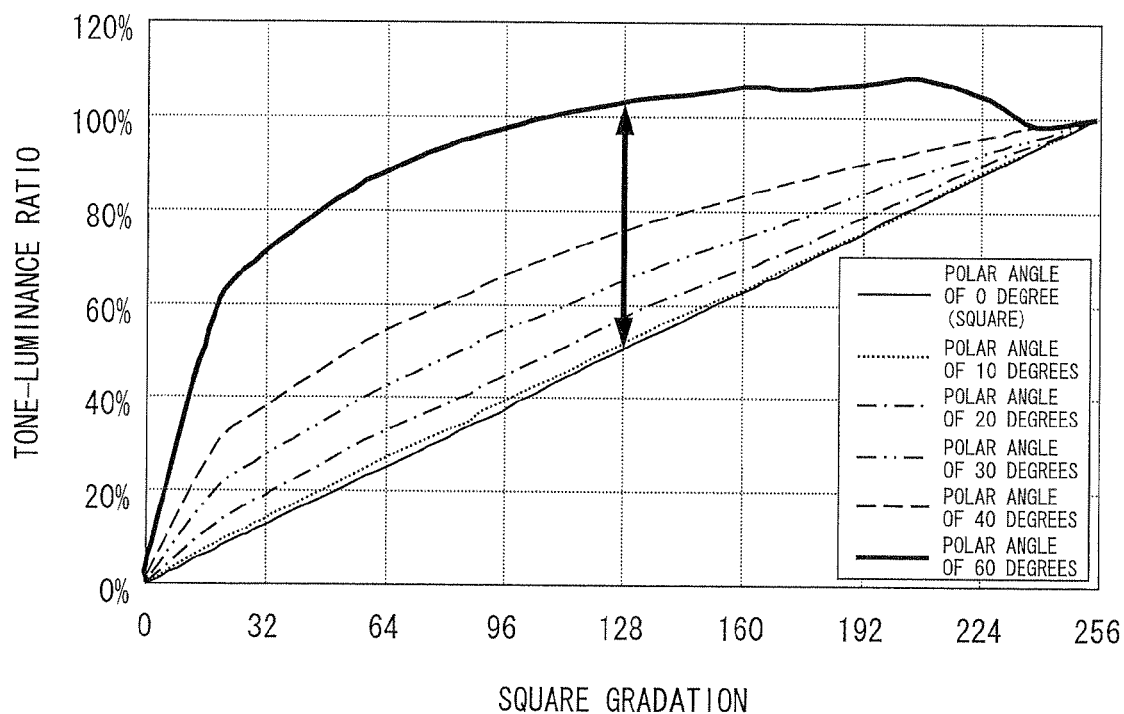
FIG. 27

Further, FIG. 27 shows tone-luminance ratios as observed when the liquid crystal panel 300 shown in FIG. 25 is looked at from a square angle (polar angle of 0 degree) and oblique angles (polar angles of 10 degrees, 20 degrees, 30 degrees, 40 degrees, and 60 degrees). It should be noted that in FIG. 27, too, the azimuth is a direction 45 degrees off the absorption axes of the polarizing plates 35 and 36.

Further, the level changes in oblique viewing angle with respect to the square curve were confirmed by placing a backlight on each of the liquid crystal panels (1) to (3), (A) to (F), and 300 and measuring, with use of "Ex-contrast" (product name) manufactured by ELDIM, a change in voltage transmittance as observed from a square angle and a change in voltage transmittance as observed from a polar angle of 45 degrees obliquely off the polarization axis.

Results obtained by thus measuring each of the liquid crystal panels (1) to (3), (A) to (F), and 300 for the difference in tone-luminance ratio (viewing angle level) between a square angle (polar angle of 0 degree) and a polar angle of 60 degrees at a gradation of 128 as indicated by double-headed arrows in FIGS. 14 and 27 are shown in Table 2.

It should be noted that in each of the liquid crystal panels (1) to (3), those regions in the insulating layer 25 which were made of different insulating materials were identical in thickness to each other as mentioned above and the insulating layer 13 was identical in thickness to the insulating layer 25. Further, in each of the liquid crystal panels (A) to (F), those regions in the insulating layers 13 or 213 which were made of different insulating materials were identical in thickness to each other as mentioned above. It should be noted that in each liquid crystal panel, the liquid crystal layer had a thickness of 3.4 μm.

TABLE 2

| | Liquid crystal panel | | | | | | | | | | | | | | | |
|---|---|---|---|---|---|---|---|---|---|---|---|---|---|---|---|---|
| | Liquid crystal panel 2 | | | | | | | | | Liquid crystal panel 100 | | | Liquid crystal panel 200 | | | Liquid crystal panel 300 |
| | Embodiment 1 | | | Embodiment 2 | | | Embodiment 3 | | | | | | | | | |
| Sample No. | (1) | (2) | (3) | (4) | (5) | (6) | (7) | (8) | (9) | (A) | (B) | (C) | (D) | (E) | (F) | panel 300 |
| Array-side insulating layer thickness (μm) | 1 | 2 | 3 | 1 | 2 | 3 | 1 | 2 | 3 | NA | NA | NA | NA | NA | NA | NA |
| CF-side insulating layer thickness (μm) | 1 | 2 | 3 | 1 | 2 | 3 | 1 | 2 | 3 | 1 | 2 | 3 | 1 | 2 | 3 | NA |
| Viewing angle level (difference) (%) | 30 | 26 | 25 | 34 | 32 | 30 | 42 | 40 | 36 | 51 | 51 | 52 | 38 | 41 | 48 | 53 |

As shown in FIG. 14 and Table 2, the liquid crystal panel (2), each of whose insulating layers 13 and 25 had a thickness of 2 μm, exhibited a difference (viewing angle level) of 26% and therefore exhibited a satisfactory viewing angle characteristic with little excess luminance as visually observed. It should be noted that in general, excess luminance becomes greater at a larger polar angle. In the present embodiment, many improvements in excess luminance were found at a polar angle of 60 degrees, and the luminance as observed from a square angle reaches 50% of its maximum at a square gradation of 128. As such, excess luminance was evaluated by excess in half-tone luminance as observed from a square angle.

Further, the liquid crystal panel (3), whose insulating layer 25 had a thickness of 3 μm, exhibited a difference (viewing angle level) of 25% as shown in Table 2 and therefore exhibited a more satisfactory viewing angle characteristic as visually observed.

Further, the liquid crystal panel (1), whose insulating layer 25 had a thickness of 1 μm, exhibited a difference (viewing angle level) of 30% as shown in Table 2 and therefore also exhibited a satisfactory viewing angle characteristic as visually observed.

On the other hand, as shown in Table 2, each of the liquid crystal panels (A) to (C) exhibited a difference (viewing angle level) of 51% or 52% regardless of the thickness of the insulating layer 25, and as such, none of them was able to exhibit a satisfactory viewing angle characteristic as visually observed.

Further, as shown in Table 2, each of the liquid crystal panels (D) to (F) exhibited a difference (viewing angle level) of more than 38%. In particular, the liquid crystal panel (F1), whose insulating layer 213 had a thickness of 3 μm, exhibited a difference (viewing angle level) of more than 48% as shown in Table 2 and therefore was not able to exhibit a satisfactory viewing angle characteristic.

Further, as shown in Table 2, the liquid crystal panel 300 exhibited a great difference (viewing angle level) of 53% and therefore exhibited a poor viewing angle level (viewing angle characteristic as visually observed.

These verification results show that the liquid crystal panel 2 according to the present embodiment has an improved viewing angle characteristic as compared with the comparative liquid crystal panels 100, 200, and 300. It should be noted that such an improved in viewing angle characteristic is due to a difference in curvedness of an electric field, i.e., in shape of equipotential lines within the liquid crystal cell 5.

Next, results obtained by verifying a relationship between the relative permittivity of the insulating layer 25 in each of the subpixels 6R, 6G, and 6B in the liquid crystal panel 2 and a change in color as observed from a square angle are explained below.

[Change in Color as Observed from a Square Angle]

The color of white is made by mixing the three colors of R, G, and B. The yellowish change in color tone as observed when the liquid crystal panel is looked squarely at is due to the difference in VT curve among the colors as shown in FIG. 26. Whereas the VT curves obtained in the R and G subpixels 6R and 6G are similar in shape to each other, the VT curve obtained in the B subpixel 6B reaches its maximum value of transmittance at a low-voltage side and then reverses. This makes the mixed color appear yellowish.

For this reason, in order to prevent a change in color from occurring as a result of the application of voltage, it is desirable that the VT curves obtained in the subpixels 6R, 6G, and 6B be as similar in shape as possible (or, preferably, identical in shape) to one another.

First, in order to suppress changes in color in the subpixels 6R, 6G, 6B as observed from a square angle, changes in VT curves as observed from a square angle due to the difference in relative permittivity of the insulating layer 25 in the subpixels 6R, 6G, and 6B of the liquid crystal panel 2 were obtained by means of simulations. The results are shown in FIGS. 15 through 17.

Figure 15:
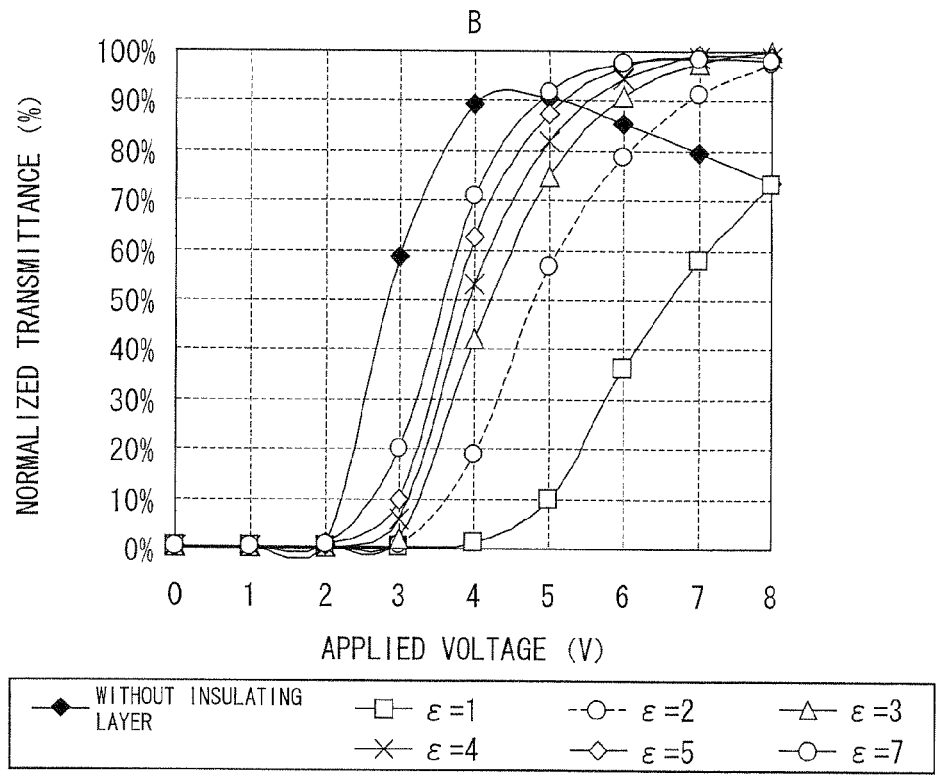
FIG. 15
Figure 16:
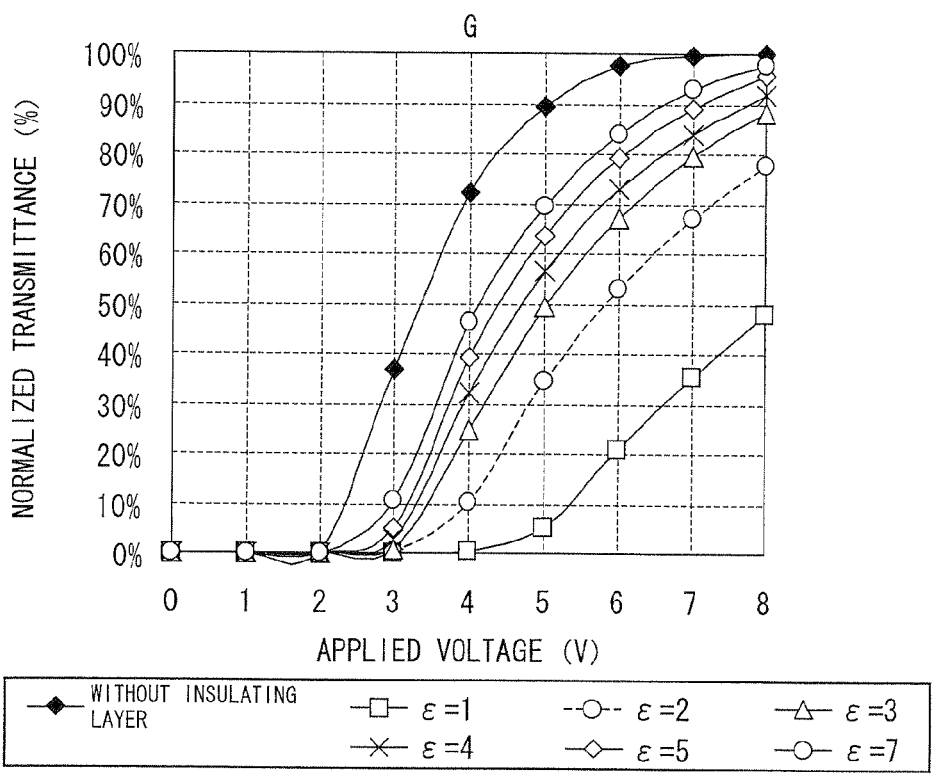
FIG. 16

FIG. 15 is a graph showing VT curves obtained by varying the relative permittivity of the insulating layer 25 in the subpixel 6B of the liquid crystal panel 2. FIGS. 16 and 17 are graphs VT curves obtained by varying the relative permittivity of the insulating layer 25 in the subpixels 6G and 6R of the liquid crystal panel 2, respectively.

The simulations were run by using an "LCD-MASTER" manufactured by SHINTECH, Inc. Further, in each of FIGS. 15 through 17, too, the horizontal axis represents applied voltage, and the vertical axis represents normalized transmittance (transmittance ratio).

Further, Tables 3 to 5 show relationships between the applied voltage and the transmittance in the subpixels 6R, 6G, and 6B during the simulations, respectively, and Tables 6-8 show relationships between the applied voltage and the normalized transmittance in the subpixels 6R, 6G, and 6B, respectively.

TABLE 3

| | | Transmittance/430 nm (blue) | | | | | | |
|---|---|---|---|---|---|---|---|---|
| | | Dielectric layer None | Dielectric layer $\epsilon = 1$ | Dielectric layer $\epsilon = 2$ | Dielectric layer $\epsilon = 3$ | Dielectric layer $\epsilon = 4$ | Dielectric layer $\epsilon = 5$ | Dielectric layer $\epsilon = 7$ |
| Applied voltage | 0 V | 0.1% | 0.1% | 0.1% | 0.1% | 0.1% (0.09%) | 0.1% | 0.1% |
| | 1 V | 0.1% | 0.1% | 0.1% | 0.1% | 0.1% (0.09%) | 0.1% | 0.1% |
| | 2 V | 0.2% | 0.1% | 0.1% | 0.1% | 0.1% (0.10%) | 0.1% | 0.1% |
| | 3 V | 9.6% | 0.1% | 0.1% | 0.3% | 1.0% (0.98%) | 1.6% | 3.3% |
| | 4 V | 14.6% | 0.2% | 3.1% | 6.9% | 8.7% (8.65%) | 10.2% | 11.5% |
| | 5 V | 14.8% | 1.6% | 9.2% | 12.2% | 13.4% (13.35%) | 14.3% | 15.0% |
| | 6 V | 14.0% | 5.9% | 12.9% | 14.9% | 15.4% (15.42%) | 15.8% | 16.0% |
| | 7 V | 13.0% | 9.4% | 14.9% | 16.0% | 16.1% (16.13%) | 16.2% | 16.1% |
| | 8 V | 12.0% | 12.0% | 15.9% | 16.3% | 16.1% (16.11%) | 16.1% | 16.0% |

TABLE 4

| | | Transmittance/550 nm (green) | | | | | | |
|---|---|---|---|---|---|---|---|---|
| | | Dielectric layer None | Dielectric layer $\epsilon=1$ | Dielectric layer $\epsilon=2$ | Dielectric layer $\epsilon=3$ | Dielectric layer $\epsilon=4$ | Dielectric layer $\epsilon=5$ | Dielectric layer $\epsilon=7$ |
| Applied voltage | 0 V | 0.0% | 0.0% | 0.0% | 0.0% | 0.0% | 0.0% | 0.0% |
| | 1 V | 0.0% | 0.0% | 0.0% | 0.0% | 0.0% | 0.0% | 0.0% |
| | 2 V | 0.1% | 0.0% | 0.0% | 0.0% | 0.0% | 0.0% | 0.0% |
| | 3 V | 7.7% | 0.0% | 0.0% | 0.2% | 0.6% | 1.1% | 2.3% |
| | 4 V | 15.1% | 0.1% | 2.1% | 5.2% | 6.7% | 8.2% | 9.7% |
| | 5 V | 18.8% | 1.1% | 7.3% | 10.4% | 11.9% | 13.3% | 14.6% |
| | 6 V | 20.5% | 4.3% | 11.2% | 14.1% | 15.3% | 16.6% | 17.6% |
| | 7 V | 20.9% | 7.4% | 14.1% | 16.7% | 17.6% | 18.7% | 19.5% |
| | 8 V | 21.0% | 10.0% | 16.3% | 18.5% | 19.2% | 20.1% | 20.5% |

TABLE 5

| | | Transmittance/630 nm (red) | | | | | | |
|---|---|---|---|---|---|---|---|---|
| | | Dielectric layer None | Dielectric layer $\epsilon=1$ | Dielectric layer $\epsilon=2$ | Dielectric layer $\epsilon=3$ | Dielectric layer $\epsilon=4$ | Dielectric layer $\epsilon=5$ | Dielectric layer $\epsilon=7$ |
| Applied voltage | 0 V | 0.0% | 0.0% | 0.0% | 0.0% | 0.0% | 0.0% | 0.0% |
| | 1 V | 0.0% | 0.0% | 0.0% | 0.0% | 0.0% | 0.0% | 0.0% |
| | 2 V | 0.1% | 0.0% | 0.0% | 0.0% | 0.0% | 0.0% | 0.0% |
| | 3 V | 6.0% | 0.0% | 0.0% | 0.1% | 0.4% | 0.8% | 1.7% |
| | 4 V | 12.5% | 0.0% | 1.6% | 3.9% | 4.4% | 6.4% | 7.6% |
| | 5 V | 16.4% | 0.8% | 5.6% | 8.2% | 9.7% | 10.7% | 11.9% |
| | 6 V | 18.6% | 3.3% | 8.8% | 11.4% | 12.7% | 13.8% | 14.8% |
| | 7 V | 19.4% | 5.7% | 11.4% | 13.8% | 15.0% | 15.9% | 16.8% |
| | 8 V | 19.8% | 7.8% | 13.4% | 15.7% | 16.6% | 17.5% | 18.2% |

TABLE 6

| | | Normalized transmittance/430 nm (blue) | | | | | | |
|---|---|---|---|---|---|---|---|---|
| | | Dielectric layer None | Dielectric layer $\epsilon=1$ | Dielectric layer $\epsilon=2$ | Dielectric layer $\epsilon=3$ | Dielectric layer $\epsilon=4$ | Dielectric layer $\epsilon=5$ | Dielectric layer $\epsilon=7$ |
| Applied voltage | 0 V | 0.6% | 0.6% | 0.6% | 0.6% | 0.6% | 0.6% | 0.6% |
| | 1 V | 0.6% | 0.6% | 0.6% | 0.6% | 0.6% | 0.6% | 0.6% |
| | 2 V | 1.2% | 0.6% | 0.6% | 0.6% | 0.6% | 0.6% | 0.6% |
| | 3 V | 58.6% | 0.6% | 0.9% | 2.0% | 6.0% | 10.0% | 19.9% |
| | 4 V | 89.4% | 1.0% | 19.0% | 42.3% | 53.0% | 62.4% | 70.7% |
| | 5 V | 90.6% | 9.8% | 56.5% | 74.9% | 81.7% | 87.6% | 91.6% |
| | 6 V | 85.5% | 36.2% | 78.8% | 91.0% | 94.4% | 96.9% | 97.8% |
| | 7 V | 79.6% | 57.8% | 91.2% | 97.8% | 98.8% | 99.2% | 98.4% |
| | 8 V | 73.5% | 73.2% | 97.5% | 100.0% | 98.7% | 98.7% | 98.2% |

TABLE 7

| | | Normalized transmittance/550 nm (green) | | | | | | |
|---|---|---|---|---|---|---|---|---|
| | | Dielectric layer None | Dielectric layer $\epsilon=1$ | Dielectric layer $\epsilon=2$ | Dielectric layer $\epsilon=3$ | Dielectric layer $\epsilon=4$ | Dielectric layer $\epsilon=5$ | Dielectric layer $\epsilon=7$ |
| Applied voltage | 0 V | 0.0% | 0.0% | 0.0% | 0.0% | 0.0% | 0.0% | 0.0% |
| | 1 V | 0.0% | 0.0% | 0.0% | 0.0% | 0.0% | 0.0% | 0.0% |
| | 2 V | 0.4% | 0.0% | 0.0% | 0.1% | 0.1% | 0.1% | 0.1% |

TABLE 7-continued

| | | Normalized transmittance/550 nm (green) | | | | | | |
|---|---|---|---|---|---|---|---|---|
| | | Dielectric layer None | Dielectric layer $\epsilon = 1$ | Dielectric layer $\epsilon = 2$ | Dielectric layer $\epsilon = 3$ | Dielectric layer $\epsilon = 4$ | Dielectric layer $\epsilon = 5$ | Dielectric layer $\epsilon = 7$ |
| | 3 V | 36.7% | 0.1% | 0.2% | 0.8% | 2.7% | 5.1% | 10.8% |
| | 4 V | 72.0% | 0.3% | 10.2% | 24.6% | 32.1% | 39.3% | 46.3% |
| | 5 V | 89.3% | 5.0% | 34.5% | 49.6% | 56.5% | 63.4% | 69.6% |
| | 6 V | 97.6% | 20.6% | 53.1% | 67.2% | 73.0% | 79.0% | 83.9% |
| | 7 V | 99.5% | 35.4% | 67.1% | 79.5% | 83.8% | 89.2% | 92.8% |
| | 8 V | 100.0% | 47.7% | 77.6% | 88.3% | 91.6% | 95.9% | 97.6% |

TABLE 8

| | | Normalized transmittance/630 nm (red) | | | | | | |
|---|---|---|---|---|---|---|---|---|
| | | Dielectric layer None | Dielectric layer $\epsilon = 1$ | Dielectric layer $\epsilon = 2$ | Dielectric layer $\epsilon = 3$ | Dielectric layer $\epsilon = 4$ | Dielectric layer $\epsilon = 5$ | Dielectric layer $\epsilon = 7$ |
| Applied voltage | 0 V | 0.0% | 0.0% | 0.0% | 0.6% | 0.0% | 0.0% | 0.0% |
| | 1 V | 0.0% | 0.0% | 0.0% | 0.6% | 0.0% | 0.0% | 0.0% |
| | 2 V | 0.3% | 0.0% | 0.0% | 0.1% | 0.1% | 0.1% | 0.1% |
| | 3 V | 30.1% | 0.1% | 0.2% | 0.6% | 2.0% | 4.0% | 8.5% |
| | 4 V | 63.2% | 0.2% | 8.1% | 19.8% | 22.0% | 32.3% | 38.5% |
| | 5 V | 82.7% | 3.9% | 28.1% | 41.3% | 48.9% | 54.1% | 60.1% |
| | 6 V | 94.1% | 16.5% | 44.4% | 57.6% | 64.0% | 69.6% | 74.9% |
| | 7 V | 98.0% | 28.9% | 57.5% | 69.9% | 75.7% | 80.6% | 84.8% |
| | 8 V | 100.0% | 39.6% | 67.8% | 79.3% | 83.8% | 88.4% | 91.9% |

As can be seen from FIGS. 15 through 17 and Tables 3 to 8, in a case where an insulating layer 25 is provided in any of those regions between the branch electrodes 14A and 15A of the comb electrodes 14 and 15 to which a transverse electric field is applied, the VT curves varies in shape according to the values of the relative permittivity ∈ of the insulating layer 25.

Figure 18:
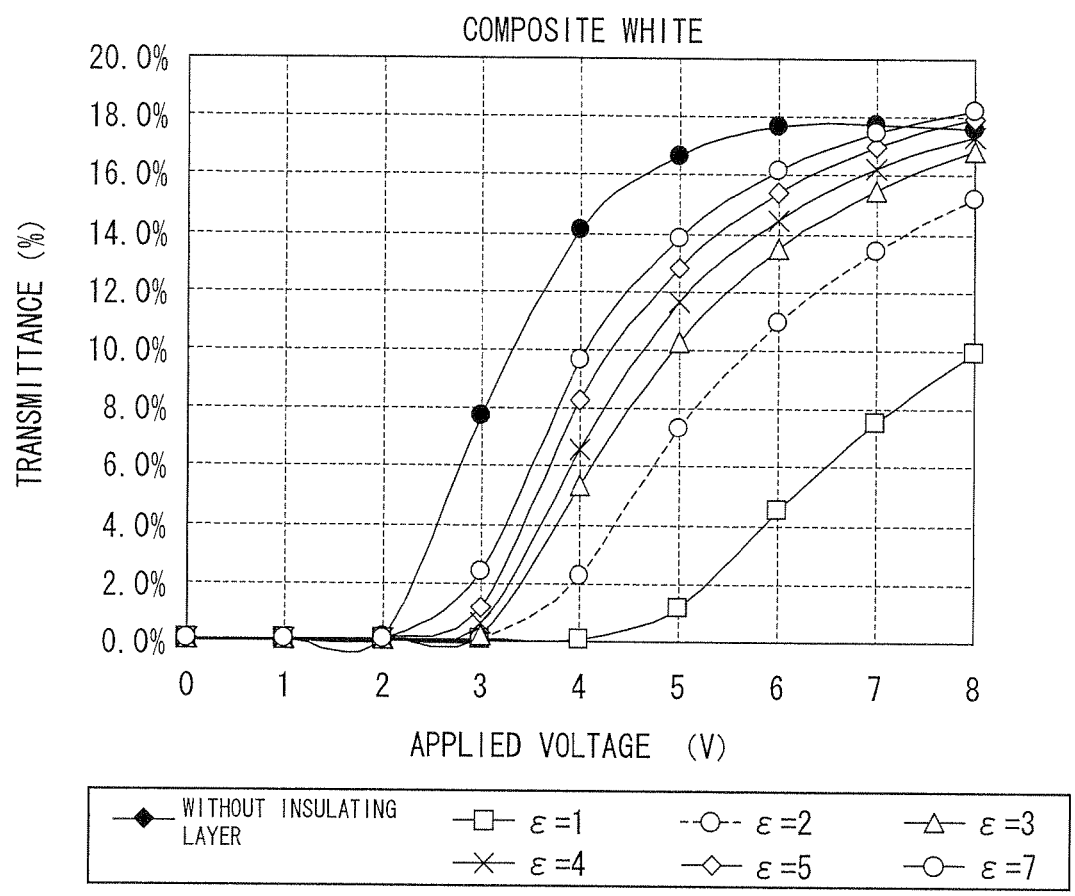
FIG. 18

Accordingly, next, VT curves in a white state (during a white display) were obtained by combining R, G, and B VT curves as observed from a square angle. The VT curves thus obtained are shown in FIG. 18. Further, Table 9 shows a relationship between the applied voltage and the transmittance during the white display.

TABLE 9

| | | Transmittance/Synthetic white | | | | | | |
|---|---|---|---|---|---|---|---|---|
| | | Dielectric layer None | Dielectric layer $\epsilon = 1$ | Dielectric layer $\epsilon = 2$ | Dielectric layer $\epsilon = 3$ | Dielectric layer $\epsilon = 4$ | Dielectric layer $\epsilon = 5$ | Dielectric layer $\epsilon = 7$ |
| Applied voltage | 0 V | 0.0% | 0.0% | 0.0% | 0.0% | 0.0% | 0.0% | 0.0% |
| | 1 V | 0.0% | 0.0% | 0.0% | 0.0% | 0.0% | 0.0% | 0.0% |
| | 2 V | 0.1% | 0.0% | 0.0% | 0.0% | 0.0% | 0.0% | 0.0% |
| | 3 V | 7.8% | 0.0% | 0.1% | 0.2% | 0.6% | 1.2% | 2.4% |
| | 4 V | 14.1% | 0.1% | 2.3% | 5.3% | 6.6% | 8.3% | 9.6% |
| | 5 V | 16.6% | 1.1% | 7.4% | 10.3% | 11.6% | 12.8% | 13.8% |
| | 6 V | 17.7% | 4.5% | 10.9% | 13.5% | 14.5% | 15.4% | 16.1% |
| | 7 V | 17.8% | 7.5% | 13.5% | 15.5% | 16.2% | 17.0% | 17.4% |
| | 8 V | 17.6% | 9.9% | 15.2% | 16.9% | 17.3% | 17.9% | 18.2% |

As shown in Table 9, in the absence of an, insulating layer 25, the VT curve reaches its peak (maximum value) at around 6 V and then turns down due to the influence of the shape of the blue (B) VT curve.

Meanwhile, in the presence of an insulating layer 25, no such a phenomenon is observed as would be observed in the absence of an insulating layer 25 where the VT curve reaches its peak (maximum value) and then turns down. However, since, as can be seen from Table 9, there is an extreme increase in voltage in a case where ∈=1, use of such a relative permittivity is undesirable from a point of view of power consumption. For this reason, it is preferable that the relative permittivity ∈ be 2 or higher.

Further, as the VT curves obtained in the subpixels 6R, 6G, and 6B become more similar to one another, the balance in the color of white does not shift from voltage to voltage, so that there are less changes in color as observed from a square angle.

Therefore, changes in color can be minimized by selecting a combination of relative permittivities of the insulating layer 25 in the R, G, and B subpixels 6R, 6G, and 6B so that the VT curves obtained in the R, G, and B subpixels 6R, 6G, and 6B are similar in shape to one another.

Accordingly, next, the result of the study of an optimum combination of relative permittivities is explained below.

FIG. 19 is a graph showing VT curves obtained by varying the relative permittivity ∈ in the R, G, and B subpixels 6R, 6G, and 6B, excerpts from the relationships between the applied voltage and the normalized transmittance shown in Tables 6 to 8 being shown in the form of VT curves. In FIG. 19, the values of R, G, and B represent the values of relative permittivity ∈ in the R, G, and B subpixels 6R, 6G, and 6B, respectively. Further, as can be seen from Tables 6 to 8, the VT curves obtained with the use of relative permittivities not shown in FIG. 19 are located between the VT curves in the corresponding R, G, and B subpixels 6R, 6G, and 6B as obtained with the use of relative permittivities ∈ higher or lower than the relative permittivities ∈ not shown in FIG. 19.

In determining an optimum combination of relative permittivities, the inventors focused their attention on the blue subpixel 6B.

Among the VT curves obtained in the R, G, and B subpixels 6R, 6G, and 6B, only the VT curve obtained in the blue subpixel 6B reverses (i.e., starts to decrease in transmittance after reaching its maximum value). A change in the color of white, which is made by mixing the three colors of R, G, and B, is derived from a decrease in the blue component due to the reversal of the VT curve.

As can be seen from Tables 3 to 8, in the range of relative permittivities ∈ of 1 to 3 of the insulating layer 25 in the subpixel 6B, VT free of tone reversal is obtained, as in the cases of the subpixels 6R and 6G.

However, as can be seen from Tables 3 to 8, FIGS. 15 through 17, and FIG. 19, in a case where the relative permittivity ∈ of the insulating layer 25 in the subpixel 6B is 2 or lower, there is no relative permittivity ∈ at which any of the VT curves obtained in the subpixels 6R and 6G exhibits a rise of the same shape.

Specifically, as can be seen from FIG. 19, in a case where the relative permittivity ∈ of the insulating layer 25 in the subpixel 6B is 2, the VT curve rises sharply as compared with the other VT curves obtained in the subpixels 6R and 6G, and there is no relative permittivity ∈ at which any of the VT curves obtained in the subpixels 6R and 6G exhibits a rise of the same shape.

Further, as can be seen from FIGS. 15 through 17 and FIG. 19, in a case where the relative permittivity ∈ of the insulating layer 25 in the subpixel 6B is 1, there is no relative permittivity ∈ at which any of the VT curves obtained in the subpixels 6R and 6G exhibits a rise of the same shape. Further, since there is an extreme increase in voltage in a case where ∈=1, use of such a relative permittivity is undesirable from a point of view of power consumption.

Further, also in the conventional vertical alignment liquid crystal panel 300 based on a transverse electric field drive system, which has no insulating layers 13 and 25, the blue subpixel 6B exhibits no tone reversal at a low-voltage side (4V or below) as with the subpixels 6R and 6G as shown in FIG. 26, so that there are less changes in color.

Accordingly, the maximum value of a difference in normalized transmittance at 4 V in the liquid crystal panel 300 having no insulating layers 13 and 25 was set as a comparative value.

The maximum value of the difference in normalized transmittance at 4 V in the liquid crystal panel 300 is calculated as 89% (normalized transmittance at the time of application of 4 V in the subpixel 6B)-63% (normalized transmittance at the time of application of 4 V in the subpixel 6R)=26% from FIG. 26 and Table 1.

Further, the color made by mixing the colors of the R, G, and B subpixels 6R, 6G, and 6B whose VT curves are identical in shape to one another shows very few changes in color from black through gray to white.

Accordingly, the relative permittivity ∈ of the insulating layer 25 in the subpixels 6R and 6G at which the average of normalized transmittances at voltages of 4 V to 6 V falls within 26% was determined by varying the relative permittivity ∈ of the insulating layer 25 in the subpixels 6R and 6G while fixing the relative permittivity of the insulating layer 25 in the subpixel 6B to 3 so that the VT curves for each separate color rise in identical shapes and the VT curves obtained for each separate color with the use of normalized transmittance are identical to one another with a small shift amount.

FIG. 20 shows VT curves against normalized transmittance that rise in identical shapes to a VT curve representing the blue subpixel 6B with a relative permittivity of 3, with variations in the relative permittivity ∈ of the insulating layer 25 in the R and G subpixels 6R and 6G. Table 10 shows a relationship between the average of normalized transmittances at voltages of 4 V to 6 V in the R, G, and B subpixels 6R, 6G, and 6B and the relative permittivity ∈.

In Table 10 and FIG. 20, the values of R, G, and B represent the values of relative permittivity ∈ in the R, G, and B subpixels 6R, 6G, and 6B, respectively. Further, although Table 10 shows values rounded off to the first decimal place, the values shown in Table 10 are values calculated to the second decimal place.

TABLE 10

| | | Normalized transmittance (%) Value of relative permittivity ∈ | | | | | | |
|---|---|---|---|---|---|---|---|---|
| | | B = 3 | G = 3 | G = 5 | G = 7 | R = 4 | R = 5 | R = 7 |
| Applied voltage | 4 V | 42.3% | 24.6% | 39.3% | 46.3% | 22.0% | 32.3% | 38.5% |
| | 5 V | 74.9% | 49.6% | 63.4% | 69.6% | 48.9% | 54.1% | 60.1% |
| | 6 V | 91.0% | 67.2% | 79.0% | 83.9% | 64.0% | 69.6% | 74.9% |
| AVE | 3 V | 69.4% | 47.1% | 60.6% | 66.6% | 45.0% | 52.0% | 57.8% |
| ΔB—each color | 4 V | | 22.2% | 8.8% | 2.7% | 24.4% | 17.4% | 11.5% |

AVE: Average of normalized transmittances at 4 to 6 V.
ΔB—each color: (Average of normalized transmittances at 4 to 6 V in blue subpixel) − (Average of normalized transmittances at 4 to 6 V in subpixel of each color)

The results shown in FIG. 20 and in Table 10 show that on the basis of the relative permittivity (∈=3) of the insulating layer 25 in the subpixel 6B, the average of normalized transmittances at voltages of 4 V to 6 V fall within 26% when the relative permittivity of the insulating layer 25 in the subpixel 6G is 0 or higher to 4 or lower (i.e., ∈=3 to 7) and the relative permittivity of the insulating layer 25 in the subpixel 6R is 1 or higher to 4 or lower (i.e., ∈=4 to 7).

Therefore, according to the present embodiment, as described above, by causing the relative permittivity ∈ of the insulating layer 25 in the subpixel 6B to be 3, causing the relative permittivity ∈ of the insulating layer 25 in the subpixel 6G to be 3 to 7, and causing the relative permittivity ∈ of the insulating layer 25 in the subpixel 6R to be 4 to 7, a tone reversal can be prevented and, moreover, the VT (voltage-transmittance) curves obtained in the R, G, and B subpixels 6R, 6G, and 6B can be made similar in shape to one another. This makes it possible to provide a liquid crystal panel 2 which, regardless of the applied voltage, shows few changes in color when looked squarely at.

For this reason, assuming that the sole problem to be solved is a change in color, in a case where the relative permittivity ∈ of each of the insulating layers 13 and 25 of the liquid crystal panel 2 is 3, it is not indispensable for the insulating layers 13 and 25 to have regions that are different in relative permittivity ∈ from one another.

However, as described above, in a case where the insulating layer 25 has provided in each pixel 6 at least two regions that are different in relative permittivity from each other, at least two electric field regions that are different in shape of equipotential lines from each other are formed in each pixel 6 when a transverse electric field is generated. For this reason, in this case, there are improvements in excess brightness as observed from an oblique angle and in viewing angle characteristic as mentioned above.

Therefore, by causing the insulating layer 25 to have provided in each pixel 6 at least two regions that are different in relative permittivity from each other and, as described above, by causing the relative permittivity ∈ of the insulating layer 25 in the subpixel 6B to be 3, causing the relative permittivity ∈ of the insulating layer 25 in the subpixel 6G to be 3 to 7, and causing the relative permittivity ∈ of the insulating layer 25 in the subpixel 6R to be 4 to 7, a liquid crystal panel 2 can be provided which shows few changes in color when looked squarely at and which has an excellent viewing angle characteristic.

Next, the result of the study of still another modification of a liquid crystal panel 2 according to the present invention is shown below.

[Embodiment 2]

Another embodiment of the present invention is described below with reference to FIGS. 21 and 22.

It should be noted that the following description mainly explains points of difference from the liquid crystal panel 2 according to Embodiment 1. Those components having the same functions as those described above in Embodiment 1 are given the same reference numerals, and as such, are not described below.

FIG. 21 is a cross-sectional view schematically showing a configuration of a main part of a liquid crystal panel 2 according to the present embodiment.

As shown in FIG. 21, the liquid crystal panel 2 according to the present embodiment differs from the liquid crystal panel 2 shown in FIG. 1 in that the substrate 10 is replaced by a substrate 60 not provided with a solid electrode 12 or an insulating layer 13 serving as an array-side insulating layer. That is, the liquid crystal panel 2 of the present embodiment does not have an FFS structure.

The substrate 60 has the same configuration as the substrate 10 shown in FIG. 1, except that the substrate 60 is not provided with a solid electrode 12 or an insulating layer 13 serving as an array-side insulating layer.

In the following, the configuration of the liquid crystal panel 2 structured as shown in FIG. 21 is specifically described by taking, as an example, a method for manufacturing samples (liquid crystal panels (4) to (6)) used for verification. As for the following manufacturing method, too, the samples were manufactured under the same conditions unless otherwise noted.

[Liquid Crystal Panels (4) to (6)]

First, as shown in FIG. 21, comb electrodes 14 and 15 of ITO, each 1000 Å in thickness and 4 μm in electrode width L, were formed at an interelectrode space S of 4 μM from each other on a glass substrate 11.

Next, alignment film paint (γ-butyrolactone solution marketed as "JALS-204" with a solid content of 5% by weight) manufactured by JSR Corporation was applied onto the glass substrate 11 by spin coating in such a manner as to cover the comb electrodes 14 and 15. After that, by sintering for two hour at 200° C., a substrate 60 was formed which had a surface that would face a liquid crystal layer 50 and which had an alignment film 16 provided as a vertical alignment film on that surface.

Meanwhile, substrates 20 having the same structure as those in the liquid crystal panels (4) to (6) were formed by using the same materials and the same processes as those used for the method for manufacturing the substrates 20 in the liquid crystal panels (1) to (3).

It should be noted that in the present embodiment, too, the alignment films 16 and 26 thus formed each had a dry film thickness of 1000 Å (=0.1 μm).

After that, resin beads 3.25 μm in diameter (Micropearl SP20325) were dispersed as spacers onto one of the substrates 60 and 20. Meanwhile, a sealing resin (Structbond XN-21S) was printed as a sealing agent on the other substrate that faced the above substrate.

Next, the substrates 60 and 20 were joined together and sintered for one hour at 135° C.

After that, a positive liquid crystal material ($\Delta\epsilon$=20, $\Delta n$=0.15) manufactured by Merck & Co., Inc was encapsulated as a liquid crystal material in a space between the substrates 60 and 20 by a vacuum injection method, whereby a liquid crystal cell 5 was fabricated in which the liquid crystal layer 50 was sandwiched between the pair of substrates 60 and 20.

Then, polarizing plates 35 and 36 were joined on the front and back surfaces of the liquid crystal cell 5 in the same manner as in the liquid crystal panels (1) to (3). In this manner, the liquid crystal panels (4) to (6) were each fabricated in the form of a liquid crystal panel 2 (liquid crystal display element) shown in FIG. 21. The liquid crystal panels (4) to (6) differed in thickness of the insulating layers 25 from one another.

(Excess Luminance)

FIG. 22 shows tone-luminance ratios as observed from a square angle (polar angle of 0 degree) and oblique angles (polar angles of 10 degrees, 20 degrees, 30 degrees, 40 degrees, and 60 degrees) when the insulating layer 25 in the liquid crystal panel 2 shown in FIG. 21 has a thickness of 1 μm. That is, the tone-luminance ratios were measured by using the liquid crystal panel (4). Further, in FIG. 22, too, the azimuth is a direction 45 degrees off the absorption axes of the polarizing plates 35 and 36.

Further, the level changes in oblique viewing angle with respect to the square curve were confirmed by placing a backlight on each of the liquid crystal panels described above and measuring, with use of "Ex-contrast" (product name) manufactured by ELDIM, a change in voltage transmittance as observed from a square angle and a change in voltage transmittance as observed from a polar angle of 45 degrees obliquely off the polarization axis.

Results obtained by thus measuring each of the liquid crystal panels (4) to (6) for the difference in tone-luminance ratio (viewing angle level) between a square angle (polar angle of 0 degree) and a polar angle of 60 degrees at a gradation of 128 as indicated by a double-headed arrow in FIG. 22 are shown in Table 2.

As shown in Table 2, the liquid crystal panels (4) to (6) exhibited a difference (viewing angle level) of at most 34% in tone-luminance ratio between a square angle (polar angle of degree) and a polar angle of 60 degrees at a square gradation of 128, which is not only smaller than the difference (viewing angle level) in the liquid crystal panel 300 but also smaller than the difference (viewing angle level) of 38% in the VA-type liquid crystal panel 200, and therefore exhibited a dramatically improved viewing angle characteristic. Further, as a result of visual observation, satisfactory viewing angle characteristics were obtained.

[Change in Color as Observed from a Square Angle]

Further, Table 11 shows a relationship between the applied voltage and the normalized transmittance in the subpixel 6B as obtained by using an insulating layer 25 having a thickness of 3 μm in the liquid crystal panel 2 and varying the relative permittivity $\in$ of the insulating layer 25. That is, Table 11 shows a relationship between the applied voltage and the normalized transmittance as obtained by using the liquid crystal panel (6) as the liquid crystal panel 2.

TABLE 11

| | | Liquid crystal panel 2 | | | | | |
|---|---|---|---|---|---|---|---|
| | | Embodiment 2 Transmittance/430 nm (blue) | | | Embodiment 3 Transmittance/430 nm (blue) | | |
| | | Dielectric layer $\epsilon = 2$ | Dielectric layer $\epsilon = 3$ | Dielectric layer $\epsilon = 4$ | Dielectric layer $\epsilon = 2$ | Dielectric layer $\epsilon = 3$ | Dielectric layer $\epsilon = 4$ |
| Applied Voltage | 0 V | 0.1% | 0.1% | 0.1% | 0.1% | 0.1% | 0.1% |
| | 1 V | 0.1% | 0.1% | 0.1% | 0.1% | 0.1% | 0.1% |
| | 2 V | 0.1% | 0.1% | 0.1% | 0.1% | 0.1% | 0.1% |
| | 3 V | 0.1% | 0.3% | 1.0% | 0.1% | 0.1% | 0.1% |
| | 4 V | 3.2% | 7.1% | 8.9% | 2.7% | 6.0% | 7.5% |
| | 5 V | 9.5% | 12.5% | 13.7% | 7.8% | 10.3% | 11.2% |
| | 6 V | 13.2% | 15.2% | 15.8% | 10.8% | 12.5% | 13.0% |
| | 7 V | 15.3% | 16.4% | 16.5% | 13.0% | 13.9% | 14.1% |
| | 8 V | 16.2% | 16.5% | 16.3% | 13.8% | 14.1% | 13.9% |

As can be seen from Table 11, the liquid crystal panel 2 according to the present embodiment also exhibits a reversal (i.e., tone reversal) of a VT curve in the subpixel 6B at $\in=4$ and exhibits the same behavior as the liquid crystal panel 2 according to the preceding embodiment.

Further, the liquid crystal panels (4) and (5) produced the same results as the liquid crystal panels (1) to (3) according Embodiment 1 and the liquid crystal panel (6).

Therefore, in the liquid crystal panel 2 according to the present embodiment, as in the liquid crystal panel 2 according to Embodiment 1, a change in color as observed from a square angle can be suppressed by causing the relative permittivity $\in$ of the insulating layer 25 in the subpixel 6B to be 3, causing the relative permittivity $\in$ of the insulating layer 25 in the subpixel 6G to be 3 to 7, and causing the relative permittivity $\in$ of the insulating layer 25 in the subpixel 6R to be 4 to 7. Further, in the present embodiment, too, by having provided in each pixel 6 at least two regions that are different in relative permittivity from each other and being finished with VT multiplication as described above, the liquid crystal panel 2 can make a liquid crystal panel 2 which shows few changes in color when looked squarely at and which has an excellent viewing angle characteristic.

[Embodiment 3]

Still another embodiment of the present invention is described below with reference to FIGS. 23 and 24.

It should be noted that the following description mainly explains points of difference from the liquid crystal panel 2 according to Embodiment 1. Those components having the same functions as those described above in Embodiments 1 and 2 are given the same reference numerals, and as such, are not described below.

Figure 23:
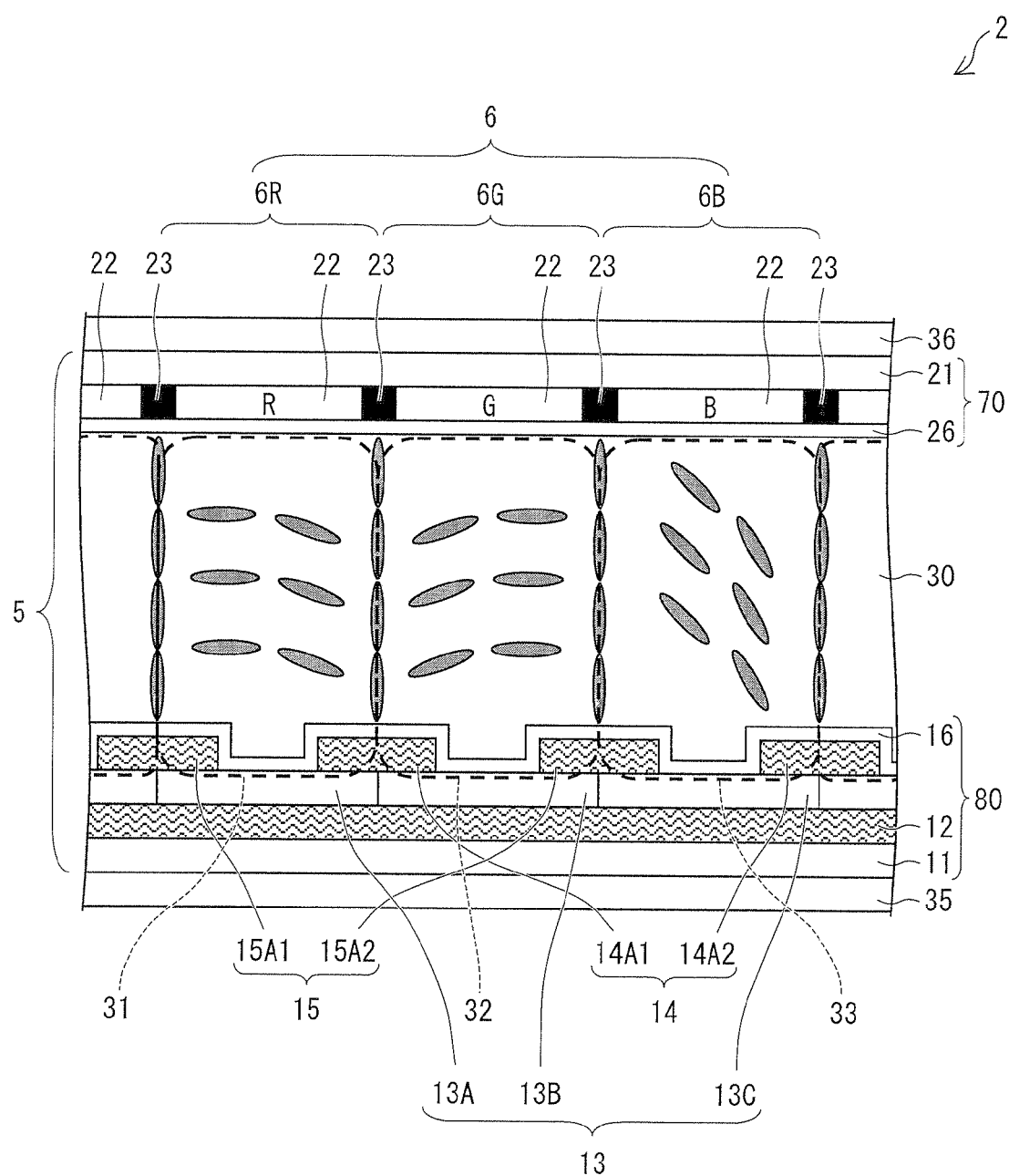
FIG. 23

FIG. 23 is a cross-sectional view schematically showing a configuration of a main part of a liquid crystal panel 2 according to the present embodiment.

As shown in FIG. 23, the liquid crystal panel 2 according to the present embodiment includes a substrate 80 (array substrate), a substrate 70 (counter substrate), and a liquid crystal layer 50 sandwiched between the substrate 80 and the substrate 70.

As shown in FIG. 23, the substrate 80 includes: a glass substrate 11; a solid electrode 12 (third electrode) stacked on the glass substrate 11; an insulating layer 13 (array-side insulating layer) stacked on the solid electrode 12; comb electrodes 14 and 15 (first and second electrodes) stacked on the insulating layer 13; and an alignment film 16 stacked on the insulating layer 13 and the comb electrodes 14 and 15.

The substrate 10 differs from the substrate 10 in that the insulating layer 13 has provided in each pixel 6 at least two regions constituted by insulating layers that are different in relative permittivity from each other and functions as a VT multiplication layer that forms at least two electric field regions that are different in shape of equipotential lines from each other. That is, in the present embodiment, the insulating layer 13 that varies in relative permittivity from one part to another is provided on the array electrode 12 on the side of the substrate 80 serving as an array substrate.

FIG. 23 shows an example where assuming that the insulating layer 13 has regions 13A, 13B, and 13C bordering each other along the central parts of the branch electrodes 15A and 14A of the comb electrodes 14 and 15 and corresponding to a space between the branch electrodes 15A1 and 14A1, a space between the branch electrodes 14A1 and 15A2, and a space between the branch electrodes 15A2 and 14A2, respectively, the regions 13A and 13B, which correspond to the subpixels 6R and 6G, are equal in relative permittivity to each other and the region 13C, which corresponds to the subpixel 6B, is different in relative permittivity from the regions 13A and 13b.

However, in the present embodiment, too, in adjacent ones of the regions 13A to 13C (i.e., adjacent regions for insulating layer formation), insulating layers made of insulting materials having different relative permittivities, respectively, may be formed as the insulating layer 13. Alternatively, in any two of the regions, an insulating layer made of an insulting material having a different relative permittivity from the other one of the regions may be formed.

Further, the substrate 70 includes a glass substrate 21, R (red), G (green), and B (blue) color filters 22 stacked on the glass substrate 21, a black matrix 23 stacked on the glass substrate 21, and an alignment film 26 stacked on the color filters 22 and the black matrix 23.

That is, as described above, the substrate 70 has the same configuration as the substrate 20 shown in FIG. 1, except that the substrate 70 is not provided with a solid electrode 24 or an insulating layer 25 serving as a CF-side insulating layer.

In the following, the configuration of the liquid crystal panel 2 structured as shown in FIG. 23 is specifically described by taking, as an example, a method for manufacturing samples (liquid crystal panels (7) to (9)) used for verification. As for the following manufacturing method, too, the samples were manufactured under the same conditions unless otherwise noted.

[Liquid Crystal Panels (7) to (9)]

First, as shown in FIG. 23, comb electrodes 14 and 15 of ITO, each 1000 Å in thickness and 4 μm in electrode width L, were formed at an interelectrode space S of 4 μm from each other on a glass substrate 11.

Next, an insulating layer 13 that varies in relative permittivity from one part to another was formed in the following manner. First, an acrylic insulating material (first insulating material) having a relative permittivity $\in$ of 3.7 was applied onto the glass substrate 11 by spin coating and formed into a film, 1 to 3 μm in thickness, to cover an entire display region of the glass substrate 11.

After that, regions that are different in relative permittivity were formed by eliminating a portion of the insulating layer made of the first insulating material by photolithography and forming an insulating film of SiN (second insulating material) having a relative permittivity $\in$ of 6.9 by sputtering in the portion from which the insulating layer has been eliminated, in such a manner that the resulting insulating layer has the same film thickness as that portion of the insulating layer which has been eliminated. In this manner, an insulating layer 13 of a different thickness was formed as an array-side insulating layer in each sample, and the insulating layer 13 had two regions that are different in relative permittivity from each other in each pixel 6.

Then, comb electrodes 14 and 15 of ITO, each 1000 Å in thickness and 4 μm in electrode width L, were formed as upper electrodes at an interelectrode space S of 4 μm from each other on the insulating layer 13.

Next, alignment film paint (γ-butyrolactone solution marketed as "JALS-204" with a solid content of 5% by weight) manufactured by JSR Corporation was applied onto the insulating layer 13 by spin coating in such a manner as to cover the comb electrodes 14 and 15. After that, by sintering for two hour at 200° C., a substrate 80 was formed which had a surface that would face a liquid crystal layer 50 and which had an alignment film 16 provided as a vertical alignment film on that surface.

Meanwhile, color filters 22 and a black matrix 23 were formed on a glass substrate 221 by using the same materials and the same processes as those used for the liquid crystal panels (1) to (3). Furthermore, a vertical alignment film was formed as an alignment film 26 on the color filters 22 and the black matrix 23 by using the same material and the same process as those used to form the alignment film 16. Thus formed was a substrate 70 in which the color filters 22 and the black matrix 23 were stacked on the glass substrate 21 and the alignment film 26 was stacked on the color filters 22 and the black matrix 23. Further, the alignment films 16 and 26 thus formed each had a dry film thickness of 1000 Å (=0.1 μm).

After that, resin beads 3.25 μm in diameter (Micropearl SP20325) were dispersed as spacers onto one of the substrates 80 and 70. Meanwhile, a sealing resin (Structbond XN-21S) was printed as a sealing agent on the other substrate that faced the above substrate.

Next, the substrates 80 and 70 were joined together and sintered for one hour at 135° C.

After that, a positive liquid crystal material ($\Delta\in$=20, $\Delta$n=0.15) manufactured by Merck & Co., Inc was encapsulated as a liquid crystal material in a space between the substrates 80 and 70 by a vacuum injection method, whereby a liquid crystal cell 5 was fabricated in which the liquid crystal layer 50 was sandwiched between the pair of substrates 80 and 70.

Then, polarizing plates 35 and 36 were joined on the front and back surfaces of the liquid crystal cell 5 in the same manner as in the liquid crystal panels (1) to (3). In this manner, the liquid crystal panels (7) to (9) were each fabricated in the form of a liquid crystal panel 2 (liquid crystal display element) shown in FIG. 23. The liquid crystal panels (7) to (9) differed in thickness of the insulating layers 13 from one another.

(Excess Luminance)

FIG. 24 shows tone-luminance ratios as observed from a square angle (polar angle of 0 degree) and oblique angles (polar angles of 10 degrees, 20 degrees, 30 degrees, 40 degrees, and 60 degrees) when the insulating layer 13 in the liquid crystal panel 2 shown in FIG. 23 has a thickness of 1 μm. That is, the tone-luminance ratios were measured by using the liquid crystal panel (7) as the liquid crystal panel 2. Further, in FIG. 24, too, the azimuth is a direction 45 degrees off the absorption axes of the polarizing plates 35 and 36.

Further, the level changes in oblique viewing angle with respect to the square curve were confirmed by placing a backlight on each of the liquid crystal panels described above and measuring, with use of "Ex-contrast" (product name) manufactured by ELDIM, a change in voltage transmittance as observed from a square angle and a change in voltage transmittance as observed from a polar angle of 45 degrees obliquely off the polarization axis.

Results obtained by thus measuring each of the liquid crystal panels (7) to (9) for the difference in tone-luminance ratio (viewing angle level) between a square angle (polar angle of 0 degree) and a polar angle of 60 degrees at a gradation of 128 as indicated by a double-headed arrow in FIG. 24 are shown in Table 2.

Table 2 shows that for the liquid crystal panels (7) to (9), whose insulating layers 13 had thicknesses of 1 μm, 2 μm, and 3 μm, the differences in tone-luminance ratio (viewing angle level) between a square angle (polar angle of 0 degree) and a polar angle of 60 degrees at a gradation of 128 were 42%, 40%, and 36%, respectively. This shows that the liquid crystal panels (7) to (9) are lower in viewing angle level than the liquid crystal panels 2 according to Embodiments 2 and 3 but show improvements in viewing angle level over the conventionally configuration.

Especially, in the case where the insulating layer 13 had a thickness of 3 μm, the difference (viewing angle level) was 36%, which is not only smaller than the difference (viewing angle level) in the conventional liquid crystal panel 100 as described above but also smaller than the difference (viewing angle level) of 38% in the VA-type liquid crystal panel 300 of Comparative Example 2, and a great effect of improvement in viewing angle characteristic was achieved, so that the resulting viewing angle characteristic was satisfactory as visually observed.

Further, the results shown in Table 2 show that the liquid crystal panel 2 according to the present invention exhibits a higher viewing angle level when the insulating layer is thicker, regardless of whether the insulating layer 13 or 25 is provided with regions that are different in relative permittivity from each other, contrary to the liquid crystal panels 100, 200, and 300.

Further, the results shown in Table 2 show that from a point of view of improvement in viewing angle characteristic, it is more preferable that the insulating layer 25, which serves as a CF-side insulating layer, on the solid electrode 24 be provided with regions that are different in relative permittivity from each other.

[Change in Color as Observed from a Square Angle]

Further, Table 11 shows a relationship between the applied voltage and the normalized transmittance in the subpixel 6B as obtained by using an insulating layer 25 having a thickness of 3 μm in the liquid crystal panel 2 and varying the relative permittivity $\in$ of the insulating layer 25. That is, Table 11 shows a relationship between the applied voltage and the normalized transmittance as obtained by using the liquid crystal panel (9) as the liquid crystal panel 2.

As can be seen from Table 11, the liquid crystal panel 2 according to the present embodiment also exhibits a reversal (i.e., tone reversal) of a VT curve in the subpixel 6B at $\in=4$ and exhibits the same behavior as the liquid crystal panel 2 according to the preceding embodiment.

Further, the liquid crystal panels (7) and (8) produced the same results as the liquid crystal panels (1) to (6) according to Embodiment 1 and the liquid crystal panel (9).

Further, the liquid crystal panels 100, 200, and 300 were also measured for a relationship between the applied voltage and the normalized transmittance in the subpixel 6B as obtained by varying the relative permittivity $\in$ of the insulating layer. The results are shown in Table 12. Table 12 shows a relationship between the applied voltage and the normalized transmittance as obtained by using the liquid crystal panel (C) as the liquid crystal panel 100. Further, Table 12 shows a relationship between the applied voltage and the normalized transmittance as obtained by using the liquid crystal panel (F) as the liquid crystal panel 200.

TABLE 12

|  |  | Liquid crystal panel 100 Transmittance/430 nm (blue) | | | Liquid crystal panel 200 Transmittance/430 nm (blue) | | | Liquid crystal panel 300 Transmittance/430 nm (blue) | | |
|---|---|---|---|---|---|---|---|---|---|---|
|  |  | Dielectric layer $\epsilon=2$ | Dielectric layer $\epsilon=3$ | Dielectric layer $\epsilon=4$ | Dielectric layer $\epsilon=2$ | Dielectric layer $\epsilon=3$ | Dielectric layer $\epsilon=4$ | Dielectric layer $\epsilon=2$ | Dielectric layer $\epsilon=3$ | Dielectric layer $\epsilon=4$ |
| Applied voltage | 0 V | 0.1% | 0.1% | 0.1% | 0.1% | 0.1% | 0.1% | 0.1% | 0.1% | 0.1% |
|  | 1 V | 0.1% | 0.1% | 0.1% | 0.1% | 0.1% | 0.1% | 0.1% | 0.1% | 0.1% |
|  | 2 V | 0.1% | 0.1% | 0.1% | 0.1% | 0.1% | 0.1% | 0.1% | 0.1% | 0.1% |
|  | 3 V | 0.1% | 0.3% | 1.0% | 0.1% | 0.3% | 1.0% | 0.2% | 0.4% | 1.2% |
|  | 4 V | 1.6% | 3.5% | 4.4% | 1.5% | 3.4% | 4.3% | 3.8% | 8.4% | 10.6% |
|  | 5 V | 4.7% | 6.3% | 6.8% | 4.5% | 6.0% | 6.6% | 11.3% | 14.9% | 16.3% |
|  | 6 V | 6.6% | 7.6% | 7.9% | 6.3% | 7.3% | 7.6% | 15.7% | 18.1% | 17.7% |
|  | 7 V | 7.6% | 8.2% | 8.3% | 7.3% | 7.9% | 7.9% | 18.2% | 19.5% | 18.5% |
|  | 8 V | 8.1% | 8.3% | 8.2% | 7.8% | 7.9% | 7.8% | 19.3% | 19.7% | 18.3% |

These measurement results show that in the liquid crystal panel 2 according to the present embodiment, as in the liquid crystal panels 2 according to Embodiments 1 and 2, a change in color as observed from a square angle can be suppressed by causing the relative permittivity $\in$ of the insulating layer 25 in the subpixel 6B to be 3, causing the relative permittivity $\in$ of the insulating layer 25 in the subpixel 6G to be 3 to 7, and causing the relative permittivity $\in$ of the insulating layer 25 in the subpixel 6R to be 4 to 7. Further, in the present embodiment, too, by having provided in each pixel 6 at least two regions that are different in relative permittivity from each other and being finished with VT multiplication as described above, the liquid crystal panel 2 can make a liquid crystal panel 2 which shows few changes in color when looked squarely at and which has an excellent viewing angle characteristic.

Further, these measurement results show that a tone reversal occurs at $\in=4$ in any of the liquid crystal panels.

Therefore, as described above, a change in color as observed when the liquid crystal panel is looked squarely at can be improved by using a combination so that VT curves for each separate color are similar in shape to one another, on the basis of a VT curve obtained when the relative permittivity $\in$ of the insulating layer in the subpixel 6B constituted by the B (blue) color filter 22 is 3.

Further, as can be seen from the foregoing description, in the liquid crystal panel 2, as described above, a change in color as observed from a square angle can be suppressed by causing the relative permittivity $\in$ of the insulating layer 25 in the subpixel 6B to be 3, causing the relative permittivity $\in$ of the insulating layer 25 in the subpixel 6G to be 3 to 7, and causing the relative permittivity $\in$ of the insulating layer 25 in the subpixel 6R to be 4 to 7.

Therefore, although each of the foregoing embodiments has been described by taking, as an example, a case where one of the pair of substrates is provided with regions that varies in relative permittivity from one part to another as described above, the present inventions is not to be limited to such an example.

That is, the liquid crystal panel 2 needs only be configured such that at least one of the pair of substrates is provided with an insulating layer and at least one of the insulating layers has regions that are different in relative permittivity as described above. Further, in this connection, when an insulating layer provided in contact with an electrode or, in particular, a solid electrode has regions that are different in relative permittivity as described above, a liquid crystal panel can be surely provided which shows few changes in color when looked squarely at and which has an excellent viewing angle characteristic.

Further, although each of the foregoing embodiments has been described by taking, as an example, a case where resin beads are used as spacers, the present invention is not to be limited to such an example. For example, the resin beads may be replaced as spacers by a combination of resin beads and columnar spacers so provided in positions corresponding to the comb electrodes 14 and 15 as to control the gap between the substrates 10 and 20.

The liquid crystal panel 2 can be suitably used in various types of liquid crystal display device, such as liquid crystal TVs and mobile terminals, in which the liquid crystal panel 2 is used as a display section.

As described above, a liquid crystal panel according to the present invention is a liquid crystal panel including: a first substrate having at least first and second electrodes provided therein; a second substrate placed opposite the first substrate; and a liquid crystal layer sandwiched between the first substrate and the second substrate, the liquid crystal panel being a vertical alignment liquid crystal panel based on a transverse electric field drive system, in which the liquid crystal layer is driven by a transverse electric field generated between the electrodes provided in the first substrate and in which when no electric field is applied, liquid crystal molecules in the liquid crystal layer are aligned perpendicularly to the first and second substrates, at least either the first or second substrate being provided with a first insulating layer having at least two regions that are different in relative permittivity from each other in each pixel so that at least two regions that are different in shape of equipotential lines from each other are formed in the each pixel when the transverse electric field is generated, the each pixel being composed of a red subpixel, a green subpixel, and a blue subpixel, that region of the first insulating layer which corresponds to the blue subpixel having a relative permittivity of 3, that region of the first insulating layer which corresponds to the green subpixel having a relative permittivity of 3 to 7, that region of the first insulating layer which corresponds to the red subpixel having a relative permittivity of 4 to 7.

As described above, a liquid crystal panel according to the present invention is a liquid crystal panel including: a first substrate having at least first and second electrodes provided therein; a second substrate placed opposite the first substrate; and a liquid crystal layer sandwiched between the first substrate and the second substrate, the liquid crystal panel being a vertical alignment liquid crystal panel based on a transverse electric field drive system, in which the liquid crystal layer is driven by a transverse electric field generated between the electrodes provided in the first substrate and in which when no electric field is applied, liquid crystal molecules in the liquid crystal layer are aligned perpendicularly to the first and second substrates, at least either the first or second substrate being provided with an insulating layer, the liquid crystal layer having pixels each composed of a red subpixel, a green subpixel, and a blue subpixel, that region of the insulating layer which corresponds to the blue subpixel having a relative permittivity of 3, that region of the insulating layer which corresponds to the green subpixel having a relative permittivity of 3 to 7, that region of the insulating layer which corresponds to the red subpixel having a relative permittivity of 4 to 7.

According to each of the foregoing configurations, in such a vertical alignment liquid crystal panel based on a transverse electric field drive system, at least one of the first and second substrates is provided with an insulating layer, and those regions of the insulating layer (first insulating layer) which correspond to the blue, green, and red subpixels have the relative permittivities specified above, respectively; therefore, a tone reversal can be prevented and, moreover, VT (voltage-transmittance) curves obtained in the blue, green, and red subpixels can be made similar in shape to one another. For this reason, each of the foregoing configurations makes it possible to provide a liquid crystal panel that shows few changes in color as observed when the liquid crystal panel is looked squarely at.

Further, according to each of the foregoing configurations, VT multiplication can be easily carried out simply by partially changing the relative permittivity of the insulating layer (first insulating layer).

Therefore, as described above, in case where the liquid crystal panel includes, in each pixel, at least two regions of the insulating layer (first insulating layer) that are different in relative permittivity from each other, a liquid crystal panel can be provided which shows few changes in color when looked squarely at, which has an excellent viewing angle characteristic, and which can be manufactured through simple steps. Moreover, since the liquid crystal panel is a vertical alignment liquid crystal panel based on a transverse electric field drive system ad such a liquid crystal panel has a arched (bent) liquid crystal alignment distribution formed within the cell when a transverse electric field is applied, it is possible to achieve high-speed response based on bend alignment, a wide viewing angle based on a self-compensating array, and high contrast based on vertical alignment.

The liquid crystal panel is preferably configured such that: the second substrate further has an electrode provided therein; and the first insulating layer is formed on the electrode provided in the second substrate.

According to the foregoing configuration, the shape of equipotential lines that are formed in those regions of the insulating layer (first insulating layer) which are different in relative permittivity can be efficiently varied, and the difference in tone-luminance ratio (viewing angle level) between a square angle (polar angle of 0 degree) and a polar angle of 60 degrees at a gradation of 128 can be made much smaller than it has conventionally been. For this reason, a great effect of improvement in viewing angle characteristic is achieved, so that the resulting viewing angle characteristic is satisfactory.

The liquid crystal panel is preferably configured such that: the first and second electrodes are comb electrodes; the first substrate further has a third electrode provided therein; and the first and second electrodes are provided above the third electrode with a second insulating layer sandwiched between the first and second electrodes and the third electrode, the second insulating layer having a relative permittivity of 3.

The liquid crystal panel is preferably configured such that: the first and second electrodes are comb electrodes; the first substrate further has a third electrode provided therein; and the first and second electrodes are provided above the third electrode with the first insulating layer sandwiched between the first and second electrodes and the third electrode.

According to each of the foregoing configurations, the liquid crystal panel has an FFS (fringe field switching) structure in which the comb electrodes (first and second electrodes) are provided over the third electrode via the insulating layer (first or second insulating layer); therefore, a high aperture ratio can be achieved. Accordingly, a high transmittance can be achieved.

Further, especially, in a case where the insulating layer (first insulating layer) having at least two regions that are different in relative permittivity from each other is provided on the electrode provided in the second substrate and the liquid crystal panel has such an FFS structure, the difference in tone-luminance ratio (viewing angle level) between a square angle (polar angle of 0 degree) and a polar angle of 60 degrees at a gradation of 128 can be made even smaller than it would be if only either of the substrates were provided with the insulating layer (first insulating layer). Therefore, in this case, not only can the aperture ratio be improved, but also a very satisfactory viewing angle characteristic can be obtained.

The liquid crystal panel is preferably configured such that the insulting layer has a constant thickness regardless of its relative permittivity.

According to the foregoing configuration, the insulting layer has a constant thickness regardless of its relative permittivity. This eliminates the need to control a plurality of cell thicknesses (thickness of the liquid crystal layer) in each pixel and facilitates manufacturing.

Further, in a case of providing, in each pixel, such a region that the directors of liquid crystal molecules is symmetrical, breaking of the symmetry of the directors becomes unlikely when the cell thicknesses in that pixel are uniform; therefore a further improvement in viewing angle characteristic is can be achieved.

The liquid crystal panel is preferably configured such that those regions of the insulating layer which are different in relative permittivity from each other are different in relative permittivity from each other by 2 or more.

According to the foregoing configuration, the shape of equipotential lines that are formed in those regions corresponding to insulating layers that are different in relative permittivity can be made to vary to such an extent that the liquid crystal molecules are sufficiently different in alignment direction between the regions. Therefore, the viewing angle characteristic can be more surely improved.

The liquid crystal panel is preferably configured such that the regions that are different in shape of equipotential lines from each other differ in potential from each other by 0.8 V or more, the potential being applied to the liquid crystal molecules in displaying a halftone.

According to the foregoing configuration, regions that are different in half-tone potential from each other by 0.8 V or more are formed in each pixel. For this reason, therefore, the liquid crystal molecules can be made to vary in alignment direction between the regions so sufficiently that the viewing angle characteristic can be improved. Therefore, according to the foregoing configuration, the viewing angle characteristic can be more surely improved. The term "halftone" here means a median gradation value in the whole gradation range.

A liquid crystal display device according to the present invention includes such a liquid crystal panel according to the present invention, thereby providing a liquid crystal display device that shows few changes in color when the liquid crystal display device is looked squarely at.

The present invention is not limited to the description of the embodiments above, but may be altered by a skilled person within the scope of the claims. An embodiment based on a proper combination of technical means disclosed in different embodiments is encompassed in the technical scope of the present invention.

Industrial Applicability

As described above, a liquid crystal panel of the present invention is a vertical alignment liquid crystal panel based on a transverse electric field drive system, has high-speed response, a wide viewing angle, and a high-contrast characteristic, and, furthermore, shows few changes in color when looked squarely at, and a liquid crystal display device of the present invention is a liquid crystal display device including such a liquid crystal panel. As such, the liquid crystal panel of the present invention and the liquid crystal display device of the present invention can be suitably used for various practical purposes examples of which include public bulletin boards for outdoor use, mobile devices such as cellular phones and PDAs, etc.

Reference Signs List
   1 Liquid crystal display device
   2 Liquid crystal panel
   3 Drive circuit
   4 Backlight
   5 Liquid crystal cell
   6 Pixel
   6B Subpixel
   6G Subpixel
   6G Subpixel
   10 Substrate (first substrate)
   11 Glass substrate
   12 Solid electrode (third electrode)
   13 Insulating layer
   13A to 13C Region
   14 Comb electrode (first electrode)
   15 Comb electrode (second electrode)
   14A Branch electrode
   15A Branch electrode
   16 Alignment film
   20 Substrate (second substrate)
   22 Color filter
   23 Black matrix
   24 Solid electrode (electrode)
   25 Insulating layer
   25A to 25C Region
   26 Alignment film
   31 to 33 Electric field region
   35 Polarizing plate
   36 Polarizing plate
   50 Liquid crystal layer
   52 Liquid crystal molecule
   60 Substrate (first substrate)
   70 Substrate (second substrate)
   80 Substrate (first substrate)

The invention claimed is:

1. A liquid crystal panel comprising:
a first substrate having at least first and second electrodes provided therein;
a second substrate placed opposite the first substrate; and
a liquid crystal layer sandwiched between the first substrate and the second substrate,
said liquid crystal panel being a vertical alignment liquid crystal panel based on a transverse electric field drive system, in which the liquid crystal layer is driven by a transverse electric field generated between the electrodes provided in the first substrate and in which when no electric field is applied, liquid crystal molecules in the liquid crystal layer are aligned perpendicularly to the first and second substrates,
at least either the first or second substrate being provided with an insulating layer,
said liquid crystal layer having pixels each composed of a red subpixel, a green subpixel, and a blue subpixel, that region of the insulating layer which corresponds to the blue subpixel having a relative permittivity of 3, that region of the insulating layer which corresponds to the green subpixel having a relative permittivity of 3 to 7, that region of the insulating layer which corresponds to the red subpixel having a relative permittivity of 4 to 7.

2. The liquid crystal panel as set forth in claim 1, wherein: at least either the first or second substrate is provided with a first insulating layer having at least two regions that are different in relative permittivity from each other in each pixel so that at least two regions that are different in shape of equipotential lines from each other are formed in said each pixel when the transverse electric field is generated, said each pixel being composed of a red subpixel, a green subpixel, and a blue subpixel, the first insulating layer serving as the insulating layer; and that region of the first insulating layer which corresponds to the blue subpixel has a relative permittivity of 3, that region of the first insulating layer which corresponds to the green subpixel having a relative permittivity of 3 to 7, that region of the first insulating layer which corresponds to the red subpixel having a relative permittivity of 4 to 7.

3. The liquid crystal panel as set forth in claim 2, wherein: the second substrate further has an electrode provided therein; and the first insulating layer is formed on the electrode provided in the second substrate.

4. The liquid crystal panel as set forth in claim 3, wherein: the first and second electrodes are comb electrodes;

the first substrate further has a third electrode provided therein; and the first and second electrodes are provided above the third electrode with a second insulating layer sandwiched between the first and second electrodes and the third electrode, the second insulating layer having a relative permittivity of 3.

5. The liquid crystal panel as set forth in claim 2, wherein: the first and second electrodes are comb electrodes;

the first substrate further has a third electrode provided therein; and the first and second electrodes are provided above the third electrode with the first insulating layer sandwiched between the first and second electrodes and the third electrode.

6. The liquid crystal panel as set forth in claim 2, wherein the insulting layer has a constant thickness regardless of its relative permittivity.

7. The liquid crystal panel as set forth in claim 2, wherein among the regions of the first insulating layer, those regions of the first insulating layer which are different in relative permittivity from each other are different in relative permittivity from each other by 2 or more.

8. The liquid crystal panel as set forth in claim 2, wherein the regions that are different in shape of equipotential lines from each other differ in potential from each other by 0.8 V or more, the potential being applied to the liquid crystal molecules in displaying a halftone.

9. A liquid crystal display device comprising a liquid crystal panel as set forth in claim 1.

\* \* \* \* \*